(12) United States Patent
Li et al.

(10) Patent No.: US 11,882,035 B2
(45) Date of Patent: Jan. 23, 2024

(54) COMMUNICATION METHOD AND COMMUNICATIONS APPARATUS

(71) Applicant: HUAWEI TECHNOLOGIES CO., LTD., Guangdong (CN)

(72) Inventors: Hancheng Li, Shanghai (CN); Wenfu Wu, Shanghai (CN); Han Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 156 days.

(21) Appl. No.: 17/126,725

(22) Filed: Dec. 18, 2020

(65) Prior Publication Data

US 2021/0112001 A1 Apr. 15, 2021

Related U.S. Application Data

(63) Continuation of application No. PCT/CN2019/079272, filed on Mar. 22, 2019.

(30) Foreign Application Priority Data

Jun. 26, 2018 (CN) .......................... 201810673277.9

(51) Int. Cl.
*H04L 45/74* (2022.01)
*H04W 76/12* (2018.01)
(Continued)

(52) U.S. Cl.
CPC .............. *H04L 45/74* (2013.01); *H04L 41/12* (2013.01); *H04L 69/22* (2013.01); *H04W 76/12* (2018.02)

(58) Field of Classification Search
CPC ......... H04L 45/74; H04L 41/12; H04L 69/22; H04L 41/122; H04L 41/34; H04L 41/342;
(Continued)

(56) References Cited

U.S. PATENT DOCUMENTS 6,336,129 B1 * 1/2002 Ise .......................... H04L 47/70
709/200
2009/0106768 A1 * 4/2009 Ramanathan ......... G06F 16/958
707/E17.014
(Continued)

FOREIGN PATENT DOCUMENTS

CN 1984398 A 6/2007
CN 107104811 A 8/2017
(Continued)

OTHER PUBLICATIONS

"Medi a Access Contral (MAC) Bridges and Virtual Bridged Local Area Networks Amendment: Stream Reservation Protocol (SRP) Enhancements and Performance Improvements ; 802-IQcc-d0-3",IEEE Draft; 802-IQCC-D0-3, IEEE-SA,Piscataway, NJ USA,vol. 802.1, no. d0-3,1 Dec. 2014,Total 107 Pages.

*Primary Examiner* — Chi Tang P Cheng
(74) *Attorney, Agent, or Firm* — Gregg Jansen

(57) ABSTRACT

A communication method includes: determining, based on first indication information and second indication information, a transmit end and a receive end that communicate with each other by using a data flow, to indicate that a first device is the transmit end and the second indication information is used to indicate that a second device is the receive end, or to indicate that the first device is the receive end and the second indication information is used to indicate that the second device is the transmit end; obtaining, bandwidth information of the data flow; and sending, data flow information and the bandwidth information to indicate at least one of a port identifier of the transmit end and a port identifier of the receive end, and the port identifier of the transmit end, the port identifier of the receive end, and the bandwidth information are used to create the data flow.

20 Claims, 30 Drawing Sheets

(51) Int. Cl.
*H04L 41/12* (2022.01)
*H04L 69/22* (2022.01)

(58) Field of Classification Search
CPC ....... H04L 41/344; H04L 41/40; H04L 43/02; H04L 49/9042; H04L 69/04; H04W 76/12; H04W 12/02; H04W 28/06
USPC .......................................................... 370/329
See application file for complete search history.

(56) References Cited

U.S. PATENT DOCUMENTS

| | | |
|---|---|---|
| 2009/0259763 A1 | 10/2009 | Karlsson |
| 2011/0206035 A1 | 8/2011 | Lee et al. |
| 2012/0218994 A1* | 8/2012 | Zheng ................. H04L 12/4633 370/389 |
| 2020/0146077 A1* | 5/2020 | Li .......................... H04W 76/10 |
| 2021/0136719 A1* | 5/2021 | Kim ...................... H04W 60/04 |

FOREIGN PATENT DOCUMENTS

| | | | |
|---|---|---|---|
| CN | 108024346 A | | 5/2018 |
| WO | 2015149343 A1 | | 10/2015 |
| WO | 2018034337 A1 | | 2/2018 |

* cited by examiner

COMMUNICATION METHOD AND COMMUNICATIONS APPARATUS

CROSS-REFERENCE TO RELATED APPLICATIONS

This application is a continuation of International Application No. PCT/CN2019/079272, filed on Mar. 22, 2019, which claims priority to Chinese Patent Application No. 201810673277.9, filed on Jun. 26, 2018. The disclosures of the aforementioned applications are hereby incorporated by reference in their entireties.

TECHNICAL FIELD

This application relates to the communications field, and in particular, to a communication method and a communications apparatus.

BACKGROUND

As shown in FIG. 1, in an existing 5th generation (5G) communications technology, a communications network between an access network (AN) network element and a user plane function (UPF) network element includes a plurality of routing devices, the AN network element or the UPF network element is connected to a routing device through an N3 interface, and the N3 interface uses the GPRS tunneling protocol-user plane (GTP-U) protocol. In an internet protocol (IP) packet header of a GTP-U packet, a source IP address is an IP address of the AN network element or the UPF network element, and a corresponding destination IP address is an IP address of the UPF network element or the AN network element. The routing device between the AN network element and the UPF network element forwards a packet based on an IP route, so that an uplink data flow of a user can arrive at a specified UPF network element, and a downlink data flow of the user can arrive at a specified AN network element.

However, because the routing device between the AN network element and the UPF network element forwards the packet based on the IP route, a next-hop routing device needs to be selected for the packet based on a routing table, a load status, and the like. Therefore, a forwarding path is indeterminate. In addition, a scheduling policy and the like on each routing device do not ensure a packet forwarding delay. As a result, a delay and reliability of packet transmission between the AN network element and the UPF network element cannot be ensured during packet forwarding performed based on the IP route.

SUMMARY

Embodiments of this application provide a communication method and a communications apparatus, to ensure a delay and reliability of packet transmission between an AN network element and a UPF network element.

To achieve the foregoing objective, the following technical solutions are used in the embodiments of this application.

According to a first aspect, an embodiment of this application provides a communication method. The method includes: A control device determines, based on first indication information and second indication information, a transmit end and a receive end that communicate with each other by using a data flow, where the first indication information is used to indicate that a first device is the transmit end and the second indication information is used to indicate that a second device is the receive end, or the first indication information is used to indicate that the first device is the receive end and the second indication information is used to indicate that the second device is the transmit end; the data flow includes first information for identifying the data flow; and the first information is used to instruct the transmit end to send data by using the data flow, and is further used to instruct the receive end to receive the data by using the data flow. The control device obtains bandwidth information of the data flow. The control device sends data flow information and the bandwidth information, where the data flow information is used to indicate at least one of a port identifier of the transmit end and a port identifier of the receive end, and the port identifier of the transmit end, the port identifier of the receive end, and the bandwidth information are used to create the data flow. According to the communication method provided in this embodiment of this application, the control device determines the transmit end and the receive end that communicate with each other by using the data flow, and determines the bandwidth information of the data flow; and the control device sends, to another network element, the bandwidth information of the data flow and port identifiers of ports used when the transmit end and the receive end communicate with each other by using the data flow. In this way, an NRF network element, the control device, or another control plane network element, and an AN network element and a UPF network element that respectively serve as the transmit end and the receive end can learn information about a TSN pipeline for transmitting the data flow, thereby establishing the TSN pipeline between the AN network element and the UPF network element. When a reliable-delay data flow or session is subsequently created for a user, the data flow or the session is transmitted between the AN network element and the UPF network element through the TSN pipeline. This avoids a case in which a forwarding path is indeterminate during packet forwarding performed based on an IP route, thereby ensuring a delay and reliability of packet transmission between the AN network element and the UPF network element.

In an embodiment, the communication method further includes: The control device receives the first indication information from the first device, and/or receives the second indication information from the second device. This implementation provides a manner in which the control device obtains the first indication information and the second indication information. This implementation provides the manner in which the control device obtains the first indication information and the second indication information.

In an embodiment, the communication method further includes: The control device receives the first indication information and the second indication information from a session management function network element. This implementation provides another manner in which the control device obtains the first indication information and the second indication information.

In an embodiment, the communication method further includes: The control device obtains the first indication information and the second indication information based on a configuration, a policy, or an orchestration. This implementation provides still another manner in which the control device obtains the first indication information and the second indication information.

In an embodiment, the communication method further includes: The control device sends the first indication information to the first device, and/or sends the second indication information to the second device. In this implementation, the first device and/or the second device can learn whether the first device and/or the second device are/is the transmit end or the receive end.

In an embodiment, the communication method further includes: The control device receives the first information from the transmit end and/or the receive end. This implementation provides a manner in which the control device obtains the first information.

In an embodiment, the communication method further includes: The control device obtains the first information based on a configuration, a policy, or an orchestration. This implementation provides another manner in which the control device obtains the first information.

In an embodiment, the communication method further includes: The control device sends the first information to a centralized user configuration network element. In this implementation, the centralized user configuration network element can learn the information for identifying the data flow.

In an embodiment, the communication method further includes: The control device receives the first information from a centralized user configuration network element. This implementation provides still another manner in which the control device obtains the first information.

In an embodiment, the communication method further includes: The control device sends the first information to the transmit end and/or the receive end. In this implementation, the transmit end and/or the receive end can learn the information for identifying the data flow.

In an embodiment, the communication method further includes: The control device receives the port identifier of the transmit end from the transmit end, and receives the port identifier of the receive end from the receive end. This implementation provides a manner in which the control device obtains the port identifier of the transmit end and/or the port identifier of the receive end.

In an embodiment, that the control device sends data flow information includes: The control device sends the data flow information to the centralized user configuration network element. In this implementation, the centralized user configuration network element can learn the data flow information.

In an embodiment, the communication method further includes: The control device receives a device identifier of the transmit end and a device identifier of the receive end from the session management function network element. The control device receives topology information of a reliable-delay transmission network from the centralized user configuration network element, where the topology information includes a correspondence between the device identifier of the transmit end and the port identifier of the transmit end and a correspondence between the device identifier of the receive end and the port identifier of the receive end. The control device obtains the port identifier of the transmit end and the port identifier of the receive end based on the device identifier of the transmit end, the device identifier of the receive end, and the topology information. This implementation provides another manner in which the control device obtains the port identifier of the transmit end and the port identifier of the receive end.

In an embodiment, the data flow information includes the port identifier of the transmit end, and that the control device sends data flow information includes: The control device sends the data flow information to the transmit end, where the data flow information is used to instruct the transmit end to send a stream reservation protocol SRP request message to the receive end through a port corresponding to the port identifier of the transmit end, and the SRP request message is used to trigger creation of the data flow. In this implementation, the transmit end and the receive end can create the data flow according to the SRP protocol.

In an embodiment, the data flow information includes the port identifier of the receive end, and that the control device sends data flow information includes: The control device sends the data flow information to the receive end, where the data flow information is used to instruct the receive end to send an SRP response message to the transmit end through a port corresponding to the port identifier of the receive end, and the SRP response message is used to respond to the SRP request message from the transmit end. In this implementation, the transmit end and the receive end can create the data flow according to the SRP protocol.

In an embodiment, the data flow information includes an identifier of a reliable-delay transmission network, and the identifier of the reliable-delay transmission network is associated with the port identifier of the transmit end and the port identifier of the receive end. This implementation provides a manner of implicitly indicating the port identifier of the transmit end and the port identifier of the receive end.

In an embodiment, that the control device obtains bandwidth information of the data flow includes: The control device receives the bandwidth information from the transmit end and/or the receive end. This implementation provides a manner in which the control device obtains the bandwidth information of the data flow.

In an embodiment, that the control device obtains bandwidth information of the data flow includes: The control device obtains the bandwidth information based on a configuration, a policy, or an orchestration. This implementation provides another manner in which the control device obtains the bandwidth information of the data flow.

In an embodiment, that the control device sends the bandwidth information includes: The control device sends the bandwidth information to the transmit end and/or the receive end. In this implementation, the transmit end and/or the receive end can learn the bandwidth information of the data flow.

In an embodiment, that the control device sends the bandwidth information includes: The control device sends the bandwidth information to the centralized user configuration network element. In this implementation, the centralized user configuration network element can learn the bandwidth information of the data flow.

In an embodiment, the communication method further includes: The control device sends reachability information between the transmit end and the receive end to a network function repository function network element, where the reachability information is used to indicate that the transmit end and the receive end are located in a same reliable-delay transmission network. In this implementation, the network function repository function network element can learn the reachability information between the transmit end and the receive end, where the reachability information is used as a basis for selecting a UPF network element during subsequent creation of a reliable-delay user flow or session for a user.

According to a second aspect, an embodiment of this application provides a communication method. The method includes: A first device obtains a port identifier of the first device, where the first device is a transmit end or a receive end that performs communication by using a data flow, the data flow includes first information for identifying the data flow, and the first information is used to instruct the transmit end to send data by using the data flow, and is further used to instruct the receive end to receive the data by using the data flow. The first device sends second information indicating the port identifier of the first device, where the port identifier of the first device is used to create the data flow. According to the communication method provided in this embodiment of this application, an AN network element and a UPF network element that respectively serve as the transmit end and the receive end can learn port identifiers of ports used when the AN network element and the UPF network element communicate with each other by using the data flow, and indicate the port identifiers. When the AN network element and the UPF network element subsequently create a reliable-delay data flow or session based on the port identifiers, the data flow or the session is transmitted between the AN network element and the UPF network element through a TSN pipeline. This avoids a case in which a forwarding path is indeterminate during packet forwarding performed based on an IP route, thereby ensuring a delay and reliability of packet transmission between the AN network element and the UPF network element.

In an embodiment, that a first device obtains a port identifier of the first device includes: The first device receives an identifier of a reliable-delay transmission network from a control device. The first device obtains the port identifier of the first device based on the identifier of the reliable-delay transmission network. This implementation provides another manner in which the first device obtains the port identifier of the first device.

In an embodiment, that a first device obtains a port identifier of the first device includes: The first device receives the port identifier of the first device from a control device. This implementation provides another manner in which the first device obtains the port identifier of the first device.

In an embodiment, that the first device sends second information indicating the port identifier of the first device includes: The first device sends the port identifier of the first device to the control device. In this implementation, the control device can learn the port identifier of the first device.

In an embodiment, the communication method further includes: The first device sends a stream reservation protocol SRP request message to a second device through a port corresponding to the port identifier of the first device, where the SRP request message is used to trigger creation of the data flow, the first device is the transmit end, and the second device is the receive end. Alternatively, the communication method further includes: The first device sends an SRP response message to a second device through a port corresponding to the port identifier of the first device, where the SRP response message is used to respond to an SRP request message from the second device, the SRP request message is used to trigger creation of the data flow, the first device is the receive end, and the second device is the transmit end. In this implementation, the transmit end and the receive end can create the data flow according to the SRP protocol.

In an embodiment, the communication method further includes: The first device receives first indication information from the control device, where the first indication information is used to indicate whether the first device is the transmit end or the receive end. In this implementation, the first device can learn whether the first device is the transmit end or the receive end.

In an embodiment, the communication method further includes: The first device sends first indication information to the control device, where the first indication information is used to indicate whether the first device is the transmit end or the receive end. In this implementation, the control device can learn whether the first device is the transmit end or the receive end.

In an embodiment, the communication method further includes: The first device receives bandwidth information of the data flow from the control device. In this implementation, the first device can learn the bandwidth information of the data flow.

In an embodiment, the communication method further includes: The first device sends bandwidth information of the data flow to the control device. In this implementation, the control device can learn the bandwidth information of the data flow.

In an embodiment, the communication method further includes: The first device receives the first information from the control device. In this implementation, the control device can learn the information for identifying the data flow.

In an embodiment, the communication method further includes: The first device sends the first information to the control device. In this implementation, the first device can learn the information for identifying the data flow.

According to a third aspect, an embodiment of this application provides a communications apparatus, configured to perform the method according to any one of the first aspect or the possible implementations of the first aspect.

According to a fourth aspect, an embodiment of this application provides a communications apparatus, configured to perform the method according to any one of the second aspect or the possible implementations of the second aspect.

According to a fifth aspect, an embodiment of this application provides a communications system, including the communications apparatus according to the third aspect and the communications apparatus according to the fourth aspect.

According to a sixth aspect, an embodiment of this application provides a communications apparatus, including a processor and a memory, where the memory is configured to store a program, and the processor invokes the program stored in the memory, to perform the method according to any one of the first aspect and the possible implementations of the first aspect, or perform the method according to any one of the second aspect or the possible implementations of the second aspect.

According to a seventh aspect, an embodiment of this application provides a storage medium. The storage medium stores a computer program. When the computer program is executed by a processor, the method according to any one of the first aspect or the possible implementations of the first aspect is performed, or the method according to any one of the second aspect or the possible implementations of the second aspect is performed.

According to an eighth aspect, an embodiment of this application provides a computer program product. When the computer program product is run on a communications apparatus, the communications apparatus is enabled to perform the method according to the first aspect and the possible implementations of the first aspect, or perform the method according to the second aspect and the possible implementations of the second aspect.

According to a ninth aspect, an embodiment of this application provides a chip system, including a processor. The processor is configured to support a communications apparatus in performing the method according to any one of the first aspect or the possible implementations of the first aspect, or performing the method according to any one of the second aspect or the possible implementations of the second aspect.

For technical effects of the third aspect to the ninth aspect, refer to the content in the first aspect and the second aspect.

DESCRIPTION OF EMBODIMENTS

The embodiments of this application are described based on a scenario of a 5G network in a wireless communications network. It should be noted that solutions in the embodiments of this application may also be applied to another wireless communications network, and a corresponding name thereof may be replaced with a name of a corresponding function of the another wireless communications network.

Figure 1:
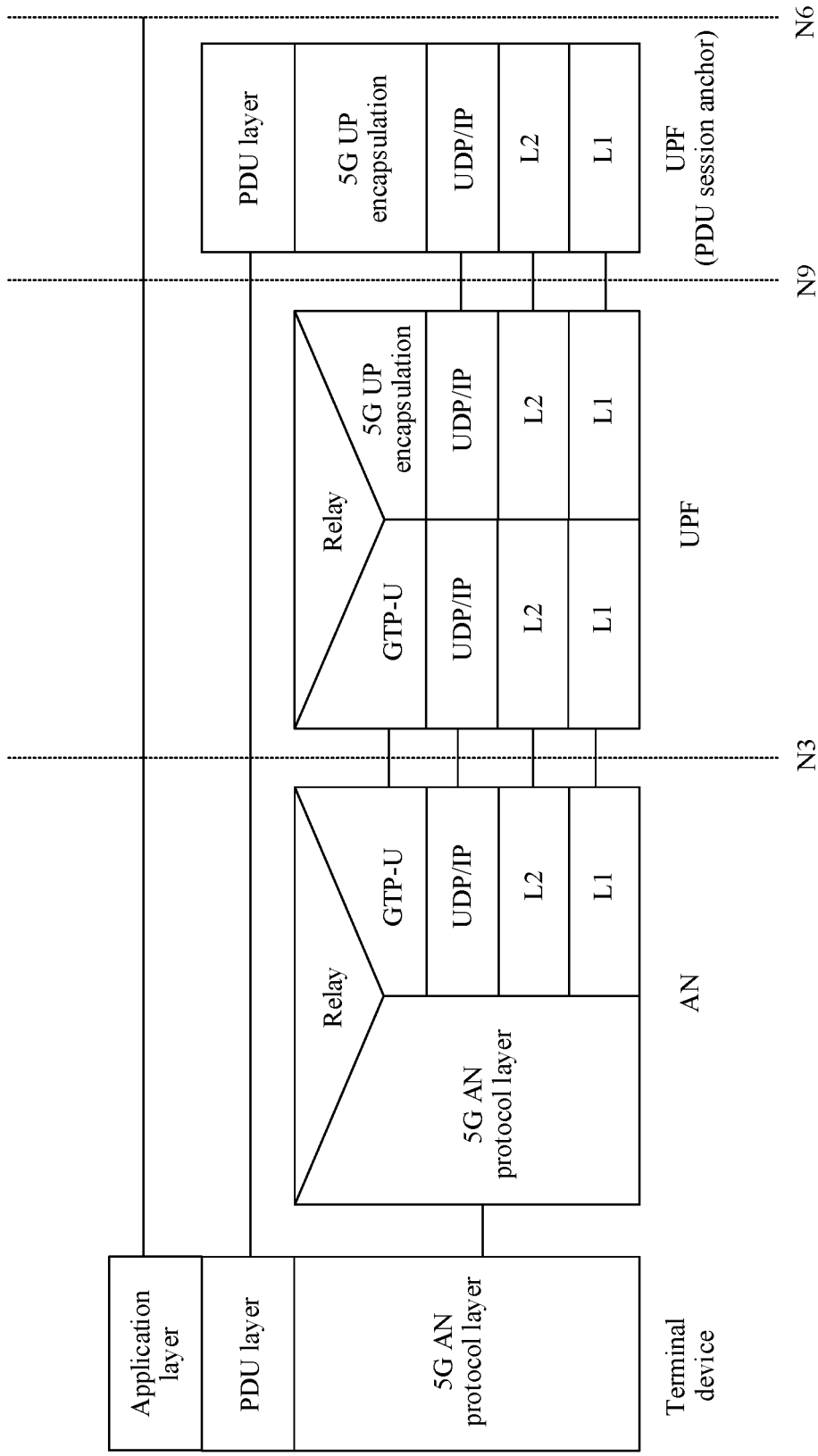
FIG. 1 is a schematic diagram of a GTP-U protocol stack according to an embodiment of this application.
Figure 2:
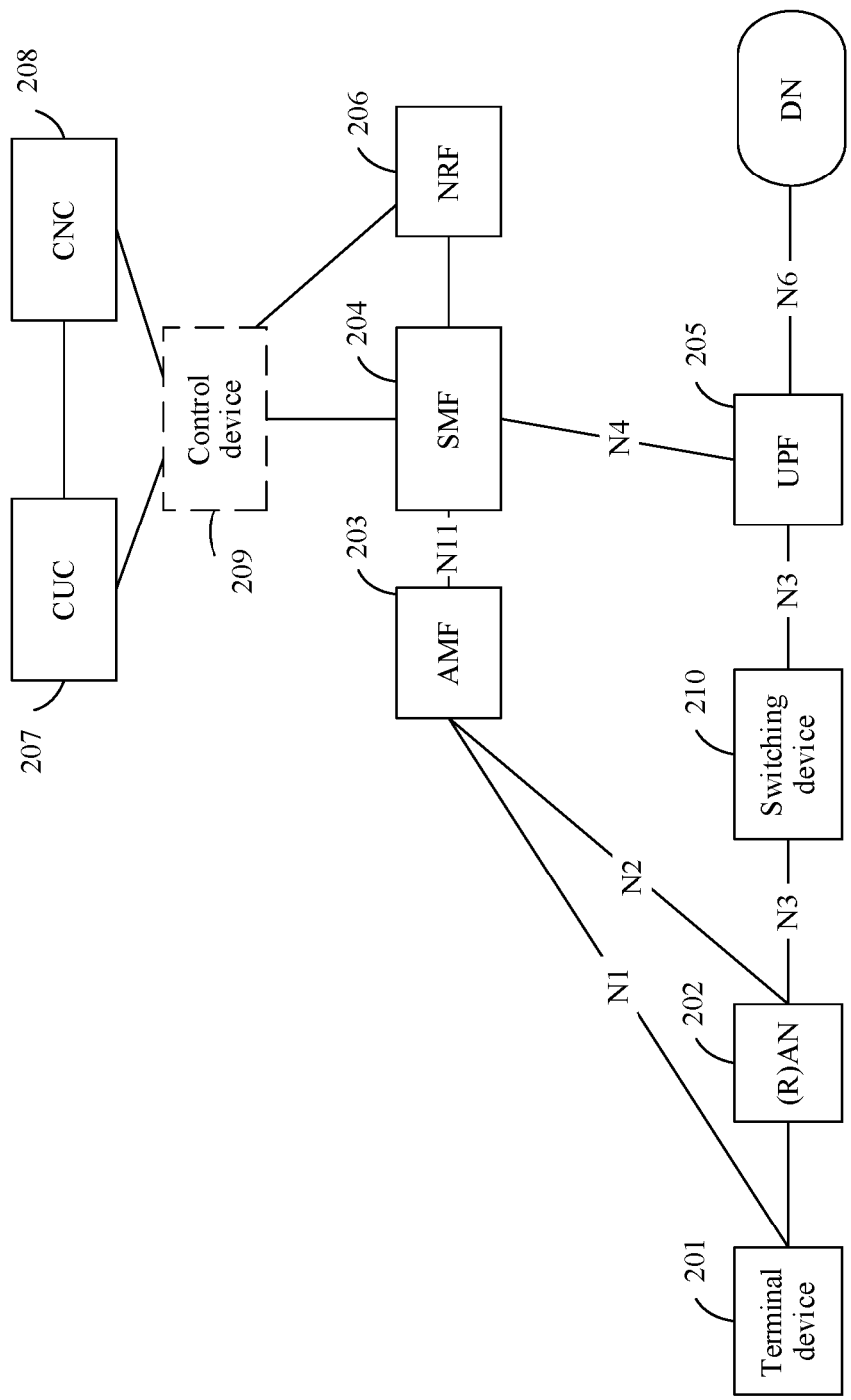
FIG. 2 is a schematic architectural diagram of a communications system according to an embodiment of this application.

As shown in FIG. 2, an architecture of a communications system provided in an embodiment of this application includes a terminal device 201, a radio access network RAN) network element 202, an access and mobility management function (AMF) network element 203, a session management function (SMF) network element 204, a user plane function (UPF) network element 205, a network function repository function (NRF) network element 206, a centralized user configuration (CUC) network element 207, and a centralized network configuration (CNC) network element 208. Optionally, the communications system may further include a control device 209.

It should be noted that, in a possible design, the control device 209 may be integrated with the SMF network element 204. In other words, a function of the control device 209 may be performed by the SMF network element 204. In another possible design, the control device 209 may be integrated with the CUC network element 207. In other words, a function of the control device 209 may be performed by the CUC network element 207. In addition, the SMF network element 204 may be integrated with the CUC network element 207. For example, all functions of the CUC network element 207 may be performed by the SMF network element 204.

It should be noted that names of interfaces between the network elements in the figure are merely examples, and the interface names in specific implementation may be other names. This is not limited in this embodiment of this application. For example, an interface between the terminal device 201 and the AMF network element 203 may be an N1 interface, an interface between the RAN network element 202 and the AMF network element 203 may be an N2 interface, an interface between the RAN network element 202 and the UPF network element 205 may be an N3 interface, an interface between the UPF network element 205 and the SMF network element 204 may be an N4 interface, an interface between the AMF network element 203 and the SMF network element 204 may be an N11 interface, and an interface between the UPF network element 205 and a data network (data network, DN) may be an N6 interface.

The terminal device 201 in this embodiment of this application may include various devices: a handheld device having a wireless communication function, a vehicle-mounted device, a wearable device, or a computing device, or another processing device connected to a wireless modem, or may include a subscriber unit (subscriber unit), a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, relay user equipment, or the like. The relay user equipment may be, for example, a 5G home gateway (RG). For ease of description, the devices mentioned above are collectively referred to as the terminal.

Figure 3:
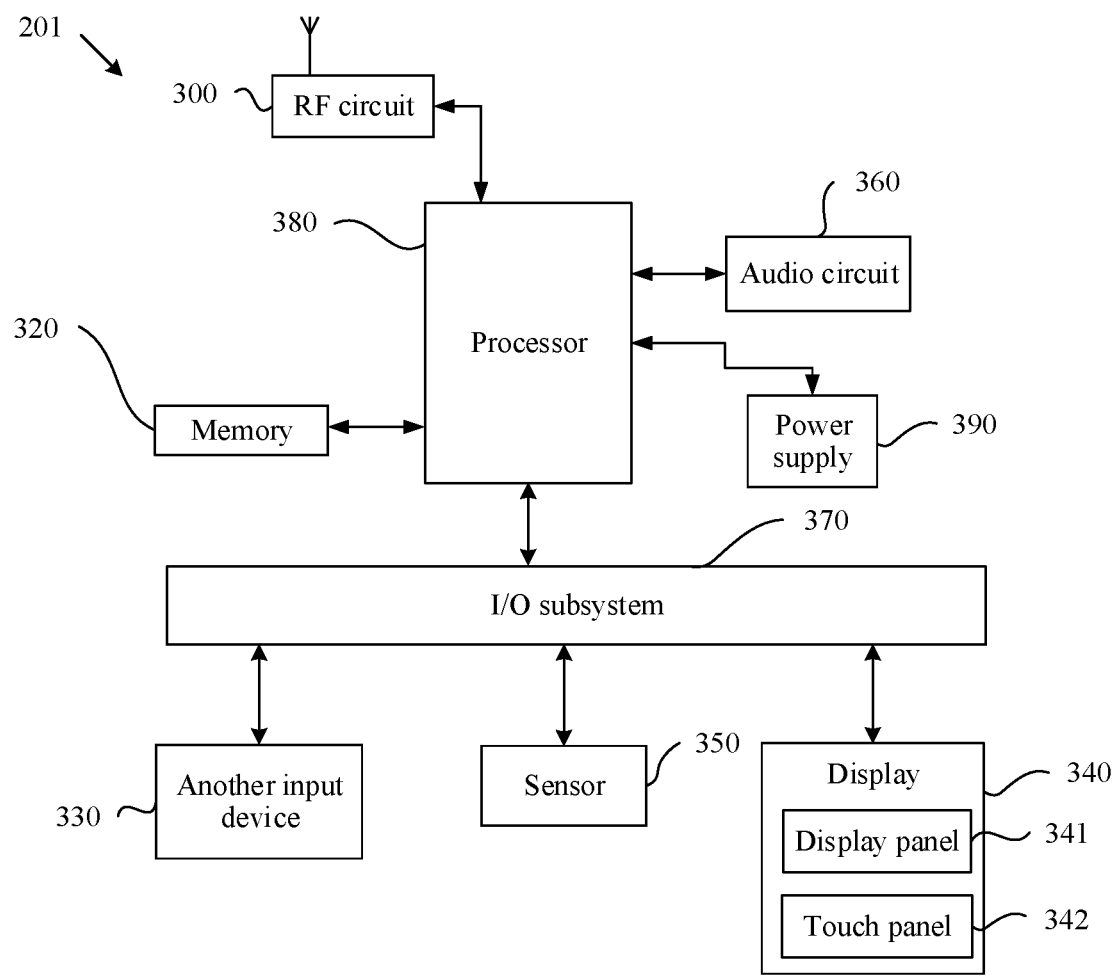
FIG. 3 is a schematic structural diagram of a mobile phone according to an embodiment of this application.

An example in which the terminal device 201 is a mobile phone is used for describing a hardware architecture of the mobile phone. As shown in FIG. 3, the mobile phone 201 may include components such as a radio frequency (RF) circuit 300, a memory 320, another input device 330, a display 340, a sensor 350, an audio circuit 360, an I/O subsystem 370, a processor 380, and a power supply 390. A person skilled in the art can understand that the mobile phone structure in the figure does not constitute any limitation on the mobile phone, and may include more or fewer components than those shown in the figure, a combination of some components, splitting of some components, or a different arrangement of the components. A person skilled in the art can understand that the display 340 belongs to a user interface (UI), and the display 340 may include a display panel 341 and a touch panel 342. Although not shown, the mobile phone may further include functional modules or devices such as a camera and a Bluetooth module. Details are not described herein.

Further, the processor 380 is connected to all of the RF circuit 300, the memory 320, the audio circuit 360, the I/O subsystem 370, and the power supply 390. The I/O subsystem 370 is connected to all of the another input device 330, the display 340, and the sensor 350. The RF circuit 300 may be configured to receive and send a signal in an information receiving and sending process or a call process. Particularly, after receiving downlink information from a network device, the RF circuit 300 sends the downlink information to the processor 380 for processing. The memory 320 may be configured to store a software program and a module. The processor 380 runs the software program and the module that are stored in the memory 320, to perform various function applications and data processing of the mobile phone, for example, perform a method and a function that are performed by the terminal device in the embodiments of this application. The another input device 330 may be configured to: receive input digit or character information, and generate a keyboard signal input related to a user setting and function control of the mobile phone. The display 340 may be configured to display information entered by a user or information provided for the user, and various menus of the mobile phone, and may further receive a user input. The sensor 350 may be a light sensor, a motion sensor, or another sensor. The audio circuit 360 may provide an audio interface between the user and the mobile phone. The I/O subsystem 370 is configured to control an external input/output device, and the external device may include another device input controller, a sensor controller, and a display controller. The processor 380 is a control center of the mobile phone 200, is connected to all parts of the entire mobile phone through various interfaces and lines, and performs various functions and data processing of the mobile phone by running or executing the software program and/or the module stored in the memory 320 and invoking data stored in the memory 320, so as to perform overall monitoring on the mobile phone. The power supply 390 (for example, a battery) is configured to supply power to the foregoing components.

Preferably, the power supply may be logically connected to the processor 380 by using a power management system, so as to implement functions such as charging, discharging, and power consumption management by using the power management system. In this embodiment of this application, the terminal device 201 may receive a signal from the RAN network element 202 by using the RF circuit 300.

The RAN network element 202 is a device that provides radio access for the terminal device 201. The RAN network element 202 includes but is not limited to an eNodeB, a wireless fidelity (Wi-Fi) access point, and a worldwide interoperability for microwave access (WiMAX) base station. The RAN network element 202 in this embodiment of this application may include a single RAN network element, or may include dual RAN network elements. For example, the dual RAN network elements include a master radio access network (M-RAN) network element and a secondary radio access network (S-RAN) network element. The single RAN network element or the dual RAN network elements and the UPF network element may transmit a packet with each other through two tunnels.

Figure 4:
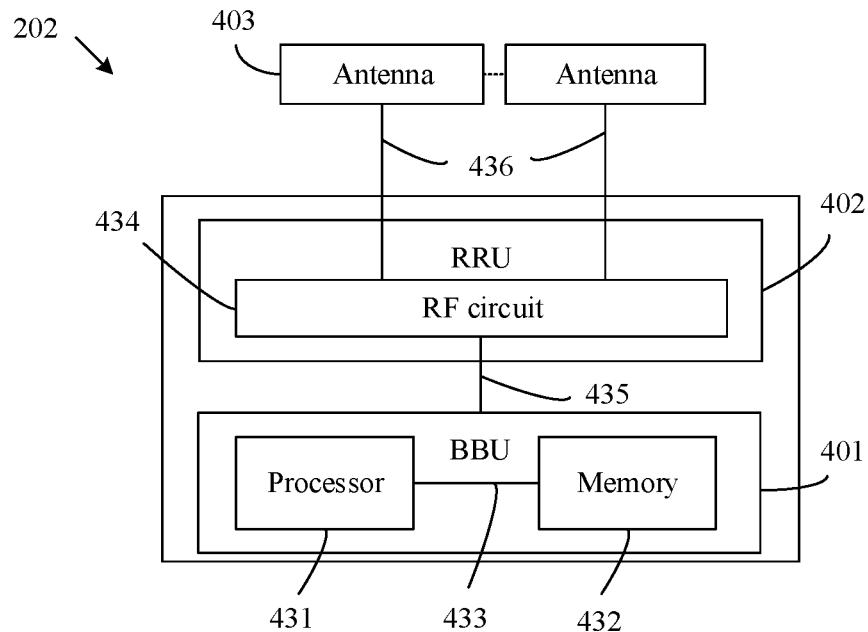
FIG. 4 is a schematic structural diagram of a base station according to an embodiment of this application.

An example in which the RAN network element 202 is a base station is used for describing a hardware architecture of the base station. As shown in FIG. 4, the base station 202 may include a building baseband unit (BBU) 401 and a remote radio unit (remote radio unit, RRU) 402, the RRU 402 is connected to an antenna system (that is, an antenna) 403, and the BBU 401 and the RRU 402 may be disassembled for use depending on a requirement. The BBU 401 may include a processor 431, a memory 432, and a bus system 433. The processor 431 and the memory 432 of the BBU 401 are connected to each other through the bus system 433. The bus system may be a peripheral component interconnect bus, an extended industry standard architecture bus, or the like. The bus may be classified into an address bus, a data bus, a control bus, and the like. For ease of representation, only one line is used to represent the bus in the figure, but this does not mean that there is only one bus or only one type of bus. The RRU 402 may include an RF circuit 434, and the base station 202 may further include an optical fiber 435 and a coaxial cable 436. The RF circuit 434 in the RRU 402 and the BBU 401 are connected to each other through the optical fiber 435, and the RF circuit 434 in the RRU 402 and the antenna 403 are connected to each other through the coaxial cable 436. The base station may include stations in various forms, such as a macro base station, a micro base station (also referred to as a small cell), a relay station, an access point, and or the like. The RAN network element 202 in this embodiment of this application is configured to transmit data between the terminal device 201 and a core network device.

The AMF network element 203 may be responsible for mobility management in a mobile network, for example, user location update, network registration by a user, and a handover between users.

The SMF network element 204 may be responsible for session management in the mobile network, for example, session establishment, modification, and release. A specific function is, for example, allocating an IP address to a user or selecting a UPF network element that provides a packet forwarding function.

The UPF network element 205 may be responsible for processing a user packet, for example, performing forwarding and charging.

The NRF network element 206 may provide functions such as network function instance registration and discovery.

The CUC network element 207 and the CNC network element 208 are control devices in a delay sensitive networking (time sensitive network, TSN) network. The CUC network element 207 is configured to manage a terminal and a service, for example, receive registration information from a transmit end (talker) and a receive end (listener) in a TSN network element and switching configuration parameters of the transmit end and the receive end. The CNC network element 208 is configured to manage a switching node in the TSN network, for example, maintain a topology of the TSN network, obtain a scheduling policy of the switching node through calculation, and deliver the scheduling policy to the switching node.

The control device 209 is configured to manage a TSN network between the AN network element 202 and the UPF network element 205.

A switching device 210 is configured to transmit a packet between the AN network element 202 and the UPF network element 205.

Network elements, namely the AMF network element 203, the SMF network element 204, the UPF network element 205, the NRF network element 206, and the control device 209, may be collectively referred to as core network elements. Structures of these core network elements are described below by using a network device as an example. The embodiments of this application do not specify that each core network element needs to include units or devices shown in the following figure. The core network element may include more or fewer units or devices.

Figure 5:
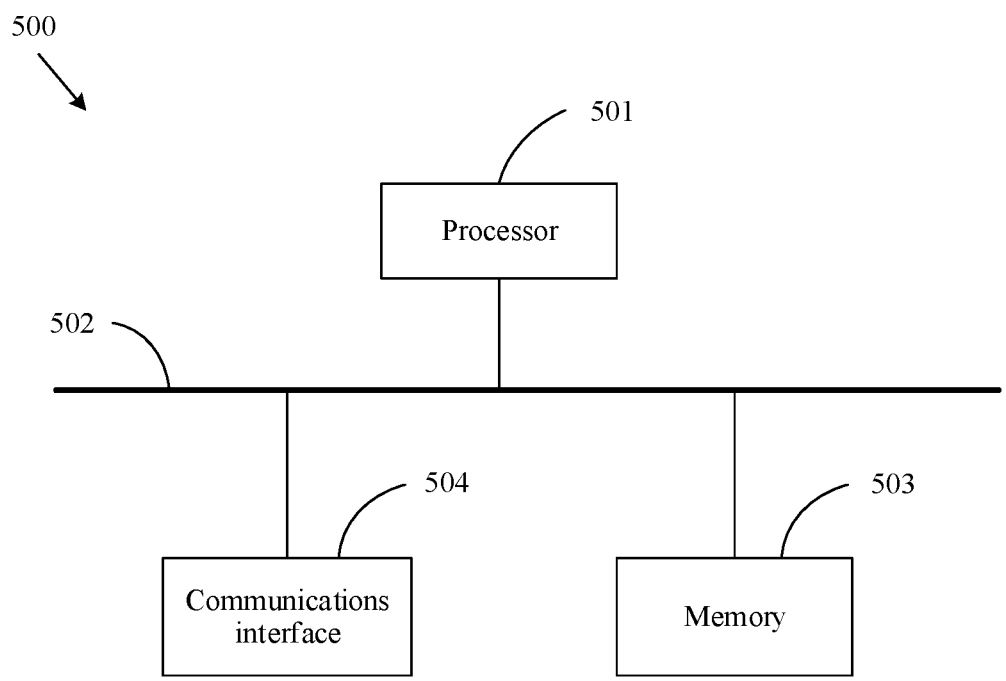
FIG. 5 is a schematic structural diagram of a network device according to an embodiment of this application.

As shown in FIG. 5, a network device 500 may include at least one processor 501, a communications line 502, a memory 503, and at least one communications interface 504. The processor 501 may be a general-purpose central processing unit (CPU), a microprocessor, an application-specific integrated circuit (ASIC), or one or more integrated circuits configured to control program execution of the solutions in this application. The communications line 502 may include a path for transmitting information between the foregoing components. The communications interface 504 is configured to communicate, by using any apparatus such as a transceiver, with another device or a communications network, for example, an Ethernet, a radio access network (RAN), or a wireless local area network (WLAN). The memory 503 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or other optical disk storage, optical disc storage (including a compact disc, a laser disc, an optical disc, digital versatile disc, a blue-ray optical disc, and the like), a magnetic disk storage medium or another magnetic storage device, or any other computer-accessible medium that can be used to carry or store expected program code in an instruction or data structure form, without being limited thereto though. The memory may exist independently, and is connected to the processor through the communications line 502. Alternatively, the memory may be integrated with the processor. The memory 503 is configured to store a computer executable instruction (which may be referred to as application program code) for executing the solutions of this application, and the processor 501 controls execution of the computer executable instruction. The processor 501 is configured to execute the computer executable instruction stored in the memory 503, to implement methods provided in the following embodiments of this application.

According to a communication method and a communications apparatus provided in the embodiments of this application, to resolve a problem that a delay and reliability of packet transmission cannot be ensured during packet forwarding performed between an AN network element and a UPF network element based on an IP route, the AN network element and the UPF network element respectively serve as a transmit end and a receive end in a TSN network, and a TSN pipeline is established between the AN network element and the UPF network element. In this way, when a reliable-delay data flow or session is subsequently created for a user, the data flow or the session is transmitted through the TSN pipeline, thereby ensuring the delay and the reliability of packet transmission between the AN network element and the UPF network element. The following describes the TSN network, the TSN pipeline, and the data flow in the embodiments of this application.

In a forwarding process in a conventional Ethernet network, when a large quantity of data packets instantaneously arrive at a forwarding port of a switching device 210, a problem of a large forwarding delay or a packet loss is caused. Consequently, the conventional Ethernet cannot provide a highly reliable service with a guaranteed transmission delay, and cannot satisfy requirements of fields such as automotive control and industrial Internet. The Institute of Electrical and Electronics Engineers (IEEE) defines a related TSN network standard based on a requirement of reliable-delay transmission. The standard provides a reliable-delay transmission service based on layer 2 switching, ensuring reliability of delay-sensitive service data transmission and predictable end-to-end transmission delay.

Figure 6:
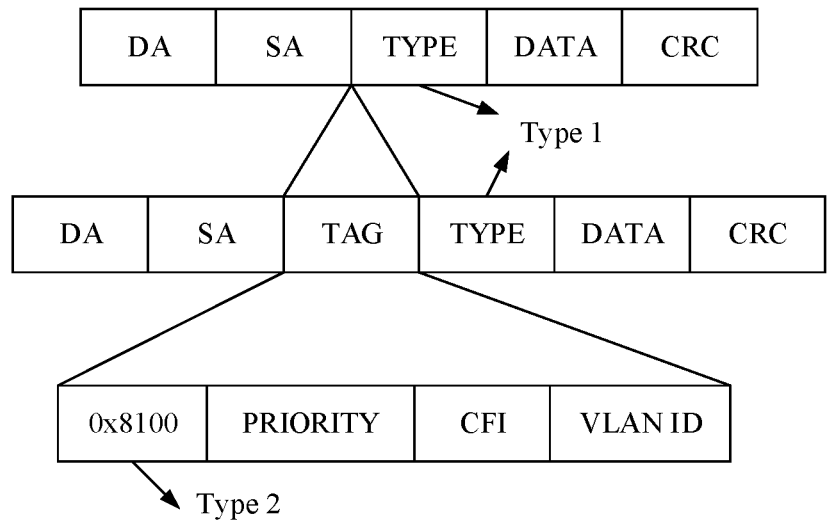
FIG. 6 is a schematic diagram of a format of an Ethernet frame in a packet obtained after layer 2 encapsulation according to an embodiment of this application.

Layer 2 switching belongs to link-layer switching, and forwarding is performed based on a media access control (MAC) address. The switching device 210 obtains a forwarding port by querying a MAC learning table, and forwards a packet in a broadcast manner if a destination address in the packet is not recorded in the MAC learning table. FIG. 6 shows a format of an Ethernet frame in a packet obtained after layer 2 encapsulation. A destination address (DA) indicates a destination MAC address, a source address (source address, SA) indicates a source MAC address, a type indicates an Ethernet type of the Ethernet frame, and data indicates a data field, and cyclic redundancy check (CRC) is used to detect or check an error that may occur after data transmission or storage. When the Ethernet frame carries virtual local area network (VLAN) information, a VLAN tag is added between the SA field and the TYPE field, and includes an Ethernet type value (a type 2) 0x8100, a priority field, a canonical format indicator (CFI) field, and a VLAN ID field. In the VLAN tag, the Ethernet type value 0x8100 is also referred to as a tag protocol identifier (TPID), and may alternatively be another value. The Ethernet frame in the packet obtained after the layer 2 encapsulation may not include a VLAN tag, or may include at least one VLAN tag. It should be noted that the Ethernet type (a type 1) of the Ethernet frame is unrelated to the Ethernet type value (the type 2) in the TAG.

Figure 7:
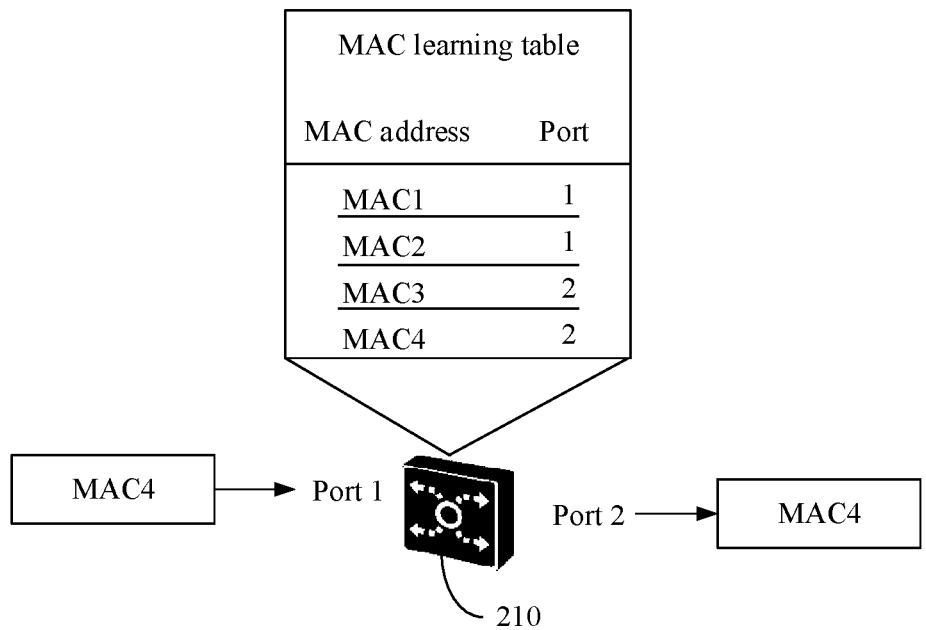
FIG. 7 is a schematic diagram of a layer 2 switching principle according to an embodiment of this application.

FIG. 7 shows a layer 2 switching principle. A switching device 210 stores a MAC learning table, and records a correspondence between a user's MAC address and a port. If forwarding is performed based on a VLAN and a MAC address, the MAC learning table further includes corresponding VLAN information. When receiving, from a port 1, a packet whose destination address is MAC4, the switching device learns, by querying the MAC learning table, that port information corresponding to MAC4 is a port 2, and then sends the packet from the port 2. An entry of MAC4 in the MAC learning table is obtained through learning when the port 2 receives a packet whose source MAC address is MAC4, or may be obtained through configuration.

Figure 8:
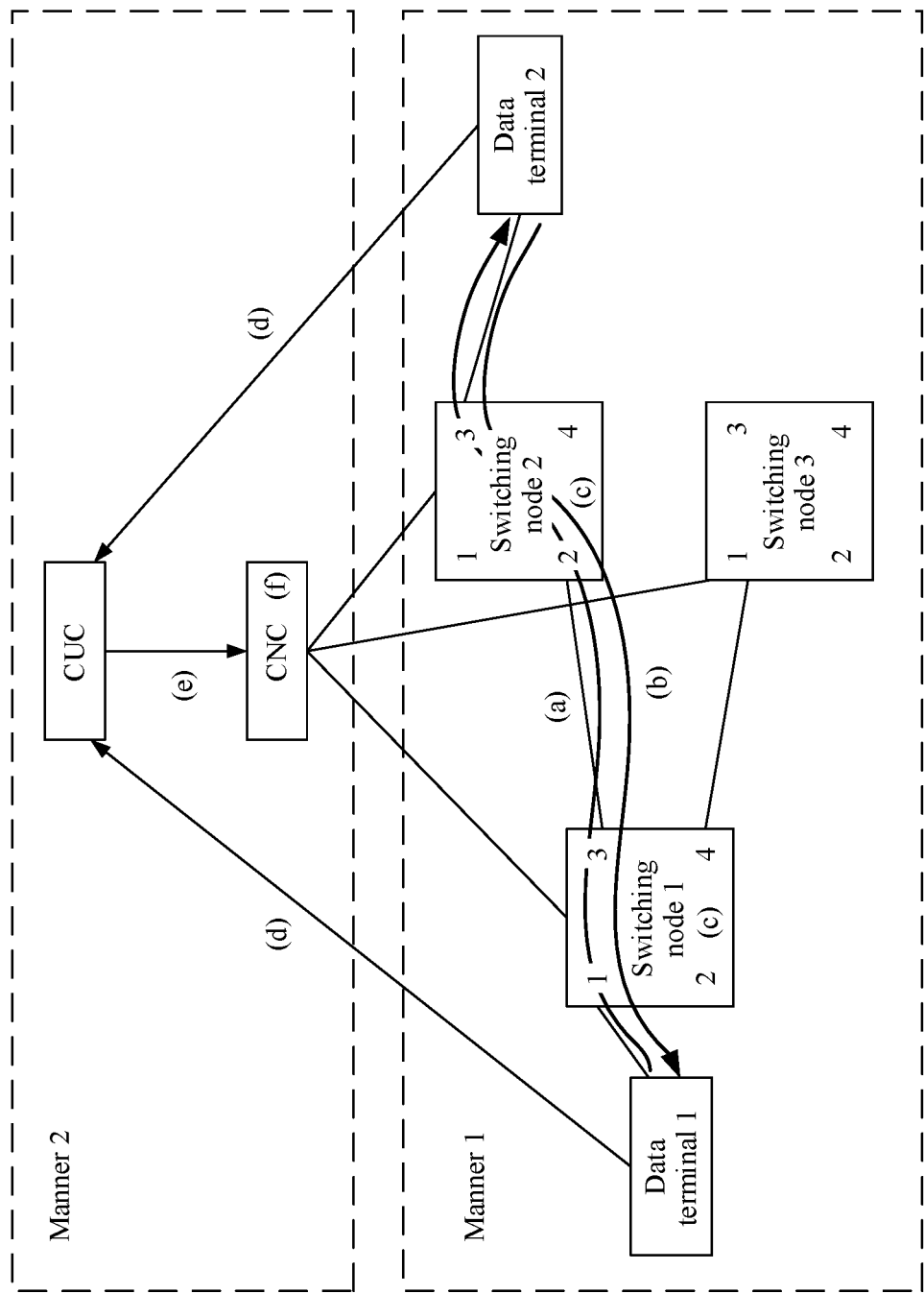
FIG. 8 is a schematic architectural diagram of a TSN network according to an embodiment of this application.

As shown in FIG. 8, a TSN network includes switching nodes (a switching node 1, a switching node 2, and a switching node 3 in the figure) and data terminals (a data terminal 1 and a data terminal 2 in the figure). A data flow in the TSN network is a unidirectional flow. For one data flow, data terminals include a transmit end (talker) and a receive end (listener). A TSN standard defines behaviors of a data terminal and a switching node and a scheduling mode used by a switching node to forward a data flow, to implement reliable-delay transmission. A switching node in the TSN network uses a destination MAC address of a packet as information for identifying a data flow, and performs resource reservation and scheduling planning based on a delay requirement of a to-be-transmitted user flow, so as to ensure a delay and reliability of packet transmission according to a generated scheduling policy.

As shown in FIG. 8, there are two resource reservation and management manners for the TSN network currently:

Manner 1: A forwarding channel is created according to the stream reservation protocol (SRP). Assuming that the data terminal 1 in the figure is a transmit end (talker), before the data terminal 1 sends a data flow, resource reservation is first performed on a switching node between the transmit end and a receive end according to the SRP protocol. Specifically, the following procedure may be included:

(a) The data terminal 1 sends an SRP request message to the switching node 1, where the SRP request message includes information for identifying a data flow, a VLAN, a class of service (CoS), delay information, and the like. The information for identifying the data flow may include a flow identifier (ID) and/or a destination MAC address of the data flow. The VLAN and the CoS are used to identify a TSN forwarding domain. The delay information is used to determine whether a forwarding path satisfies a delay requirement of the data flow. After receiving the SRP request message, the switching node 1 adds up the delay information in an SRP request and an estimated delay of the node, and then broadcasts the SRP request message through ports (ports 3 and 4) in the TSN network. Both the switching node 2 and the switching node 3 receive the SRP request message. Because only the switching node 3 and the switching node 1 are located in a same TSN network currently, the switching node 3 does not forward the SRP request message to another switching node. Because the switching node 2 and the data terminal 2 are located in a same TSN network, after receiving the SRP request message, the switching node 2 adds up the delay information in the SRP request and an estimated delay of the switching node 2, and then sends the SRP request message to the data terminal 2 through a port (the port 3) in the TSN network.

(b) After receiving the SRP request message, the data terminal 2 determines, based on the information for identifying the data flow in the SRP request message and application information, the data flow that is corresponding to the SRP request message and that needs to be received by the data terminal 2; and when the delay information satisfies a preset requirement, sends an SRP response message through a port from which the SRP request message is received. The application information may be obtained through configuration or received from another network element.

(c) After receiving the SRP response message, the switching node 2 and the switching node 1 in the TSN network reserve bandwidths and scheduled resources, and then forward the SRP response message through ports from which the SRP request message is received.

After the foregoing process is performed, a forwarding channel is created between the transmit end and the receive end, and each switching node reserves a related resource based on the SRP request; and then each switching node performs scheduling and forwarding based on the reserved resource when receiving a data flow sent by the transmit end, so as to ensure a delay and reliability of packet transmission.

Manner 2: A centralized management manner is defined by the IEEE in 802.1Qcc. A management plane includes a CUC network element and a CNC network element. The CUC network element is configured to manage a terminal and a service, for example, receive registration information from a transmit end and a receive end and switching configuration parameters of the transmit end and the receive end. The CNC network element manages a switching node in the TSN network, for example, maintains a topology of the TSN network, obtains a scheduling policy of the switching node through calculation, and delivers the scheduling policy to the switching node. Specifically, the following procedure may be included:

(d) The CUC network element receives a registration request of a data terminal that serves as a transmit end or a receive end of the TSN network, where the request includes indication information indicating whether the data terminal is a transmit end or a receive end, information for identifying a data flow, a bandwidth requirement, a delay requirement, and the like.

(e) After receiving the foregoing information, the CUC network element sends a request of creating the data flow to the CNC network element.

(f) Before creating the data flow, the CNC network element generates a topology of the TSN network, for example, a connection topology between switching nodes and a connection topology between a switching node and a data terminal. After receiving the request of creating the data flow from the CUC network element, the CNC network element obtains a forwarding path in the TSN network and a scheduling policy of each switching node on the path through calculation based on a bandwidth requirement, a delay requirement, and the like of the data flow, and then delivers the policy to the corresponding switching node.

In the embodiments of this application, the AN network element and the UPF network element are respectively a transmit end and a receive end in the TSN network that communicate with each other by using a data flow. For ease of description, in the embodiments of this application, forwarding channels for transmitting a data flow between the AN network element and the UPF network element are collectively referred to as TSN pipelines. The TSN pipelines may include a plurality of types of forwarding channels, for example, a GTP-U pipeline, a layer 2 pipeline, and a virtual transmission pipeline.

Figure 9:
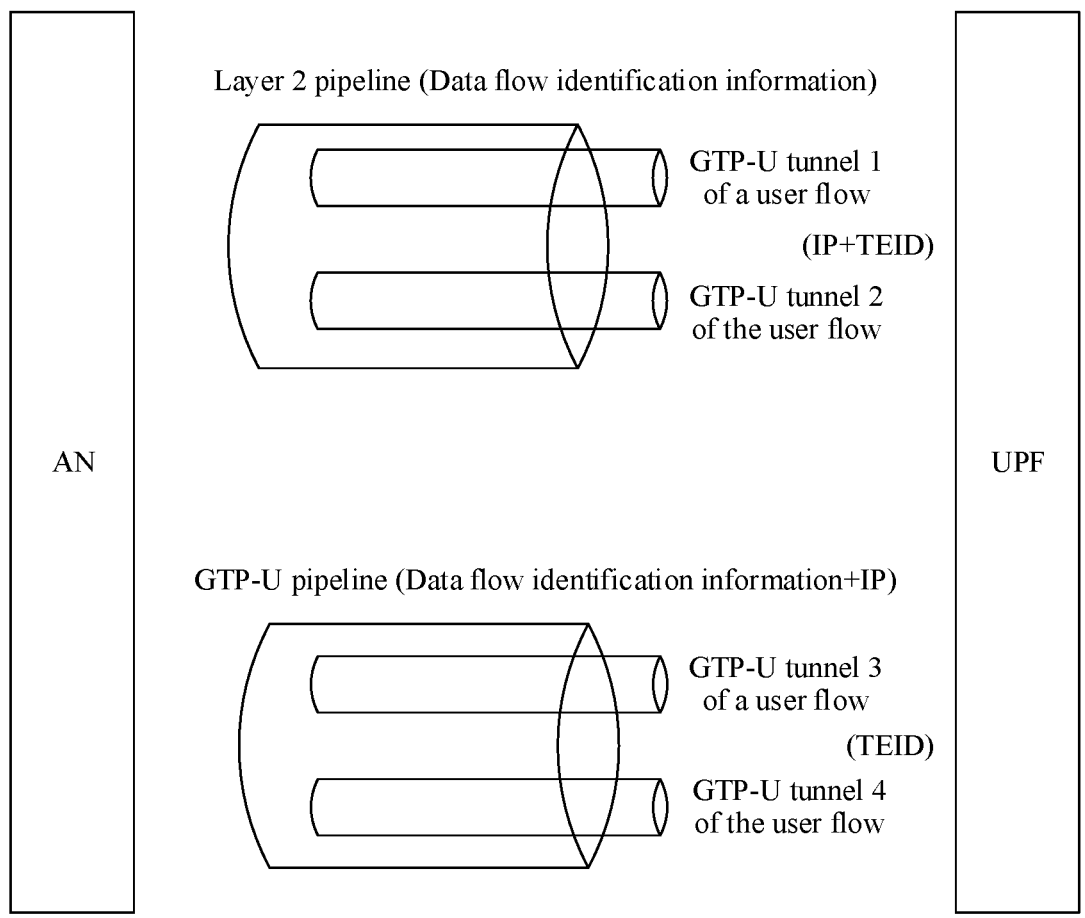
FIG. 9 is a schematic diagram of a GTP-U pipeline or a layer 2 pipeline according to an embodiment of this application.

FIG. 9 is a schematic diagram of a GTP-U pipeline or a layer 2 pipeline that is between an AN network element and a UPF network element and that is created in a TSN network. The GTP-U pipeline is a pipeline bound to IP address information of a GTP-U tunnel, and information for identifying a data flow is bound to the IP address information of the GTP-U tunnel. In other words, the GTP-U pipeline is determined by using the information for identifying the data flow and the IP address information of the GTP-U tunnel. One GTP-U pipeline may include at least one GTP-U tunnel, and each GTP-U tunnel is identified by using a tunnel endpoint identifier (TEID). The layer 2 pipeline is a pipeline bound to layer 2 information (that is, the information for identifying the data flow), and the pipeline is not bound to the IP address information of the GTP-U tunnel. In other words, the layer 2 pipeline may be determined by using the information for identifying the data flow. One layer 2 pipeline may include at least one GTP-U tunnel, and each GTP-U tunnel is identified by using a TEID and an IP address of the GTP-U tunnel.

In an embodiment, information about a TSN pipeline created by an SMF network element or a control device may be stored in an NRF network element, the control device, or another control plane network element, and is used as a basis for selecting a UPF network element or creating a GTP-U tunnel during subsequent creation of a reliable-delay data flow or session for a user. The information about the TSN pipeline may include at least one of the following: information for identifying a data flow, a device identifier of the AN network element, a device identifier of the UPF network element, a port identifier of the AN network element, a port identifier of the UPF network element, an identifier of a reliable-delay transmission network, a source IP address of a GTP-U tunnel, and a destination IP address of the GTP-U tunnel.

In an embodiment, information about a TSN pipeline may be stored in a corresponding UPF network element and AN network element, and is used as a basis for creating a GTP-U tunnel between the AN network element and the UPF network element during subsequent creation of a reliable-delay data flow or session.

In an embodiment, the NRF network element, the control device, or the another control plane network element may also store reachability information between the AN network element and the UPF network element in the TSN network, where the reachability information is used as a basis for selecting a UPF network element during creation of a user session; and the reachability information indicates a transmit end and a receive end that are located in a same reliable-delay transmission network. In an embodiment, the NRF network element, the control device, or the another network element may also store reachability information associated with the port identifier of the AN network element and the port identifier of the UPF network element, where the reachability information is used as a basis for selecting a forwarding port (for example, selecting an N3 forwarding interface for layer 2 forwarding) during creation of a session or a data flow; and the reachability information indicates a port of a transmit end and a port of a receive end that are located in a same reliable-delay transmission network. If the port of the transmit end and the port of the receive end are abstracted as devices, the reachability information may be uniformly expressed as: The reachability information is used to indicate the transmit end and the receive end that are located in a same reliable-delay transmission network. Because no GTP-U pipeline is created in this scenario, it may be considered that a virtual transmission pipeline is created.

Figure 10:
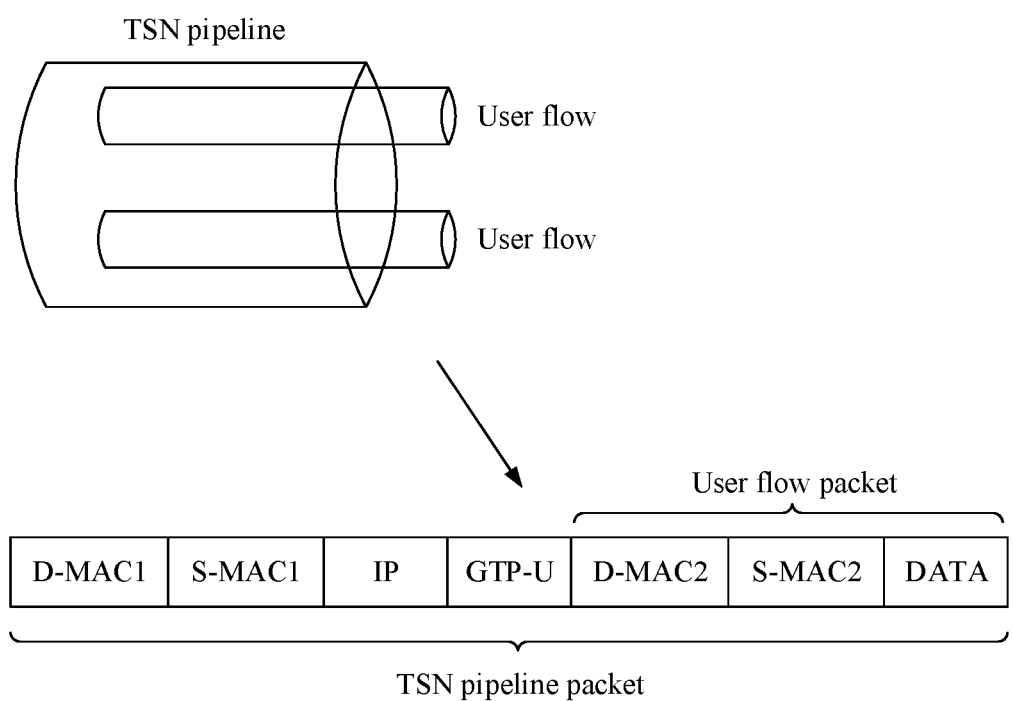
FIG. 10 is a schematic diagram of a TSN pipeline packet according to an embodiment of this application.

A TSN pipeline packet may carry an IP packet, an Ethernet packet, or the like. As shown in FIG. 10, an outer encapsulation part of the TSN pipeline packet includes a source MAC address (S-MAC1), a destination MAC address (D-MAC1), an IP address (IP) of a GUP-U tunnel, and a TEID (GTU-U) of the GUP-U tunnel. The source MAC address (S-MAC1) and the destination MAC address (D-MAC1) are MAC addresses used to transmit a packet between an AN network element and a UPF network element, and may be addresses allocated by a control device, an SMF network element, or a CUC network element, or a MAC address of the AN network element and/or a MAC address of the UPF network element. The IP address and the TEID of the GTP-U tunnel are determined by the SMF network element or the UPF network element, and are used to determine a layer 2 pipeline. An inner payload part encapsulated in the TSN pipeline packet is a user flow packet, including a destination MAC address (D-MAC2), a source MAC address (S-MAC2), and a data part (DATA). Ethernet encapsulation is used as an example. The source MAC address (S-MAC2) and the destination MAC address (D-MAC2) in the user flow packet are MAC addresses used to transmit a packet in an access network and/or a DN network. In this embodiment of this application, information for identifying a data flow includes a flow identifier (ID) of the data flow and/or a destination MAC address (D-MAC1) of a TSN pipeline packet. For example, the flow identifier (ID) may include a source MAC address (S-MAC1) of the TSN pipeline packet and numbers of two bytes used as the identifier.

An embodiment of this application provides a communication method. A control device determines a transmit end and a receive end in a TSN network that communicate with each other by using a data flow, and determines bandwidth information of the data flow; and the control device sends, to another network element, the bandwidth information of the data flow and port identifiers of ports used when the transmit end and the receive end communicate with each other by using the data flow. In this way, an NRF network element, the control device, or another control plane network element, and an AN network element and a UPF network element that respectively serve as the transmit end and the receive end can learn basic information about a TSN pipeline for transmitting the data flow, thereby establishing the TSN pipeline between the AN network element and the UPF network element. When a reliable-delay data flow or session is subsequently created for a user, the data flow or the session is transmitted between the AN network element and the UPF network element through the TSN pipeline. This avoids a case in which a forwarding path is indeterminate during packet forwarding performed based on an IP route, thereby ensuring a delay and reliability of packet transmission between the AN network element and the UPF network element.

The information about the TSN pipeline stored in the AN network element, the UPF network element, the NRF network element, the control device, or the another control plane network element may include:

information about a GTP-U pipeline between the AN network element and the UPF network element, where the information about the GTP-U pipeline may include at least one of the following: a device identifier of the AN network element, a device identifier of the UPF network element, transmission delay information, and information for identifying a data flow. For example, information about a GTP-U pipeline is (UPF1, AN1, 10 ms, 012a.3322.00af), where UPF1 and AN1 are device identifiers, 10 ms indicates a maximum transmission delay of the GTP-U pipeline between a UPF1 network element and an AN1 network element, and 012a.3322.00af indicates information for identifying a data flow.

For reachability information between the AN network element and the UPF network element in the TSN network, the reachability information may include the device identifier of the AN network element and the device identifier of the UPF network element, or may include an identifier of the TSN network and the device identifiers/device identifier of the AN network element and/or the UPF network element in the TSN network. For example, (UPF1, AN1, AN2, ...) indicates that a UPF1 network element, an AN1 network element, an AN2 network element, and the like are in a same TSN network. (TSN1, UPF1, UPF2, ...) indicates that the UPF1 network element, a UPF2 network element, and the like are in a same TSN network and that an identifier of the TSN network is TSN1.

For reachability information associated with a port identifier of the AN network element and a port identifier of the UPF network element, the reachability information may include the device identifier and the port identifier of the AN network element and/or the device identifier and the port identifier of the UPF network element; or may include an identifier of the TSN network and the port identifiers/port identifier of the AN network element and/or the UPF network element in the TSN network. For example, {(UPF1, p1, p2, ...), (AN1, p1, p2, ...)} indicates that ports p1, p2, and the like of a UPF1 network element and ports p1 and p2 of an AN1 network element are in a same TSN network. (TSN1, (UPF1, p1, p2, ...)) indicates that the ports p1, p2, and the like of the UPF1 network element are in a same TSN network, and an identifier of the network is TSN1.

In an embodiment of this application, in a configuration, a policy, or an orchestration, the configuration means a static configuration of some or all of information about a TSN pipeline in a device before the device runs a function, and is a static configuration; the policy means that the device generates some or all of the information about the TSN pipeline based on a specific condition; and the orchestration means obtaining some or all of the information about the TSN pipeline from an orchestration layer (for example, according to an instruction from the orchestration layer).

In an embodiment of this application, first indication information is used to indicate that a first device is the transmit end, and second indication information is used to indicate that a second device is the receive end; or the first indication information is used to indicate that the first device is the receive end, and the second indication information is used to indicate that the second device is the transmit end. It should be noted that the first indication information and the second indication information may be one piece of indication information. In other words, the indication information is used to indicate that one of the first device and the second device is the transmit end, and the other device is the receive end. In this embodiment of this application, a description is provided in a manner in which the first indication information and the second indication information are separated each other for indication. However, the description manner is not limited in this embodiment of this application. It should be noted that for a same TSN pipeline, the first device and the second device cannot be both a transmit end or a receive end. In other words, one of the first device and the second device is a transmit end, and the other device is a receive end.

In an embodiment of this application, the first device and the second device may be data terminals in the TSN network, the first device may be an AN network element, and the second device may be a UPF network element; or the first device may be a UPF network element, and the second device may be an AN network element. If the AN network element is a transmit end, and the UPF network element is a receive end, uplink transmission is performed. If the UPF network element is a transmit end, and the AN network element is a receive end, downlink transmission is performed.

Figure 11A:
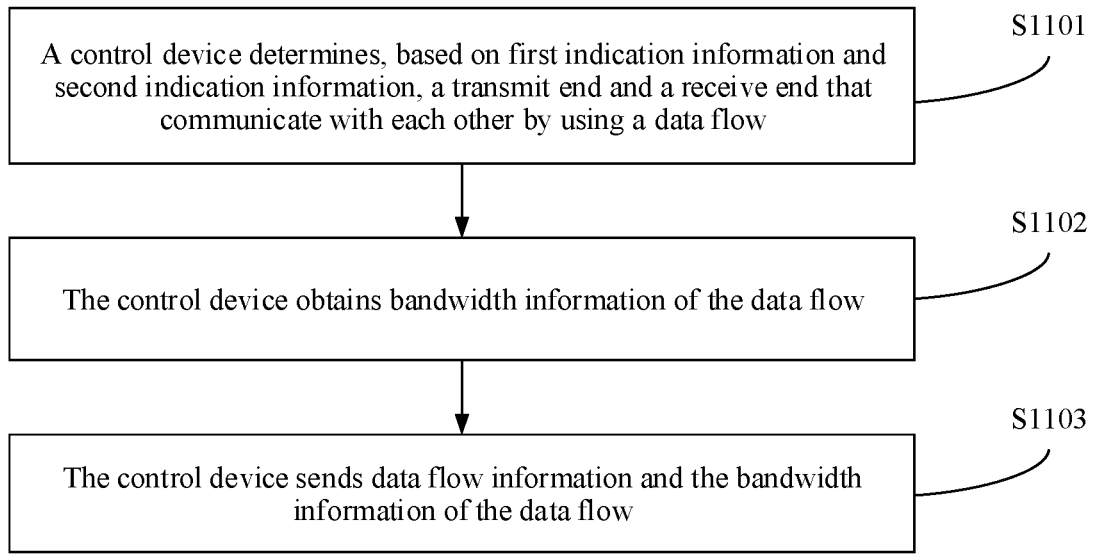
FIG. 11A is a schematic flowchart 1 of a communication method according to an embodiment of this application.

Referring to FIG. 11A, the method includes at least operations S1101 to S1103.

S1101. The control device determines, based on first indication information and second indication information, a transmit end and a receive end that communicate with each other by using a data flow.

The control device may learn, based on the first indication information and the second indication information, which one serves as the transmit end and which one serves as the receive end in a first device and a second device that communicate with each other by using the data flow.

In an embodiment, the first device may send the first indication information to the control device, and the control device may receive the first indication information from the first device; and/or the second device may send the second indication information to the control device, and the control device may receive the second indication information from the second device. For example, the first indication information may be configured in the first device. If the first device registers with the control device, a registration request message may include the first indication information. The control device may determine the second indication information based on a configuration, a policy, or an orchestration. Alternatively, the second indication information may be configured in the second device. If the second device registers with the control device, a registration request message may include the second indication information.

In an embodiment, if the control device and an SMF network element are network elements that are separately deployed, the control device may receive the first indication information and the second indication information from the SMF network element. It should be noted that, because user session information includes a device identifier of an AN network element, an identifier of a UPF network element, and a direction of a user flow, the SMF network element may determine the first indication information and the second indication information based on the user session information.

In an embodiment, the control device may obtain the first indication information and the second indication information based on a configuration, a policy, or an orchestration.

In an embodiment, the control device may send the first indication information to the first device, and correspondingly the first device may receive the first indication information from the control device. For example, if the control device does not receive the first indication information from the first device, the control device may obtain the first indication information based on a configuration, a policy, or an orchestration, and send the first indication information to the first device.

In an embodiment, the control device may send the second indication information to the second device, and correspondingly the second device may receive the second indication information from the control device. For example, if the control device does not receive the second indication information from the second device, the control device may obtain the second indication information based on a configuration, a policy, or an orchestration, and send the second indication information to the second device.

The data flow may include first information for identifying the data flow, where the first information is used to instruct the transmit end to send data by using the data flow, and is further used to instruct the receive end to receive the data by using the data flow. The first information may include a flow identifier (ID) and/or a destination MAC address of the data flow. In other words, the first information may implicitly indicate the data flow. For example, the first information instructs the receive end to determine, based on the destination MAC address of the data flow, whether the data flow is sent to the receive end. Alternatively, the first information may explicitly indicate the data flow. For example, if the first information instructs to create a data flow whose flow identifier is flow1 between the transmit end and the receive end, the transmit end may send the data flow based on the flow identifier flow1, and the receive end may receive the data flow based on the flow identifier flow1. The AN network element, the UPF network element, an NRF network element, the control device, or another control plane network element may learn the corresponding data flow based on the first information.

In an embodiment, the transmit end and/or the receive end may send the first information to the control device, and correspondingly the control device may receive the first information from the transmit end and/or the receive end. For example, the first information may be configured in the transmit end and/or the receive end. If the transmit end and/or the receive end register/registers with the control device, a registration request message may include the first information.

In an embodiment, the control device may obtain the first information based on a configuration, a policy, or an orchestration.

In an embodiment, the control device may receive the first information from a CUC network element. The first information may be allocated by the CUC network element.

S1102. The control device obtains bandwidth information of the data flow.

The control device may learn, based on the bandwidth information of the data flow, a maximum bandwidth of user data that can be carried by the data flow.

The bandwidth information of the data flow may be represented in a plurality of forms, and may include a maximum bandwidth. For example, the bandwidth information of the data flow may be represented as 1 Gbps. Alternatively, the bandwidth information of the data flow may include a packet sending interval, a maximum quantity of packets in an interval, and a maximum packet length. For example, the bandwidth of 1 Gbps may be represented as a packet sending interval of 1 millisecond, a maximum quantity 1000 of packets in an interval, or a maximum packet length of 1K bytes.

In an embodiment, the control device may receive the bandwidth information of the data flow from the transmit end and/or the receive end. For example, the bandwidth information of the data flow may be configured in the transmit end and/or the receive end. If the transmit end and/or the receive end register/registers with the control device, a registration request message may include the bandwidth information of the data flow.

In an embodiment, the control device may obtain the bandwidth information of the data flow based on a configuration, a policy, or an orchestration.

In an embodiment, the control device may receive the bandwidth information of the data flow from the transmit end and/or the receive end.

S1103. The control device sends data flow information and the bandwidth information of the data flow.

The data flow information is used to indicate at least one of a port identifier of the transmit end and a port identifier of the receive end, and the port identifier of the transmit end, the port identifier of the receive end, and the bandwidth information are used to create the data flow. The data flow information may include at least one of the port identifier of the transmit end and the port identifier of the receive end; or the data flow information may include an identifier of a reliable-delay transmission network, where the identifier of the reliable-delay transmission network is associated with the port identifier of the transmit end and the port identifier of the receive end. The control device may learn, based on the port identifier of the transmit end and the port identifier of the receive end, ports used when the transmit end and the receive end communicate with each other by using the data flow.

In an embodiment, the transmit end may send the port identifier of the transmit end to the control device, and correspondingly the control device may receive the port identifier of the transmit end from the transmit end. For example, the port identifier of the transmit end may be configured in the transmit end. If the transmit end registers with the control device, a registration request message may include the port identifier of the transmit end. The receive end may send the port identifier of the receive end to the control device, and correspondingly the control device may receive the port identifier of the receive end from the receive end. For example, the port identifier of the receive end may be configured in the receive end. If the receive end registers with the control device, a registration request message may include the port identifier of the receive end.

In an embodiment, the control device may receive a device identifier of the transmit end and a device identifier of the receive end from the SMF network element. The control device obtains topology information of a reliable-delay transmission network, where the topology information includes a correspondence between the device identifier of the transmit end and the port identifier of the transmit end, and may further include a correspondence between the device identifier of the receive end and the port identifier of the receive end. For example, the control device may receive the topology information of the reliable-delay transmission network from the CUC network element. The control device obtains the port identifier of the transmit end and the port identifier of the receive end based on the device identifier of the transmit end, the device identifier of the receive end, and the topology information.

In an embodiment, the control device may send the data flow information to the CUC network element.

In an embodiment, the control device may send the data flow information to the transmit end, where the data flow information is used to instruct the transmit end to send a stream reservation protocol SRP request message to the receive end through a port corresponding to the port identifier of the transmit end, and the SRP request message is used to trigger creation of the data flow. Correspondingly, the transmit end may receive the data flow information from the control device. In this implementation, the data flow information may include only the port identifier of the transmit end.

In an embodiment, the control device may send the data flow information to the receive end, where the data flow information is used to instruct the receive end to send an SRP response message to the transmit end through a port corresponding to the port identifier of the receive end, and the SRP response message is used to respond to an SRP request message from the transmit end. Correspondingly, the receive end may receive the data flow information from the control device. In this implementation, the data flow information may include only the port identifier of the receive end.

In an embodiment, the control device may send the bandwidth information of the data flow to the transmit end and/or the receive end. Correspondingly, the transmit end and/or the receive end (the first device and/or the second device) may receive the bandwidth information of the data flow from the control device. For example, if the first device sends the bandwidth information of the data flow when registering with the control device and the second device does not send the bandwidth information of the data flow when registering with the control device, the control device may send the bandwidth information of the data flow to the second device. Alternatively, if neither the first device nor the second device sends the bandwidth information of the data flow to the control device when registering with the control device, the control device may obtain the bandwidth information of the data flow based on a configuration, a policy, or an orchestration, and send the bandwidth information of the data flow to the first device and the second device.

In an embodiment, the control device may send the bandwidth information of the data flow to the CUC network element, where the bandwidth information of the data flow is used to enable the created data flow to satisfy a bandwidth requirement when the CUC network element creates the data flow. For example, after receiving the bandwidth information of the data flow from the transmit end and/or the receive end or after obtaining the bandwidth information of the data flow based on the configuration, the policy, or the orchestration, the control device may send the bandwidth information of the data flow to the CUC network element.

In an embodiment, the control device may send the first information to the CUC network element. For example, after receiving the first information from the transmit end and/or the receive end or obtaining the first information based on the configuration, the policy, or the orchestration, the control device may send the first information to the CUC network element.

In an embodiment, the control device may send the first information to the transmit end and/or the receive end. For example, after receiving the first information from the CUC network element or obtaining the first information based on the configuration, the policy, or the orchestration, the control device may send the first information to the transmit end and/or the receive end. Alternatively, after receiving the first information from the first device, the control device may send the first information to the second device. Alternatively, after receiving the first information from the second device, the control device may send the first information to the first device.

According to the communication method provided in an embodiment of this application, the control device determines the transmit end and the receive end that communicate with each other by using the data flow, and determines the bandwidth information of the data flow; and the control device sends, to the another network element, the bandwidth information of the data flow and the port identifiers of the ports used when the transmit end and the receive end communicate with each other by using the data flow. In this way, the NRF network element, the control device, or the another control plane network element, and the AN network element and the UPF network element that respectively serve as the transmit end and the receive end can learn information about a TSN pipeline for transmitting the data flow, thereby establishing the TSN pipeline between the AN network element and the UPF network element. When a reliable-delay data flow or session is subsequently created for a user, the data flow or the session is transmitted between the AN network element and the UPF network element through the TSN pipeline. This avoids a case in which a forwarding path is indeterminate during packet forwarding performed based on an IP route, thereby ensuring a delay and reliability of packet transmission between the AN network element and the UPF network element.

Figure 11B:
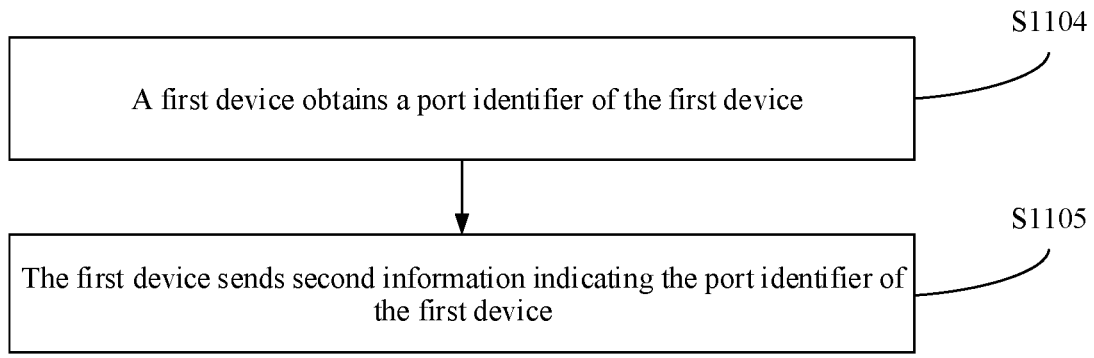
FIG. 11B is a schematic flowchart 2 of a communication method according to an embodiment of this application.

As shown in FIG. 11B, a communication method may include S1104 and S1105. It should be noted that a first device is used as an example for description in FIG. 11B. In addition, the method shown in FIG. 11B is also applicable to a second device (a receive end that performs communication by using a data flow). Details are not described.

S1104. The first device obtains a port identifier of the first device.

The first device may be a transmit end that performs communication by using a data flow. The first device may be an AN network element or a UPF network element.

In an embodiment, the first device may obtain the port identifier of the first device based on a configuration.

In an embodiment, the first device may receive an identifier of a reliable-delay transmission network from a control device. As described in operation S1103, the identifier of the reliable-delay transmission network is associated with the port identifier of the transmit end and the port identifier of the receive end. Therefore, the first device may obtain the port identifier of the first device based on the identifier of the reliable-delay transmission network.

Alternatively, in another embodiment, the first device may receive the port identifier of the first device from the control device.

It should be noted that the identifier of the reliable-delay transmission network or the port identifier of the first device may be carried in data flow information.

S1105. The first device sends second information indicating the port identifier of the first device.

The port identifier of the first device is used to create a data flow. The second information may implicitly or explicitly indicate the port identifier of the first device.

In an implicit manner, the first device may send the identifier of the reliable-delay transmission network to the control device, where the identifier of the reliable-delay transmission network is associated with the port identifier of the first device.

In an explicit manner, in a possible implementation, if the first device does not receive the port identifier of the first device from the control device, the first device may send the port identifier of the first device to the control device. The port identifier of the first device may be stored in a control network element, an NRF network element, or another control plane network element as a part of information about a TSN pipeline. The control network element may store only first information and device identifiers of a transmit end and a receive end.

In an embodiment, the first device may further send an SRP request message to the second device through a port corresponding to the port identifier of the first device. The SRP request message is used to trigger creation of the data flow. In this case, the first device is a transmit end, and the second device is a receive end.

Similarly, for the second device as a receive end, the second device may send an SRP response message to the first device through a port corresponding to a port identifier of the second device. The SRP response message is used to respond to the SRP request message from the first device.

According to the communication method provided in an embodiment of this application, an AN network element and a UPF network element that respectively serve as the transmit end and the receive end can learn port identifiers of ports used when the AN network element and the UPF network element communicate with each other by using the data flow, and indicate the port identifiers. When the AN network element and the UPF network element subsequently create a reliable-delay data flow or session based on the port identifiers, the data flow or the session is transmitted between the AN network element and the UPF network element through a TSN pipeline. This avoids a case in which a forwarding path is indeterminate during packet forwarding performed based on an IP route, thereby ensuring a delay and reliability of packet transmission between the AN network element and the UPF network element.

That the AN network element is the first device and the UPF network element is the second device is used as an example for description in this embodiment of this application. It can be understood that, alternatively, the AN network element may be the second device, and the UPF network element may be the first device.

FIG. 12A, FIG. 12B, and FIG. 12C to FIG. 16 show several implementations of the communication methods shown in FIG. 11A and FIG. 11B. In an implementation in FIG. 12A, FIG. 12B, and FIG. 12C, the control device may receive the port identifier of the transmit end, the port identifier of the receive end, the first indication information, and the second indication information from the transmit end and the receive end, and then perform a process of Manner 1 or Manner 2 in FIG. 8 to establish a TSN pipeline. In an implementation in FIG. 13A, FIG. 13B, and FIG. 13C, the control device may obtain the first indication information and the second indication information based on a configuration, a policy, or an orchestration, and determine, based on the first indication information and the second indication information, the transmit end and the receive end that communicate with each other by using the data flow; and then perform a process of Manner 1 or Manner 2 in FIG. 8 to establish a TSN pipeline. In an embodiment in FIG. 14 A, FIG. 14B, and FIG. 14C, the control device may receive the port identifier of the transmit end and the port identifier of the receive end from the transmit end and the receive end, and obtain the first indication information and the second indication information based on a configuration, a policy, or an orchestration or receive the first indication information and the second indication information from the SMF network element; and then perform a process of Manner 1 or Manner 2 in FIG. 8 to establish a TSN pipeline. In an implementation in FIG. 15A, FIG. 15B, and FIG. 15C the control device may receive the device identifier of the transmit end, the device identifier of the receive end, the first indication information, and the second indication information from the SMF network element, receive the topology information of the reliable-delay transmission network from the CUC network element, obtain the port identifier of the transmit end and the port identifier of the receive end based on the device identifier of the transmit end, the device identifier of the receive end, and the topology information, and then perform a process of Manner 1 or Manner 2 in FIG. 8 to establish a TSN pipeline. In an implementation in FIG. 16 A, and FIG. 16B, the control device sends the port identifiers of the transmit end and the receive end to the transmit end and the receive end, and instructs the transmit end and the receive end to register with the CUC network element based on the port identifiers, to establish a TSN pipeline.

Figure 12A:
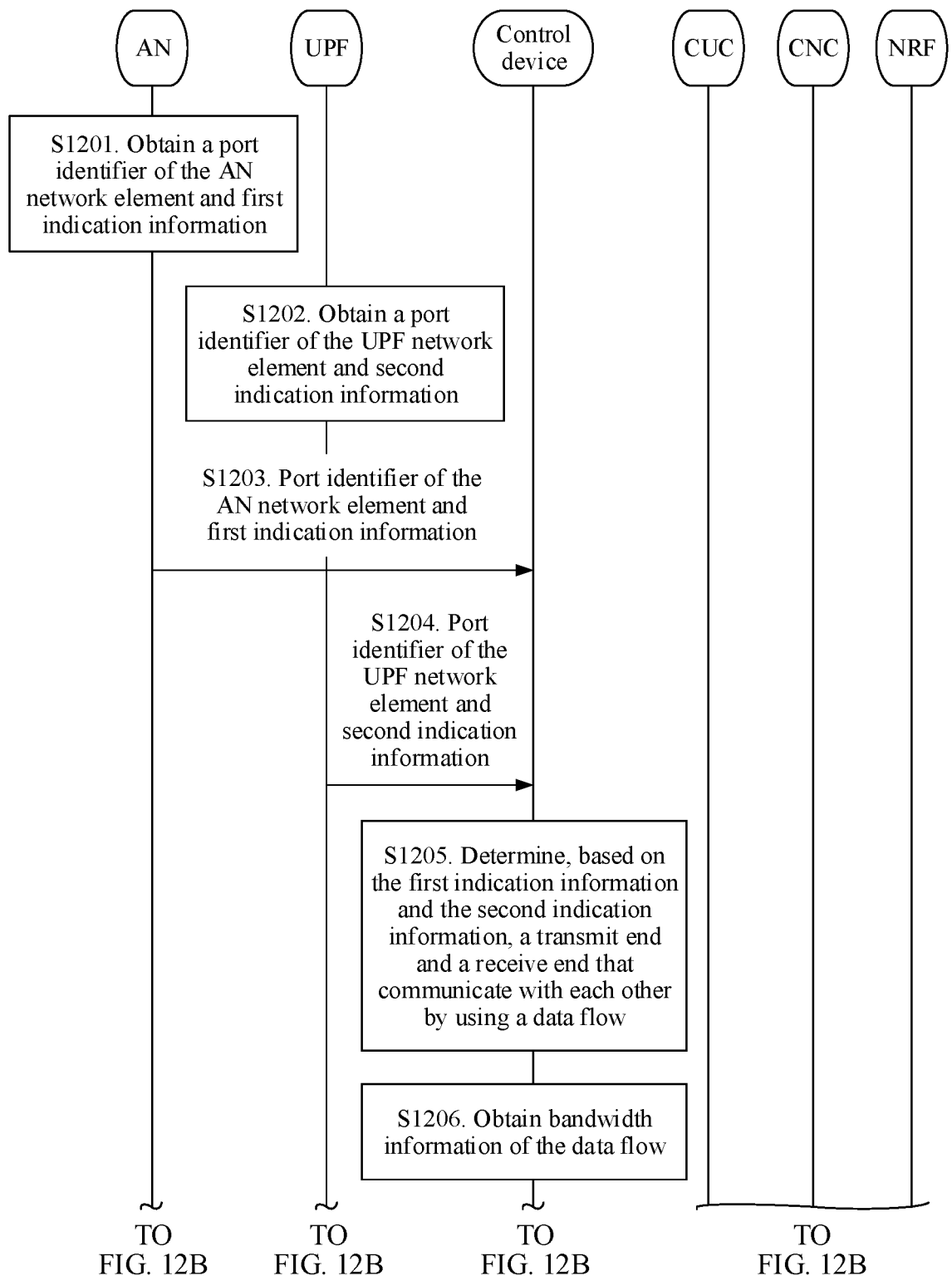
FIG. 12A, FIG. 12B, and FIG. 12C are schematic flowchart 3 of a communication method according to an embodiment of this application.
Figure 12B:
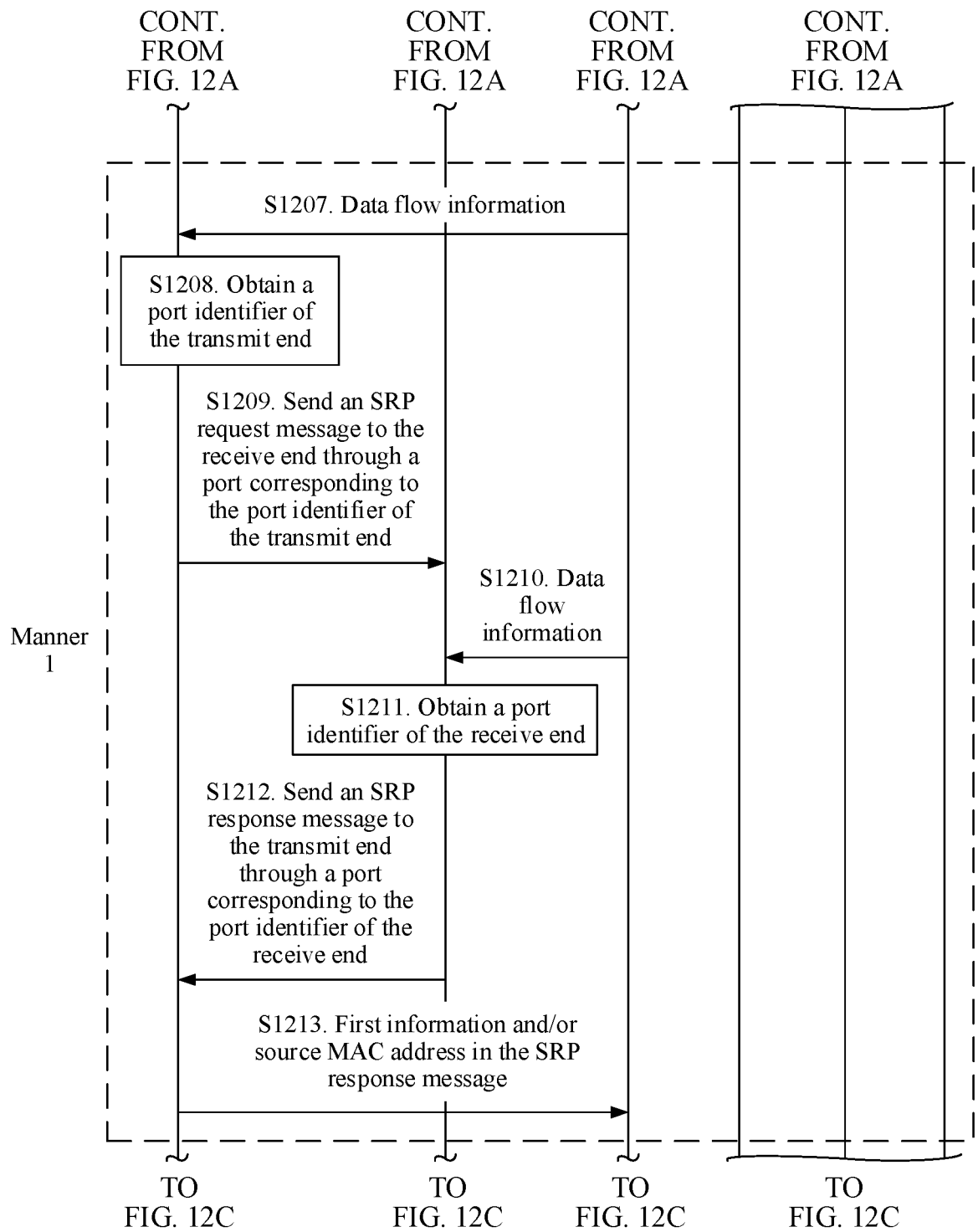
Figure 12C:
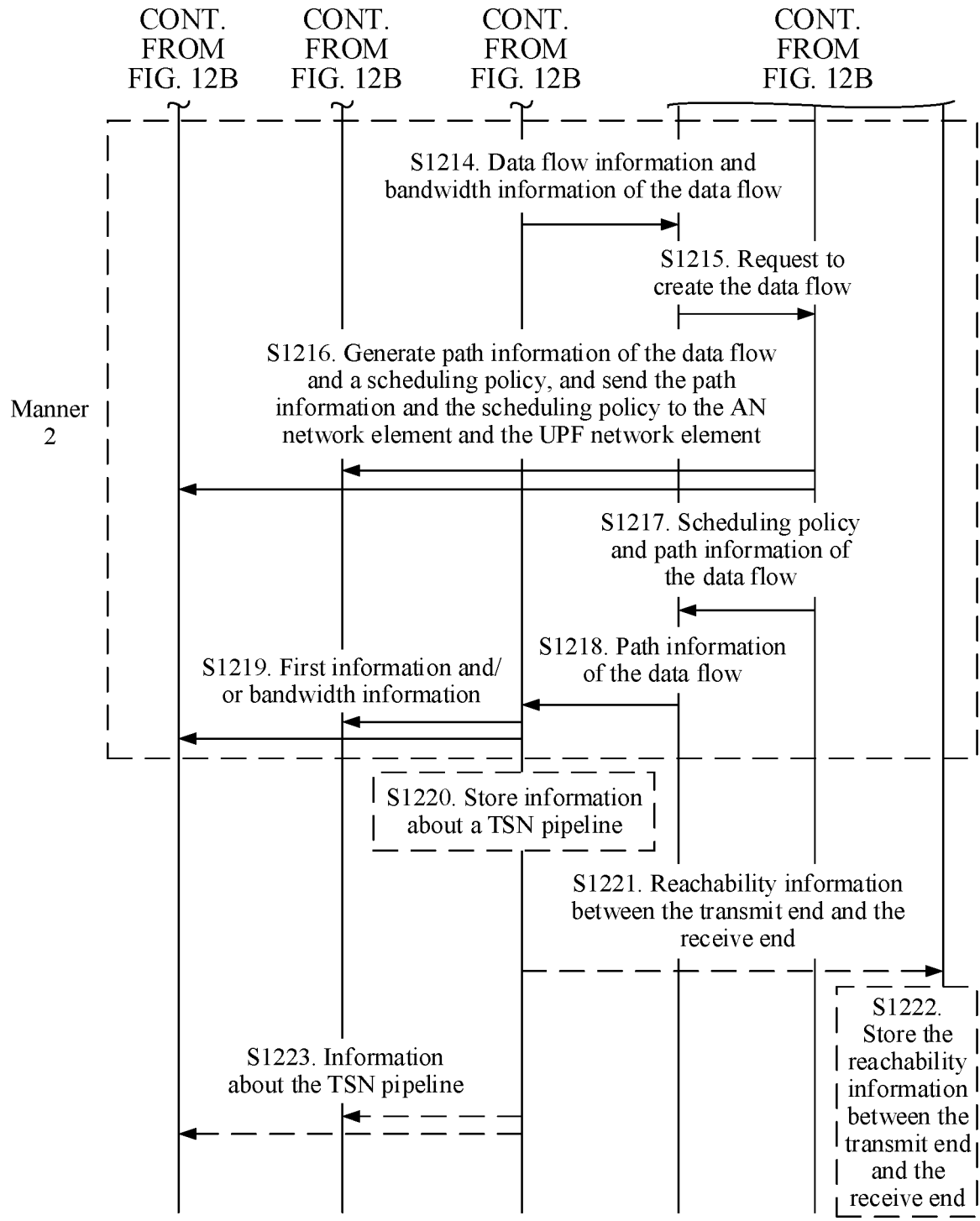

As shown in FIG. 12A, FIG. 12B, and FIG. 12C, if the TSN pipeline is created in Manner 1 shown in FIG. 8, the method may include operations S1201 to S1213. If the forwarding channel is created in Manner 2 shown in FIG. 8, the method may include operations S1201 to S1206 and S1214 to S1219.

S1201. An AN network element obtains a port identifier of the AN network element and first indication information.

The first indication information and the port identifier of the AN network element in a TSN network may be configured in the AN network element. The AN network element obtains the first indication information and the port identifier of the AN network element in the TSN network based on the configuration.

S1202. A UPF network element obtains a port identifier of the UPF network element and second indication information.

The second indication information and the port identifier of the UPF network element in the TSN network may be configured in the UPF network element. The UPF network element obtains the second indication information and the port identifier of the UPF network element in the TSN network based on the configuration.

The first indication information is used to indicate that the AN network element is a transmit end, and the second indication information is used to indicate that the UPF network element is a receive end. Alternatively, the first indication information is used to indicate that the AN network element is a receive end, and the second indication information is used to indicate that the UPF network element is a transmit end. In other words, one of the AN network element and the UPF network element is configured as a transmit end, and the other network element is configured as a receive end.

In an embodiment, the AN network element and/or the UPF network element obtain/obtains first information. The first information may be configured in the AN network element and/or the UPF network element. The AN network element and/or the UPF network element obtain/obtains the first information based on the configuration.

In an embodiment, the AN network element and/or the UPF network element obtain/obtains bandwidth information of a data flow. The bandwidth information of the data flow may be configured in the AN network element and/or the UPF network element. The AN network element and/or the UPF network element obtain/obtains the bandwidth information of the data flow based on the configuration.

In an embodiment, the AN network element and/or the UPF network element obtain/obtains an IP address corresponding to a TSN pipeline. Specifically, the IP address corresponding to the TSN pipeline may further be configured in the AN network element and/or the UPF network element. The AN network element and/or the UPF network element obtain/obtains, based on the configuration, the IP address corresponding to the TSN pipeline. The IP address corresponding to the TSN pipeline is used to indicate a correspondence between a GTP-U pipeline (a type of TSN pipeline) and an IP address of a GTP-U tunnel. During subsequent creation of a reliable-delay data flow or session, a TSN pipeline and an IP address of a corresponding GTP-U tunnel are allocated. If the TSN pipeline is a layer 2 pipeline, the IP address corresponding to the TSN pipeline does not need to be obtained.

For specific descriptions about the first information and the TSN pipeline, refer to the foregoing embodiments of this application. Details are not described herein again.

S1203. The AN network element sends the port identifier of the AN network element and the first indication information to the control device.

Correspondingly, the control device receives the port identifier of the AN network element and the first indication information from the AN network element.

In an embodiment, the AN network element may send a first registration request message to the control device, where the first registration request message includes the port identifier of the AN network element and the first indication information. Correspondingly, the control device receives the first registration request message from the AN network element.

In this operation, the AN network element explicitly sends, to the control device, second information indicating the port identifier of the AN network element.

S1204. The UPF network element sends the port identifier of the UPF network element and the second indication information to the control device.

Correspondingly, the control device receives the port identifier of the UPF network element and the second indication information from the UPF network element.

In an embodiment, the UPF network element may send a second registration request message to the control device, where the second registration request message includes the port identifier of the UPF network element and the second indication information. Correspondingly, the control device receives the second registration request message from the UPF network element.

In an embodiment, the first registration request message and/or the second registration request message may further include the first information. Correspondingly, the control device may receive the first information from the AN network element and/or the UPF network element.

In an embodiment, the first registration request message and/or the second registration request message may further include the bandwidth information of the data flow. Correspondingly, the control device may receive the bandwidth information of the data flow from the AN network element and/or the UPF network element.

In an embodiment, the first registration request message and/or the second registration request message may further include the IP address corresponding to the TSN pipeline. Correspondingly, the control device may receive, from the AN network element and/or the UPF network element, the IP address corresponding to the TSN pipeline.

In this operation, the UPF network element explicitly sends, to the control device, second information indicating the port identifier of the UPF network element.

S1205. The control device determines, based on the first indication information and the second indication information, a transmit end and a receive end that communicate with each other by using the data flow.

In other words, the control device may determine, based on the first indication information and the second indication information, that one of the AN network element and the UPF network element is the transmit end, and the other network element is the receive end.

In a possible implementation, the control device may obtain the first information based on a configuration, a policy, or an orchestration.

The control device may store a correspondence between the data flow, the AN network element, and the UPF network element.

S1206. The control device obtains the bandwidth information of the data flow.

In a possible implementation, the control device may receive the bandwidth information of the data flow from the AN network element and/or the UPF network element.

In an embodiment, the control device may obtain the bandwidth information of the data flow based on a configuration, a policy, or an orchestration.

S1207. The control device sends data flow information to the transmit end.

Correspondingly, the transmit end receives the data flow information from the control device. In an embodiment, the control device sends the bandwidth information of the data flow to the transmit end, and correspondingly the transmit end receives the bandwidth information of the data flow from the control device.

Operations S1207 to S1213, S1216, S1219, and S1223 in FIG. 12A, FIG. 12B, and FIG. 12C are described by using an example in which the AN network element serves as the transmit end and the UPF network element serves as the receive end. This is the same with a case in which the UPF network element serves as the transmit end and the AN network element serves as the receive end. Details are not described again.

The data flow information may include a port identifier of the transmit end or an identifier of a reliable-delay transmission network, where the identifier of the reliable-delay transmission network may be associated with the port identifier of the transmit end. The identifier of the reliable-delay transmission network may be from the AN network element or the UPF network element.

If the AN network element is the transmit end, the control device sends the data flow information and the bandwidth information of the data flow to the AN network element, where the data flow information may include the port identifier of the AN network element or the identifier of the reliable-delay transmission network. If the UPF network element is the transmit end, the control device sends the data flow information and the bandwidth information of the data flow to the UPF network element, where the data flow information may include the port identifier of the UPF network element or the identifier of the reliable-delay transmission network.

In an embodiment, the control device may further send the first information to the transmit end. Correspondingly, the transmit end receives the first information from the control device.

In an embodiment, if the AN network element is the transmit end, the control device may send the first indication information to the AN network element. Correspondingly, the AN network element receives the first indication information from the control device. If the UPF network element is the transmit end, the control device may send the second indication information to the UPF network element. Correspondingly, the UPF network element receives the second indication information from the control device.

S1208. The transmit end obtains the port identifier of the transmit end.

If the data flow information includes the identifier of the reliable-delay transmission network, the transmit end receives the identifier of the reliable-delay transmission network from the control device, and the transmit end may obtain the port identifier of the transmit end based on the identifier of the reliable-delay transmission network. Alternatively, if the data flow information includes the port identifier of the transmit end, the transmit end receives the port identifier of the transmit end from the control device.

S1209. The transmit end sends an SRP request message to the receive end through a port corresponding to the port identifier of the transmit end.

The SRP request message is used to trigger creation of the data flow. In this operation, the transmit end implicitly sends, to the receive end, second information indicating the port identifier of the transmit end.

Optionally, the method may include operations S1210 to S1212.

S1210. The control device sends the data flow information to the receive end.

Correspondingly, the receive end receives the data flow information from the control device. Optionally, the control device sends the bandwidth information of the data flow to the receive end, and correspondingly the receive end receives the bandwidth information of the data flow from the control device.

The data flow information may include a port identifier of the receive end or an identifier of a reliable-delay transmission network. The identifier of the reliable-delay transmission network may be associated with the port identifier of the receive end.

If the AN network element is the receive end, the control device sends the data flow information and the bandwidth information of the data flow to the AN network element, where the data flow information may include the port identifier of the AN network element or the identifier of the reliable-delay transmission network. If the UPF network element is the receive end, the control device sends the data flow information and the bandwidth information of the data flow to the UPF network element, where the data flow information may include the port identifier of the UPF network element or the identifier of the reliable-delay transmission network.

In an embodiment, the control device may further send the first information to the receive end. Correspondingly, the receive end receives the first information from the control device.

In an embodiment, if the AN network element is the receive end, the control device may send the first indication information to the AN network element. Correspondingly, the AN network element receives the first indication information from the control device. If the UPF network element is the receive end, the control device may send the second indication information to the UPF network element. Correspondingly, the UPF network element receives the second indication information from the control device.

It should be noted that there is no execution sequence between operations S1209 and S1210.

S1211. The receive end obtains the port identifier of the receive end.

If the data flow information includes the identifier of the reliable-delay transmission network, the receive end receives the identifier of the reliable-delay transmission network from the control device, and the receive end may obtain the port identifier of the receive end based on the identifier of the reliable-delay transmission network. Alternatively, if the data flow information includes the port identifier of the receive end, the receive end receives the port identifier of the receive end from the control device.

S1212. The receive end sends an SRP response message to the transmit end through a port corresponding to the port identifier of the receive end.

The SRP response message is used to respond to the SRP request message from the transmit end. The receive end may learn, based on the data flow information or configuration information, that the data flow that is to be created as requested by using the SRP request message is a flow that the receive end needs to receive, and send the SRP response message to the transmit end. In this operation, the receive end implicitly sends, to the transmit end, second information indicating the port identifier of the receive end.

It should be noted that operation S1212 is performed after operation S1209.

S1213. The transmit end sends the first information and/or a source MAC address in the SRP response message to the control device.

After receiving the SRP response message, the transmit end may send indication information to the control device to indicate that the transmit end receives the SRP response message, and then it indicates that creation of the data flow is completed. The indication information may include the first information and/or the source MAC address in the SRP response message.

S1214. The control device sends the data flow information and the bandwidth information of the data flow to a CUC network element.

In a possible implementation, the control device may further send the first information to the CUC network element.

S1215. The CUC network element requests a CNC network element to create the data flow.

In an embodiment, if the control device does not send the first information to the CUC network element in operation S1213, the CUC network element may allocate the first information for the data flow.

The CUC network element may send the first information to the CNC network element to request to create the data flow.

S1216. The CNC network element generates path information of the data flow and a scheduling policy, and sends the path information of the data flow and the scheduling policy to the AN network element and the UPF network element.

The path information of the data flow may indicate a forwarding path of the data flow.

The scheduling policy may include, for example, a packet sending timeslot of the transmit end and/or a packet receiving timeslot of the receive end.

S1217. The CNC network element sends the path information of the data flow and the scheduling policy to the CUC network element.

For operations S1215 to S1217, refer to descriptions in the section 43.1.3.3 in IEEE 802.1Qcc, and details are not described herein.

S1218. The CUC network element sends the path information of the data flow to the control device.

If the CUC network element allocates the first information for the data flow in operation S1215, the CUC network element may send the first information to the control device. Correspondingly, the control device receives the first information from the CUC network element.

In an embodiment, the CUC network element may send the scheduling policy to the control device.

S1219. The control device sends the first information and/or the bandwidth information to the transmit end and/or the receive end.

In an embodiment, the control device may send the first indication information to a first device, and/or send the second indication information to a second device.

In an embodiment, the control device may send the scheduling policy to the transmit end and the receive end.

In operation S1219, the transmit end and the receive end may be instructed to reserve buffer resources.

Optionally, the method may further include operations S1220 to S1223.

S1220. The control device stores information about a TSN pipeline.

The information about the TSN pipeline may be obtained based on related information of the data flow. The information about the TSN pipeline may include at least one of the following: the first information, a device identifier of the AN network element and/or a device identifier of the UPF network element, the port identifier of the AN network element, the port identifier of the UPF network element, the identifier of the reliable-delay transmission network, a source IP address of a GTP-U tunnel, and a destination IP address of the GTP-U tunnel. The device identifier of the AN network element and/or the device identifier of the UPF network element may be obtained from the SMF network element, or may be obtained by the control device based on a configuration, a policy, or an orchestration. The source IP address and/or the destination IP address of the GTP-U tunnel may be obtained from the AN network element or the UPF network element, or may be obtained by the control device based on a configuration, a policy, or an orchestration.

For example, the control device may store (AN1, UPF1, 012a.3322.00af) indicating that there is a TSN pipeline between an AN1 network element and a UPF1 network element and that a flow identifier in the first information is 012a.3322.00af. The information may be used as a basis for selecting a UPF network element when the SMF network element subsequently creates a data flow or a session. Alternatively, the control device may record (012a.3322.00af) indicating that a flow identifier in the first information is 012a.3322.00af. The information may be used to allocate a bandwidth to a user during subsequent creation of a data flow or a session.

S1221. The control device sends reachability information between the transmit end and the receive end to an NRF network element.

The reachability information is used to indicate that the transmit end and the receive end are located in a same reliable-delay transmission network.

In an embodiment, the control device may send the information about the TSN pipeline to the NRF network element.

For example, the control device may send, to the NRF network element, (AN1, UPF1) indicating that the AN1 network element and the UPF1 network element are reachable in the TSN network so that reliable-delay transmission can be supported. Alternatively, the control device may send, to the NRF network element, (AN1, UPF1, 012a.3322.00af, 5 ms, 1 G) indicating that there is a TSN pipeline with a bandwidth of 1 G between the AN1 network element and the UPF1 network element, that a flow identifier in the first information is 012a.3322.00af, and that a maximum transmission delay is 5 ms. Alternatively, the control device may send, to the NRF network element, {(AN1, p1), (UPF1, p2), 012a.3322.00af, 5 ms, 1 G} indicating that there is a TSN pipeline with a bandwidth of 1 G between a port p1 of the AN1 network element and a port p2 of the UPF1 network element, that a flow identifier in the first information is 012a.3322.00af, and that a maximum transmission delay is 5 ms.

S1222. The NRF network element stores the reachability information between the transmit end and the receive end.

In an embodiment, the NRF network element may store the information about the TSN pipeline.

The information may be used as a basis for selecting a UPF network element during subsequent creation of a reliable-delay user flow or session for a user.

S1223. The control device sends the information about the TSN pipeline to the AN network element and/or the UPF network element.

After receiving the foregoing information, the AN network element and/or the UPF network element store/stores the foregoing information, where the foregoing information is used as a basis for allocating a TSN pipeline during subsequent creation of the reliable-delay user flow or session for the user.

Figure 13A:
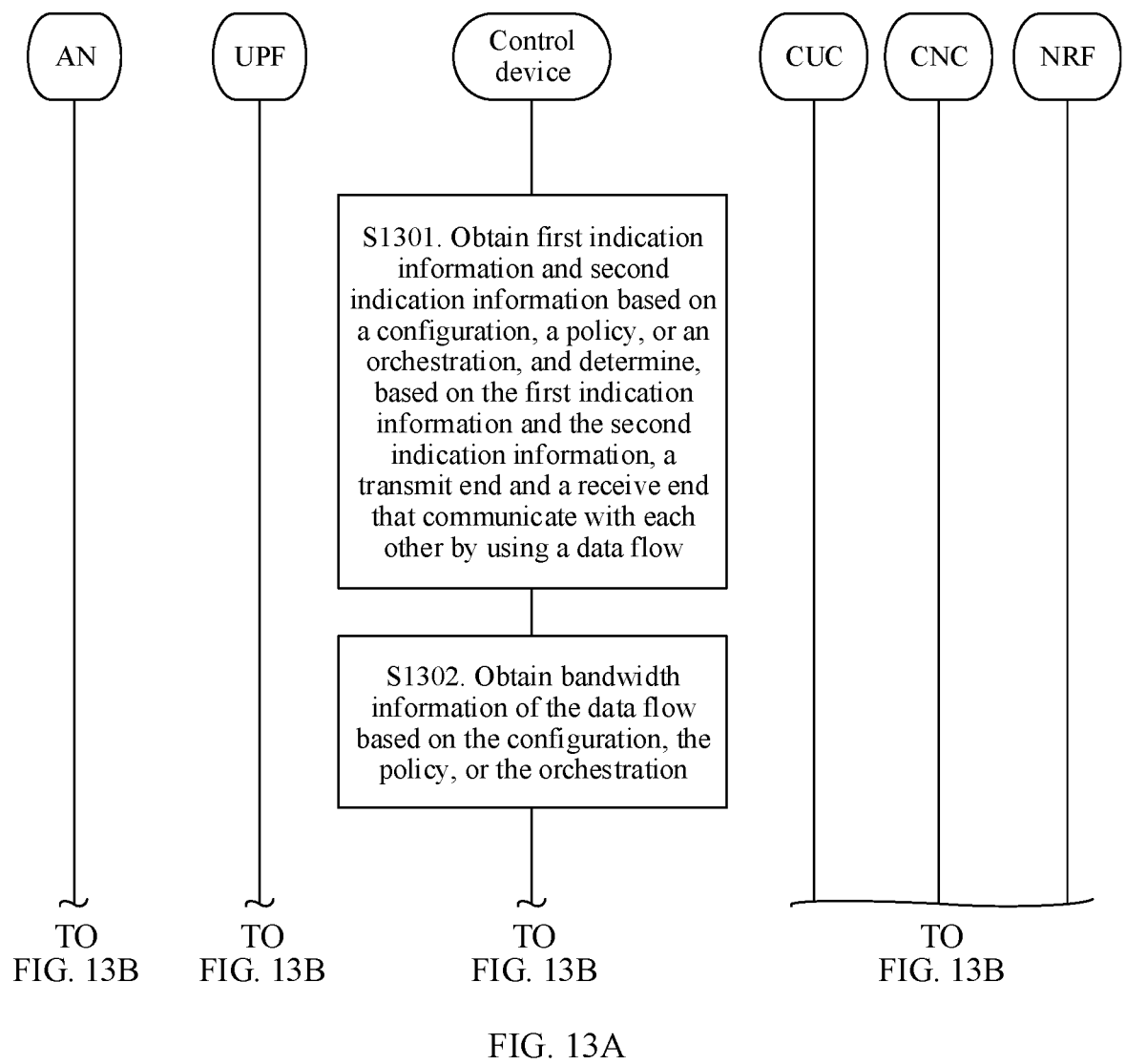
FIG. 13A, FIG. 13B, and FIG. 13C are schematic flowchart 4 of a communication method according to an embodiment of this application.
Figure 13B:
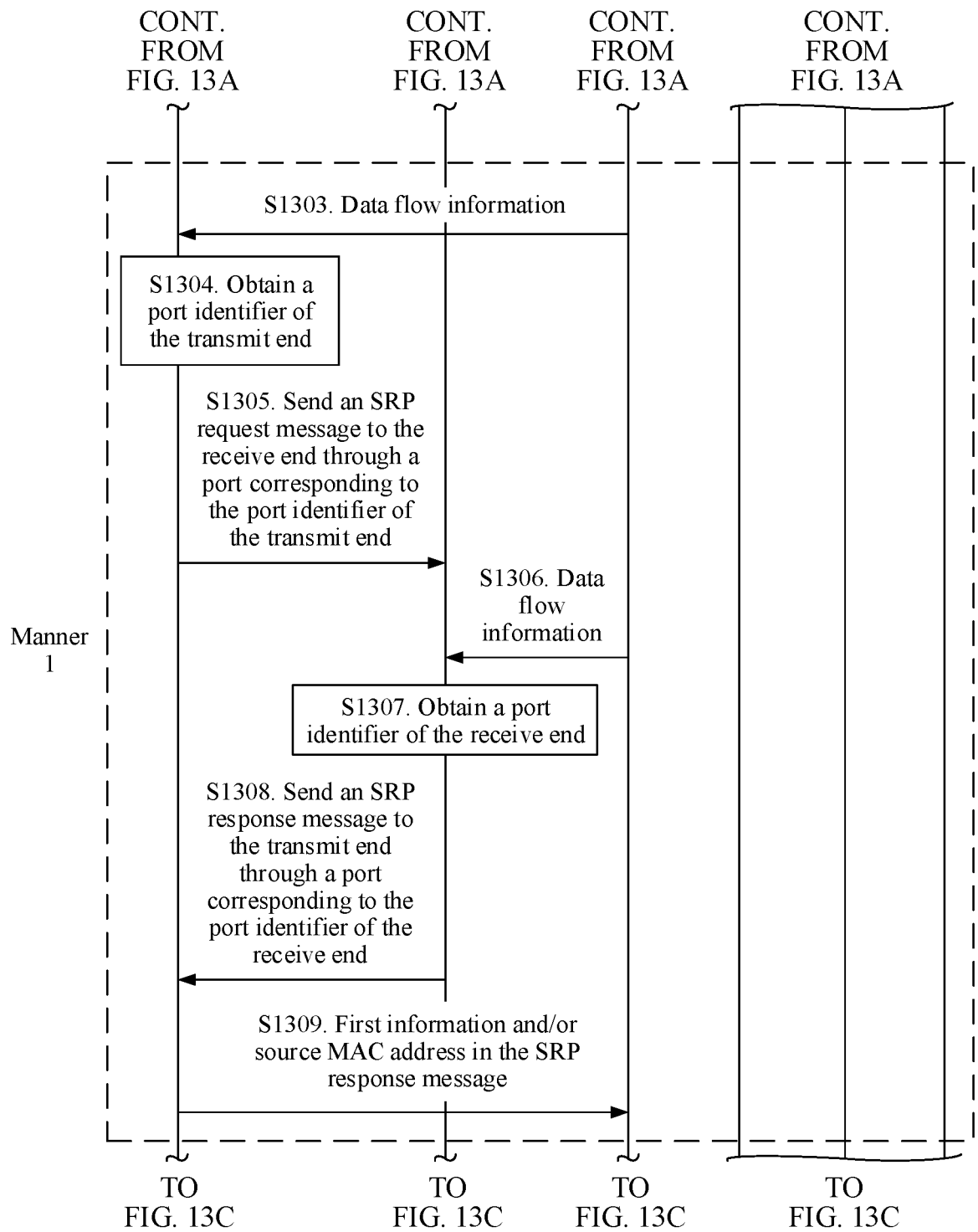
Figure 13C:
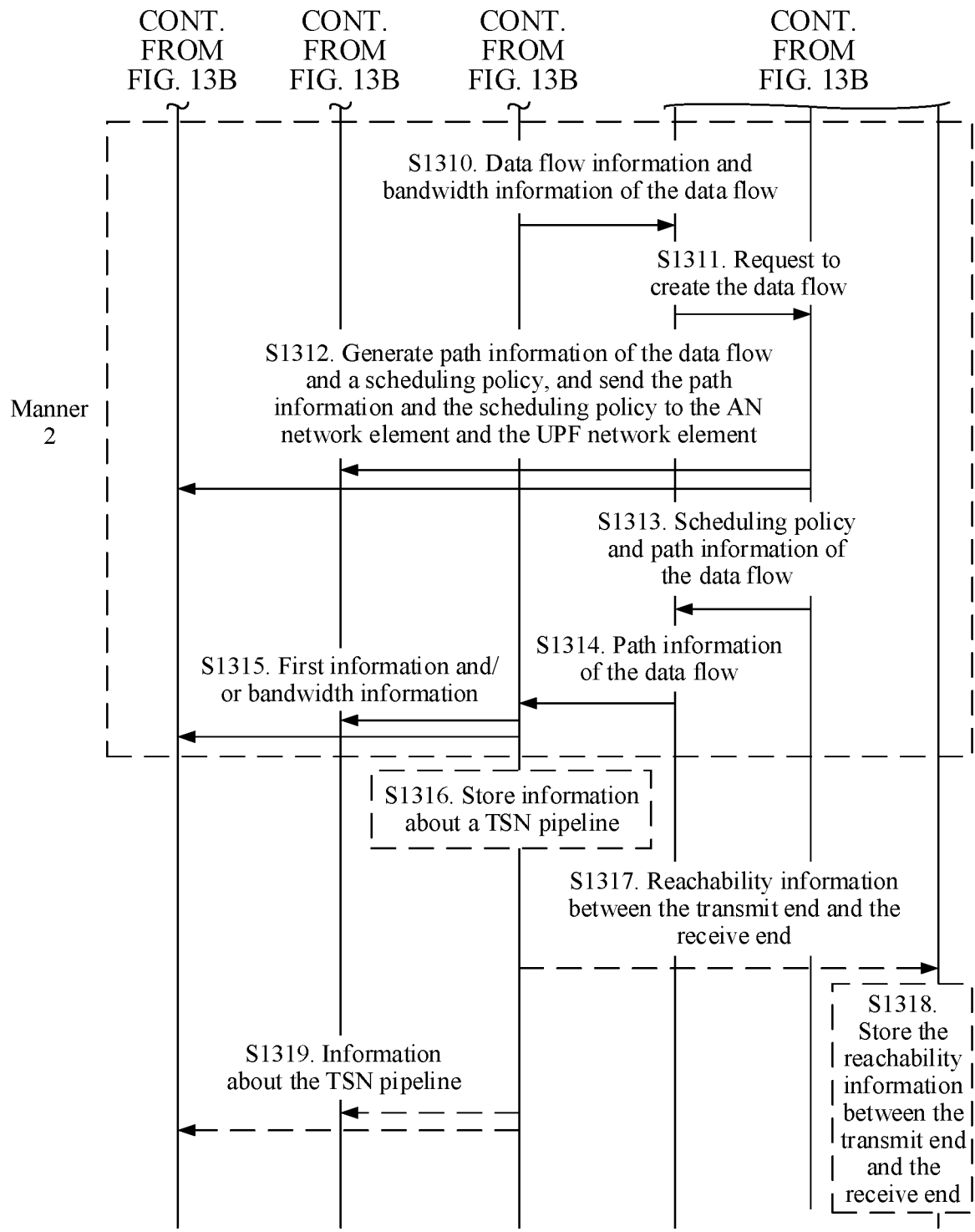

As shown in FIG. 13A, FIG. 13B, and FIG. 13C, the communication method includes operations S1301 to S1319.

S1301. The control device obtains first indication information and second indication information based on a configuration, a policy, or an orchestration, and determines, based on the first indication information and the second indication information, a transmit end and a receive end that communicate with each other by using a data flow.

In an embodiment, the control device may obtain first information based on a configuration, a policy, or an orchestration.

In an embodiment, the control device may obtain, based on a configuration, a policy, or an orchestration, an IP address corresponding to a TSN pipeline.

The control device may store a correspondence between the data flow, an AN network element, and a UPF network element.

S1302. The control device obtains bandwidth information of the data flow based on the configuration, the policy, or the orchestration.

For operations S1303 to S1319, refer to the descriptions about operations S1207 to S1223 in FIG. 12A, FIG. 12B, and FIG. 12C. Details are not described herein again.

Figure 14A:
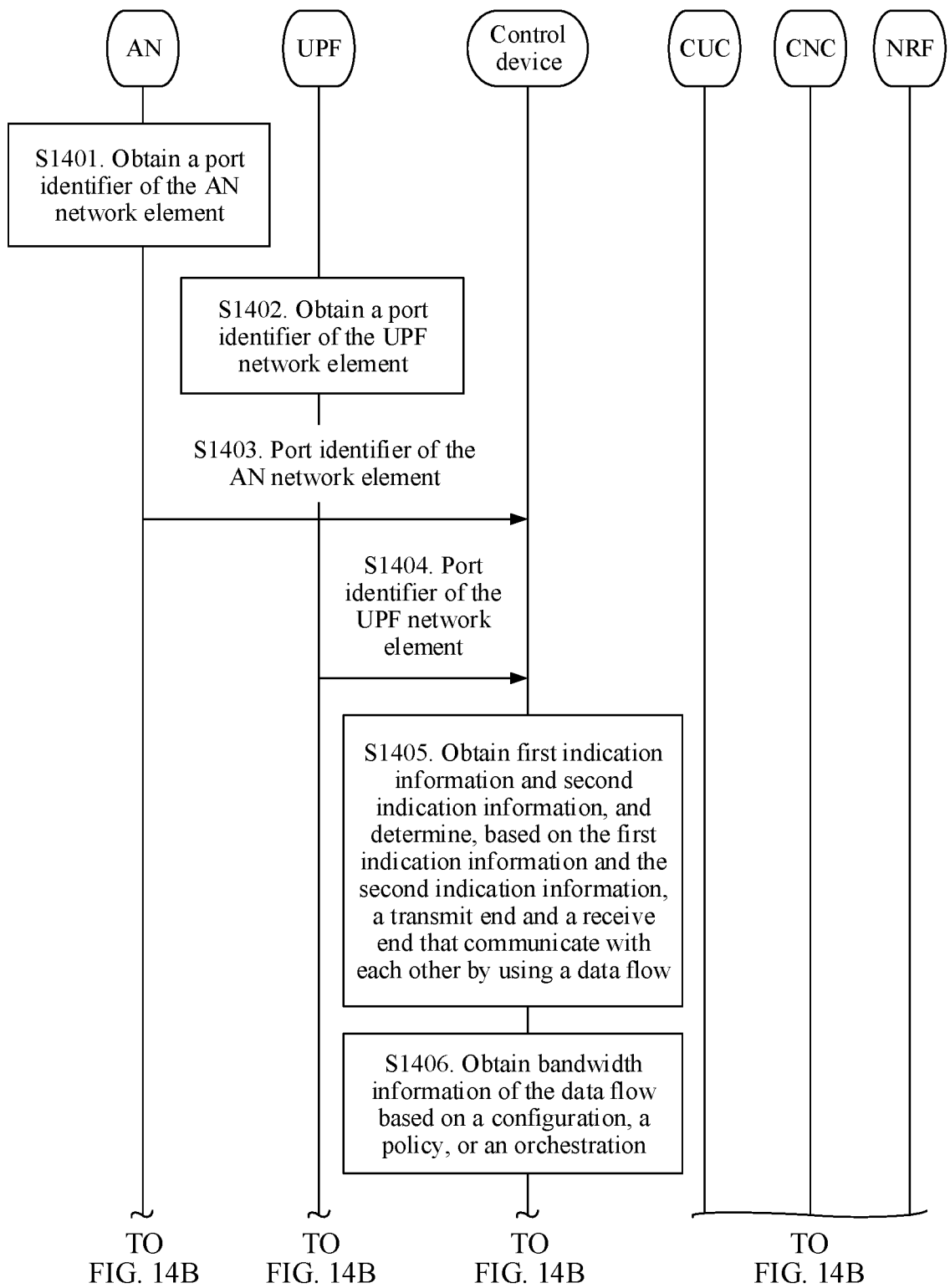
FIG. 14A, FIG. 14B, and FIG. 14C are schematic flowchart 5 of a communication method according to an embodiment of this application.
Figure 14B:
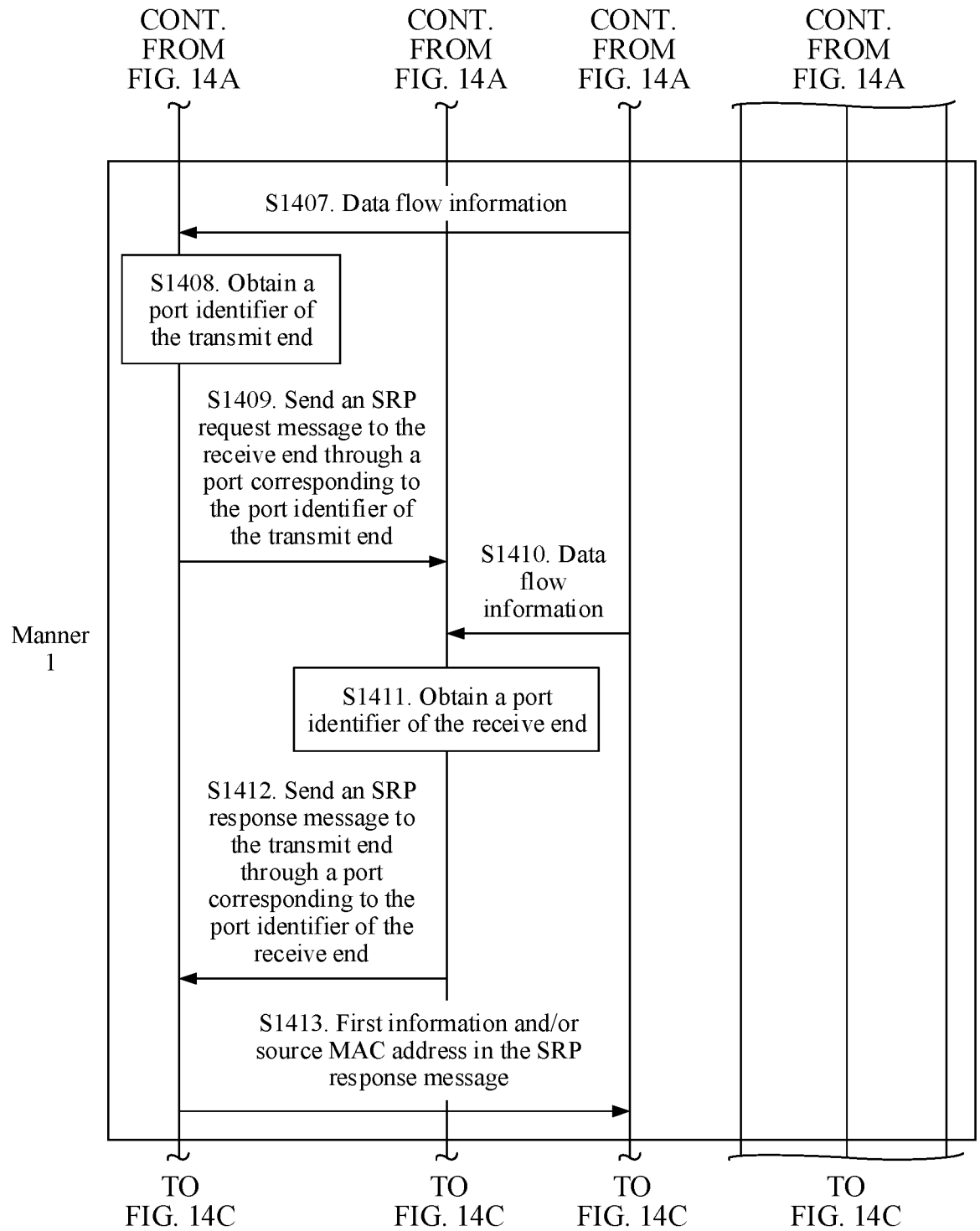
Figure 14C:
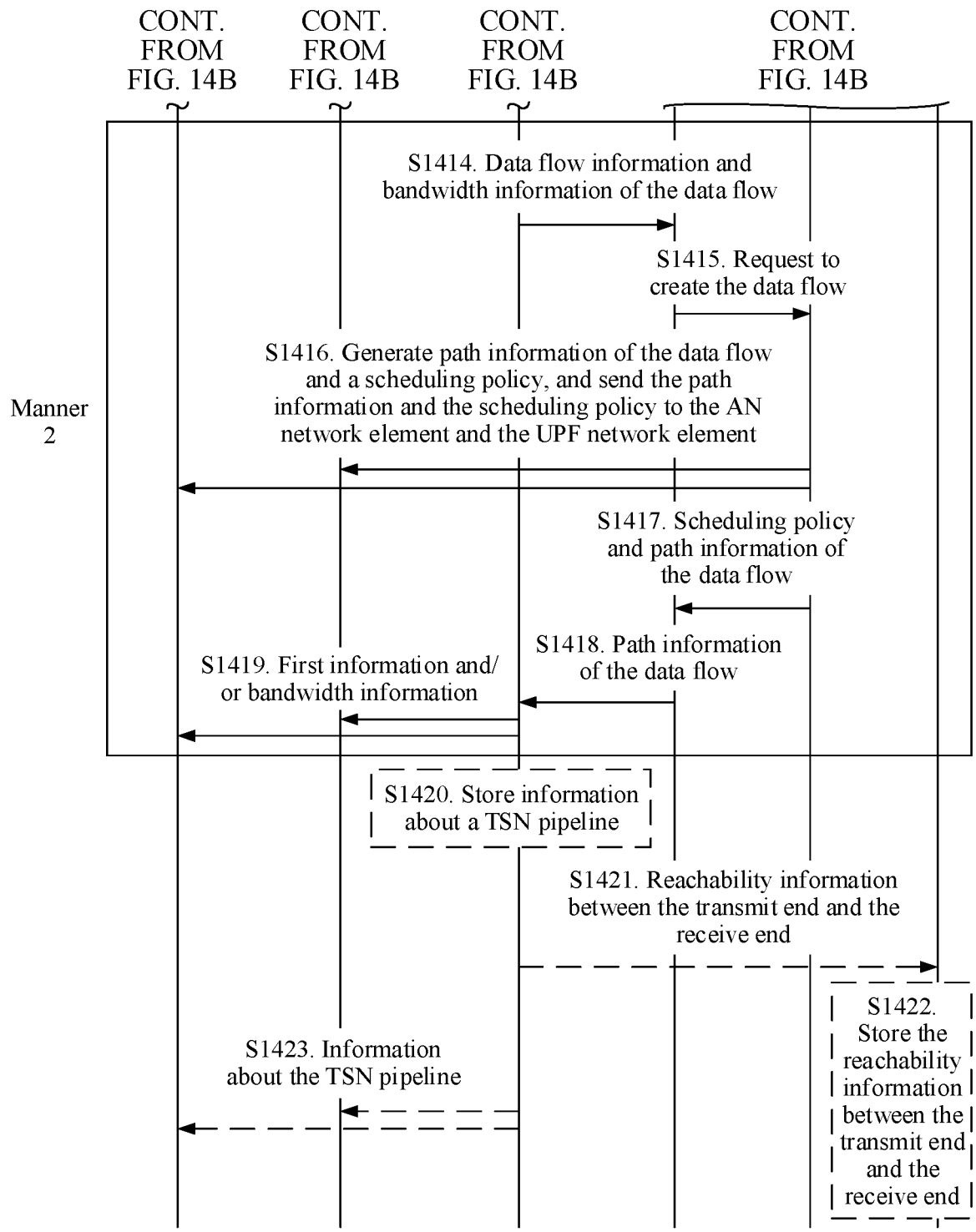

As shown in FIG. 14A, FIG. 14B, and FIG. 14C, the communication method includes operations S1401 to S1423.

S1401. An AN network element obtains a port identifier of the AN network element.

The port identifier of the AN network element may be configured in the AN network element. The AN network element obtains the port identifier of the AN network element based on the configuration.

In an embodiment, the AN network element may obtain bandwidth information of a data flow.

The bandwidth information of the data flow may further be configured in the AN network element. The AN network element obtains the bandwidth information of the data flow based on the configuration.

S1402. A UPF network element obtains a port identifier of the UPF network element.

The port identifier of the UPF network element may be configured in the UPF network element. The UPF network element obtains the port identifier of the UPF network element based on the configuration.

In an embodiment, the UPF network element may obtain the bandwidth information of the data flow.

The bandwidth information of the data flow may further be configured in the UPF network element. The UPF network element obtains the bandwidth information of the data flow based on the configuration.

S1403. The AN network element sends the port identifier of the AN network element to the control device.

Correspondingly, the control device receives the port identifier of the AN network element from the AN network element.

In an embodiment, the AN network element may send the bandwidth information of the data flow to the control device. Correspondingly, the control device may receive the bandwidth information of the data flow from the AN network element.

In an embodiment, the AN network element may send a first registration request message to the control device, where the first registration request message includes the port identifier of the AN network element. Optionally, the first registration request message may further include the bandwidth information of the data flow. Correspondingly, the control device receives the first registration request message from the AN network element.

S1404. The UPF network element sends the port identifier of the UPF network element to the control device.

Correspondingly, the control device receives the port identifier of the UPF network element from the UPF network element.

In an embodiment, the UPF network element may send a second registration request message to the control device, where the second registration request message includes the port identifier of the UPF network element. Optionally, the second registration request message may further include the bandwidth information of the data flow. Correspondingly, the control device receives the second registration request message from the UPF network element.

S1405. The control device obtains first indication information and second indication information, and determines, based on the first indication information and the second indication information, a transmit end and a receive end that communicate with each other by using the data flow.

The first indication information is used to indicate that the AN network element is the transmit end, and the second indication information is used to indicate that the UPF network element is the receive end. Alternatively, the first indication information is used to indicate that the AN network element is the receive end, and the second indication information is used to indicate that the UPF network element is the transmit end. It should be noted that the first indication information and the second indication information may be one piece of indication information, and the indication information indicates that one of the AN network element and the UPF network element is the transmit end, and the other network element is the receive end.

In an embodiment, the control device may obtain the first indication information and the second indication information based on a configuration, a policy, or an orchestration.

In an embodiment, the control device may receive the first indication information and the second indication information from the SMF network element.

For example, the control device may receive the first indication information and the second indication information from the SMF network element, where the first indication information is used to indicate that the AN network element is the transmit end, and the second indication information is used to indicate that the UPF network element is the receive end. In this case, the control device may determine, based on the first indication information, that the AN network element is the transmit end, and may determine, based on the second indication information, that the UPF network element is the receive end.

In an embodiment, the control device may obtain first information based on a configuration, a policy, or an orchestration.

The control device may store a correspondence between the data flow, the AN network element, and the UPF network element.

S1406. The control device obtains the bandwidth information of the data flow based on a configuration, a policy, or an orchestration.

For operations S1407 to S1423, refer to the descriptions about operations S1207 to S1223 in FIG. 12A, FIG. 12B, and FIG. 12C. Details are not described herein again.

Figure 15A:
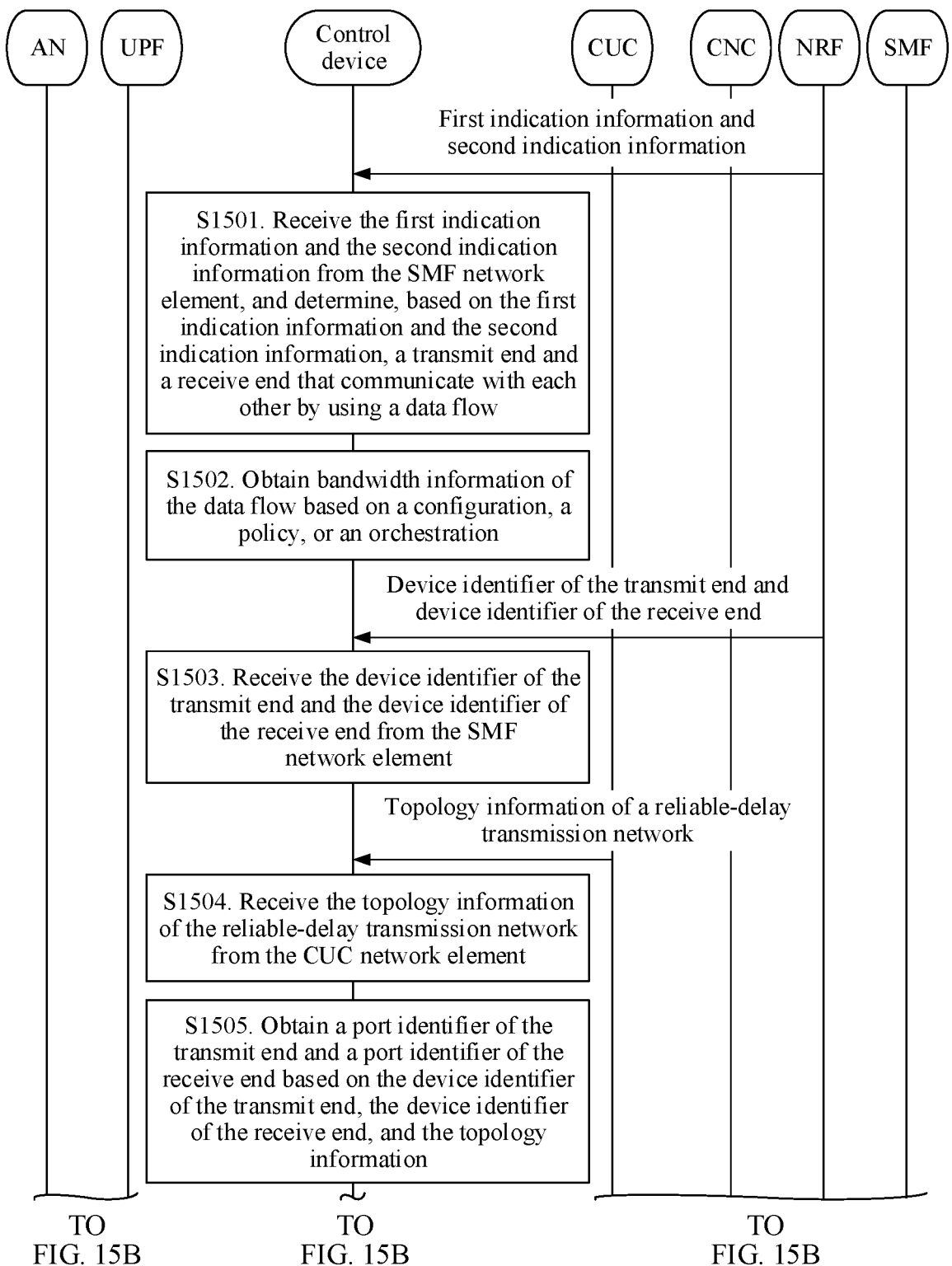
FIG. 15A, FIG. 15B, and FIG. 15C are schematic flowchart 6 of a communication method according to an embodiment of this application.
Figure 15B:
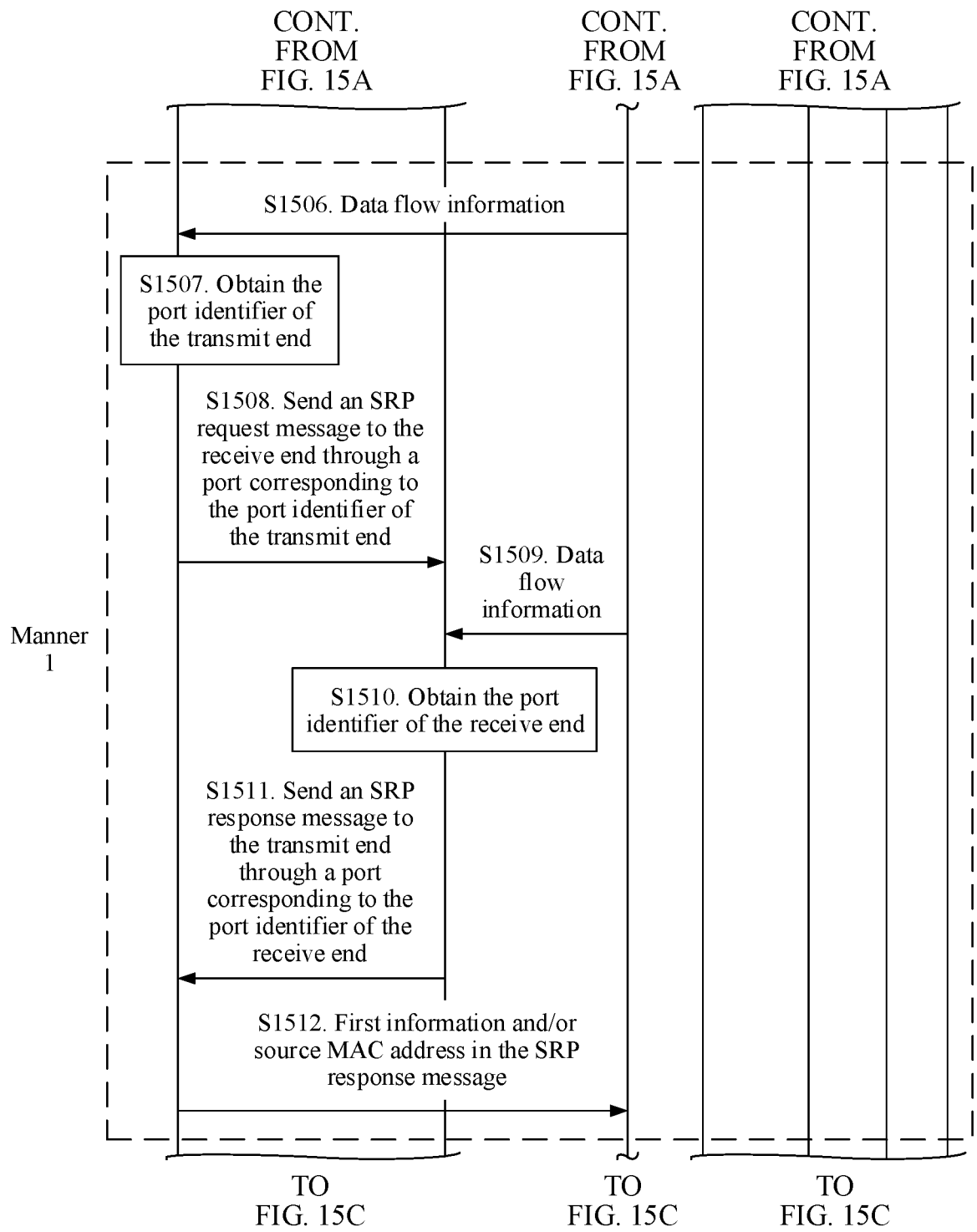
Figure 15C:
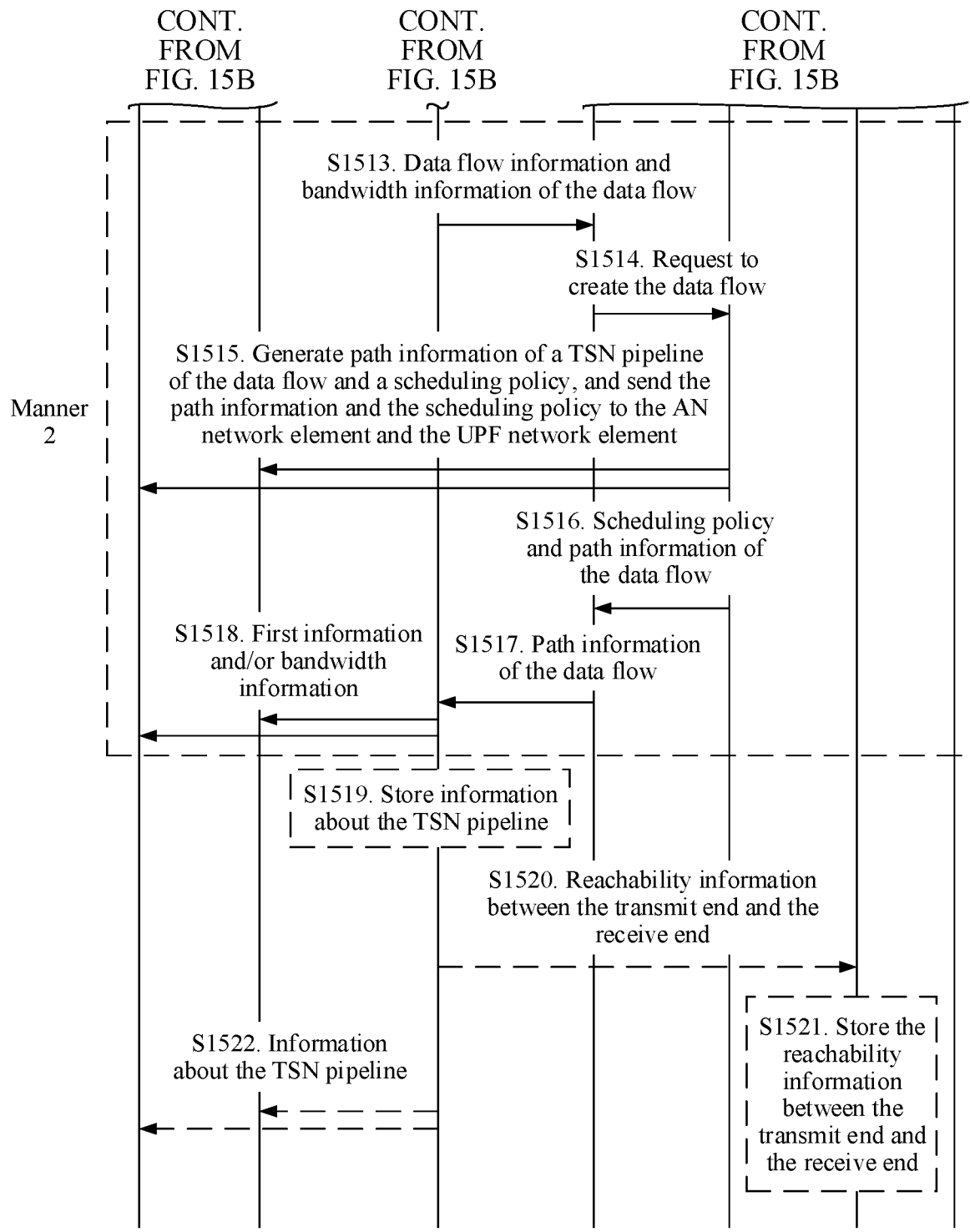

As shown in FIG. 15A, FIG. 15B, and FIG. 15C, the communication method includes operations S1501 to S1522.

S1501. The control device receives first indication information and second indication information from the SMF network element, and determines, based on the first indication information and the second indication information, a transmit end and a receive end that communicate with each other by using a data flow.

S1502. The control device obtains bandwidth information of the data flow based on a configuration, a policy, or an orchestration.

S1503. The control device receives a device identifier of the transmit end and a device identifier of the receive end from the SMF network element.

S1504. The control device receives topology information of a reliable-delay transmission network from the CUC network element.

The topology information includes a correspondence between the device identifier of the transmit end and a port identifier of the transmit end, and a correspondence between the device identifier of the receive end and a port identifier of the receive end. The topology information implicitly indicates that these devices or ports are reachable in a TSN network.

S1505. The control device obtains the port identifier of the transmit end and the port identifier of the receive end based on the device identifier of the transmit end, the device identifier of the receive end, and the topology information.

In an embodiment, the control device may obtain first information based on a configuration, a policy, or an orchestration.

The control device may store a correspondence between the data flow, an AN network element, and a UPF network element.

For operations S1506 to S1522, refer to the descriptions about operations S1207 to S1223 in FIG. 12A, FIG. 12B, and FIG. 12C. Details are not described herein again.

Figure 16A:
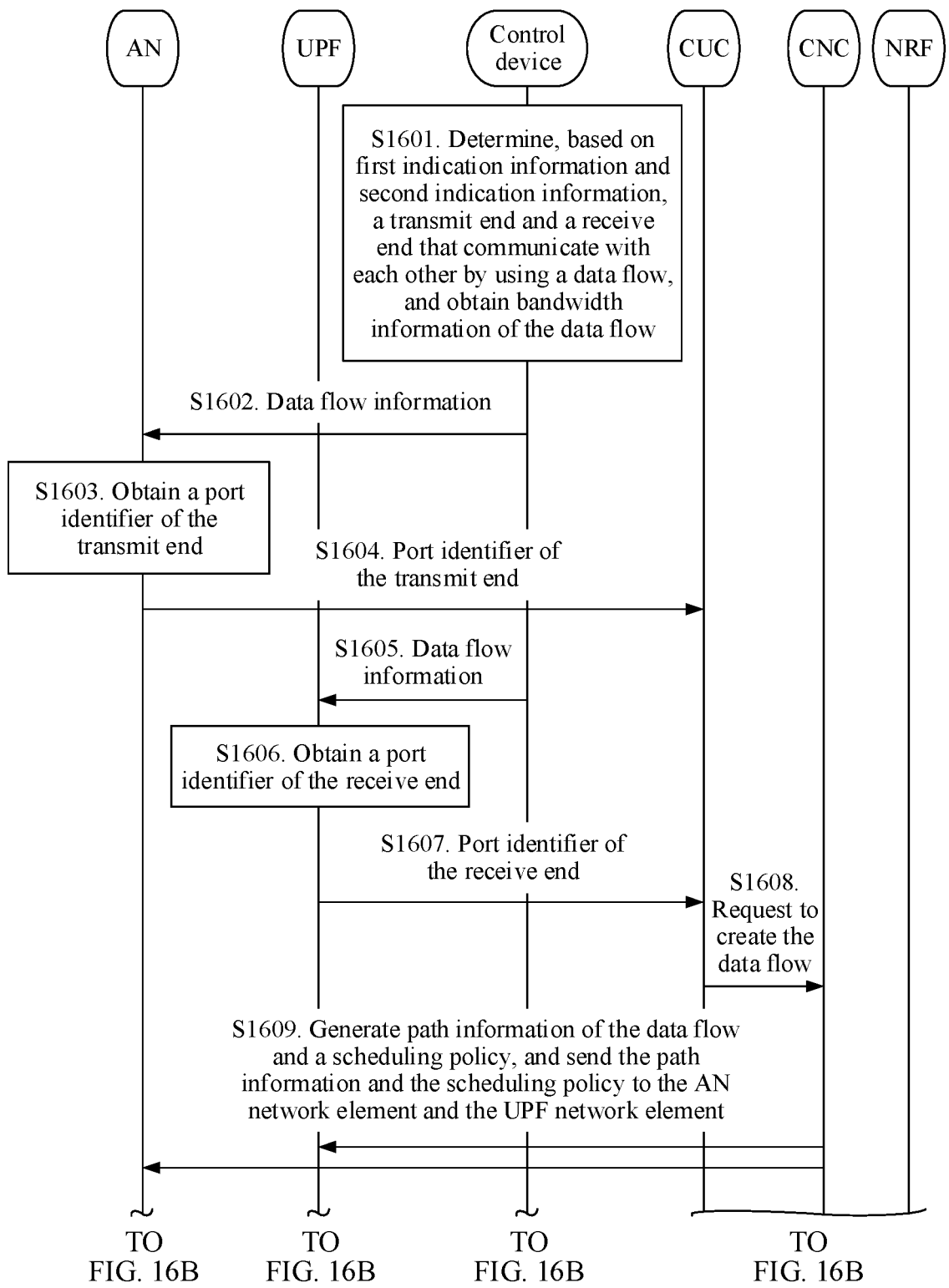
FIG. 16A, and FIG. 16B are schematic flowchart 7 of a communication method according to an embodiment of this application.
Figure 16B:
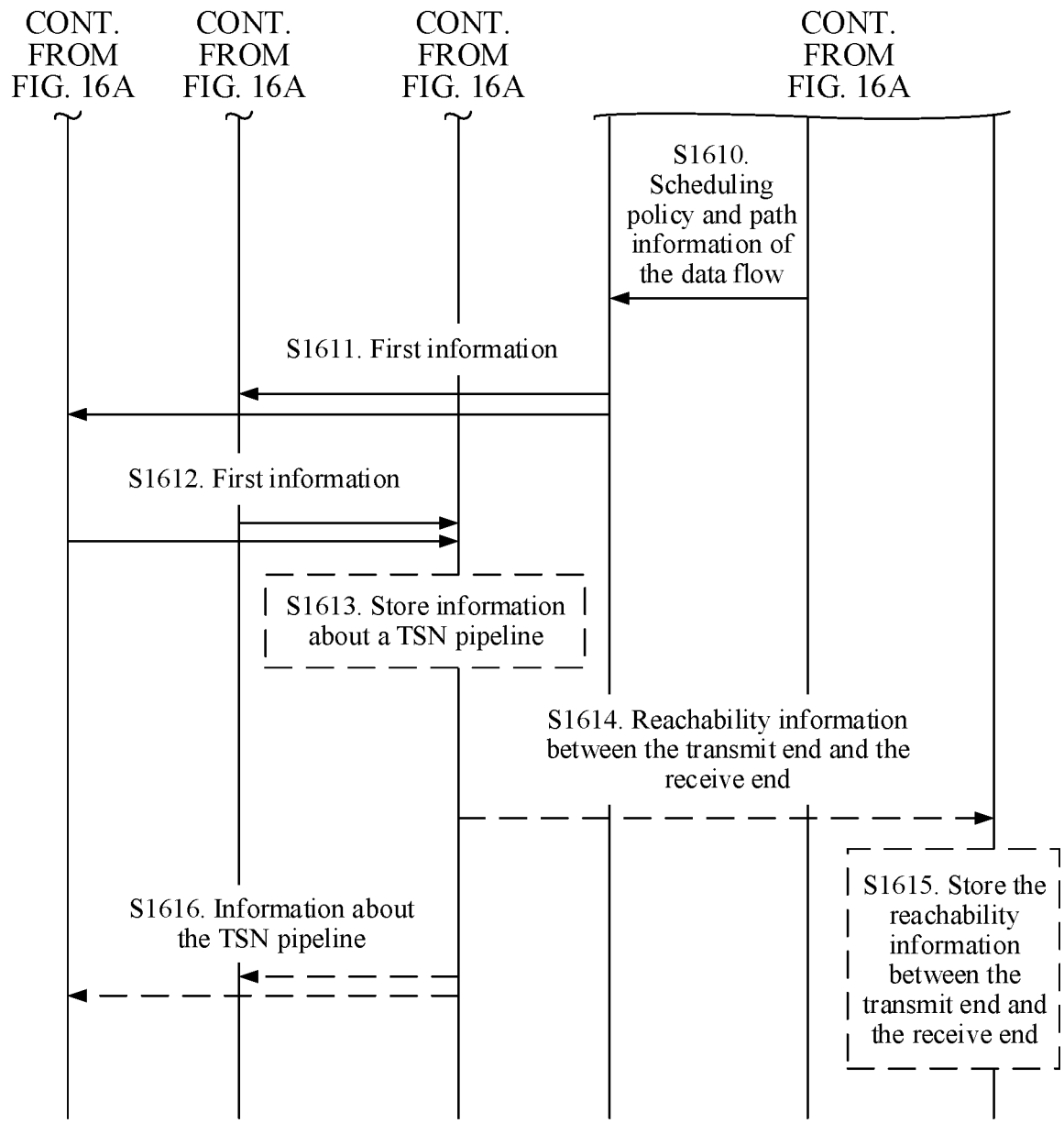

As shown in FIG. 16A, and FIG. 16B, the communication method includes operations S1601 to S1616.

S1601. The control device determines, based on first indication information and second indication information, a transmit end and a receive end that communicate with each other by using a data flow, and obtains bandwidth information of the data flow.

In an embodiment, the control device may allocate a TSN pipeline identifier for a TSN pipeline. A function of the TSN pipeline identifier is to allow that a core network control plane network element does not need to maintain or store first information. In addition, because a TSN network element manages and maintains the first information, when the core network control plane network element subsequently interacts with an AN network element and a UPF network element, the TSN pipeline identifier is directly used to indicate the corresponding TSN pipeline.

For this operation, refer to the descriptions about operations S1201 to S1206 in FIG. 12A, FIG. 12B, and FIG. 12C, operations S1301 and S1302 in FIG. 13A, FIG. 13B, and FIG. 13C, operations S1401 to S1406 in FIG. 14 A, FIG. 14B, and FIG. 14C, or operations S1501 and S1502 in FIG. 15A, FIG. 15B, and FIG. 15C. Details are not described herein again.

S1602. The control device sends data flow information to the transmit end.

Optionally, the control device may send the TSN pipeline identifier to the transmit end.

For this operation, refer to the description about operation S1207 in FIG. 12A, FIG. 12B, and FIG. 12C. Details are not described herein again.

S1603. The transmit end obtains a port identifier of the transmit end.

For this operation, refer to the description about operation S1208 in FIG. 12. Details are not described herein again.

S1604. The transmit end sends the port identifier of the transmit end to the CUC network element.

The port identifier of the transmit end is used to register the transmit end with the CUC network element, to create the data flow.

S1605. The control device sends the data flow information and the bandwidth information of the data flow to the receive end.

Optionally, the control device may send the TSN pipeline identifier to the receive end.

For this operation, refer to the description about operation S1210 in FIG. 12A, FIG. 12B, and FIG. 12C. Details are not described herein again.

S1606. The receive end obtains a port identifier of the receive end.

For this operation, refer to the description about operation S1211 in FIG. 12A, FIG. 12B, and FIG. 12C. Details are not described herein again.

S1607. The receive end sends the port identifier of the receive end to the CUC network element.

The port identifier of the receive end is used to register the receive end with the CUC network element, to request to create the data flow.

For operations S1608 to S1610, refer to the descriptions about S1215 to S1217 in FIG. 12A, FIG. 12B, and FIG. 12C. Details are not described herein again.

S1611. The CUC network element sends first information to the transmit end and/or the receive end.

S1612. The transmit end and/or the receive end send/sends the first information to the control device.

This operation is optional.

S1613. The control device stores information about a TSN pipeline.

Compared with operation S1220 in FIG. 12A, FIG. 12B, and FIG. 12C, the control device further needs to store the TSN pipeline identifier in operation S1601. For other content, refer to operation S1220 in FIG. 12A, FIG. 12B, and FIG. 12C. Details are not described herein again.

For operations S1614 to S1616, refer to descriptions about operations S1221 to S1223 in FIG. 12A, FIG. 12B, and FIG. 12C. Details are not described herein again.

The following describes the foregoing process with reference to a specific example. The created TSN pipeline is not bound to an IP address of a GTP-U tunnel, an NRF network element stores reachability information between the AN network element and the UPF network element, and the control device stores the information about the TSN pipeline, and the AN network element and the UPF network element store a correspondence between the TSN pipeline, the port identifier of the transmit end, and the port identifier of the receive end. As shown in FIG. 17, the foregoing communication method may include the following operations.

S1701. Configure a device identifier AN1 and/or port identifiers AN1_p1 and AN1_p2 on an AN1 network element.

S1702. Configure a device identifier UPF1 and/or port identifiers UPF1_p3 and UPF1_p4 on a UPF1 network element.

S1703. The AN1 network element sends the device identifier AN1 and/or the port identifiers AN1_p1 and AN1_p2 to the control device.

S1704. The UPF1 network element sends the device identifier UPF1 and/or port identifiers UPF1_p3 and UPF1_p4 to the control device.

S1705. The control device sends the device identifier AN1 and/or the port identifiers AN1_p1 and AN1_p2 of the AN1 network element, and the device identifier UPF1 and/or the port identifiers UPF1_p3 and UPF1_p4 of the UPF1 network element to the CUC network element.

This operation is performed to request topology information of a reliable-delay transmission network from the CUC network element, and obtain reachability information between the AN network element and the UPF network element, for example, reachability information (AN1_p1, UPF1_p3) and (AN1_p2, UPF1_p4) between ports. The reachability information is used to indicate that the AN network element and the UPF network element are located in a same reliable-delay transmission network. The control device may further determine that reliable-delay transmission between the AN1 network element and the UPF1 network element is supported.

Optionally, the control device may obtain the foregoing information based on a configuration. When the control device obtains the foregoing information based on the configuration, the foregoing operations S1701 to S1704 may not be performed.

S1706. The control device sends the reachability information between the AN1 network element and the UPF1 network element to the NRF network element.

For example, the reachability information is the reachability information (AN1_p1, UPF1_p3) and (AN1_p2, UPF1_p4) between the ports.

S1707. The NRF network element stores the reachability information between the AN1 network element and the UPF1 network element.

Then, during creation of a session for a user (for example, when the user accesses from the AN1 network element and the AN1 network element serves as a transmit end), an SMF network element determines the UPF1 network element, and initiates a session creation request to the UPF1 network element. Optionally, after receiving the session creation request, the UPF1 network element performs the process S1204 in FIG. 12A, FIG. 12B, and FIG. 12C, and sends, to the control device, first indication information indicating that the AN1 network element is a transmit end and second indication information indicating that the UPF1 network element is a receive end. It should be noted that the first indication information and the second indication information may alternatively be one piece of indication information. In other words, the indication information is used to indicate that the AN1 network element is the transmit end and the UPF1 network element is the receive end. A specific form of the indication information is not limited in this application.

S1708. The control device determines, based on the first indication information and the second indication information, a transmit end and a receive end that communicate with each other by using a data flow, and obtains bandwidth information of the data flow.

The control device may determine, based on a configuration, a policy, and an orchestration, or the first indication information and the second indication information in operation S1707, that a port AN1_p1 of the AN1 network element serves as a transmit end and that a port UPF1_p2 of the UPF1 network element serves as a receive end. Bandwidth information and the like of the data flow between the AN1 network element and the UPF1 network element may be obtained based on a configuration, a policy, or an orchestration.

S1709. The control device obtains first information.

The first information includes a flow identifier 012a.3322.00af.

S1710. The control device instructs the CUC network element to create the data flow.

For example, path information of the data flow may include (012a.3322.00af, AN1_p1, AN1_p1, 1 G). 012a.3322.00af is the first information, AN1_p1 is the port identifier of the transmit end, UPF1_p2 is the port identifier of the receive end, and 1 G is the bandwidth information of the data flow.

S1711. The CUC network element sends the path information of the data flow to the control device.

The sent path information of the data flow may include (012a.3322.00af, AN1_p1, VLAN_100, CoS_3, UPF1_p2, VLAN_200, CoS_3, 1 G). 012a.3322.00af is the first information, AN1_p1 is the port identifier of the transmit end, VLAN_100 indicates that a VLAN of the transmit end is 100, CoS_3 indicates that a CoS of the transmit end is 3, and UPF1_p2 is the port identifier of the receive end; and VLAN_200 indicates that a VLAN of the receive end is 200, CoS_3 indicates that a CoS of the receive end is 3, and 1 G is the bandwidth information of the data flow.

S1712. The control device stores information about a TSN pipeline.

The control device may obtain the information about the TSN pipeline based on the path information of the data flow.

The control device may obtain, based on the path information of the data flow, information that is about the TSN pipeline and that is related to the UPF network element.

For example, information about the VLAN and the CoS on the AN side may be deleted from the path information of the data flow. In this case, the information that is about the TSN pipeline and that is related to the UPF network element may include (012a.3322.00af, AN1_p1, UPF1_p2, VLAN_200, CoS_3, 1 G). 012a.3322.00af is the flow identifier included in the first information, AN1_p1 is the port identifier of the transmit end, UPF1_p2 is the port identifier of the receive end, VLAN_200 indicates that the VLAN of the receive end is 200, CoS_3 indicates that the CoS of the receive end is 3, and 1 G indicates the bandwidth information of the data flow.

The control device may obtain, based on the path information of the data flow, information that is about the TSN pipeline and that is related to the AN network element.

For example, information about the VLAN and the CoS on the UPF side may be deleted from the path information of the data flow. In this case, the information that is about the TSN pipeline and that is related to the AN network element may include (012a.3322.00af, AN1_p1, VLAN_100, CoS_3, UPF1_p2, 1 G). 012a.3322.00af is the flow identifier included in the first information, AN1_p1 is the port identifier of the transmit end, VLAN_100 indicates that the VLAN of the transmit end is 100, CoS_3 indicates that the CoS of the transmit end is 3, UPF1_p2 is the port identifier of the receive end, and 1 G indicates the bandwidth information of the data flow.

S1713. The control device sends the information that is about the TSN pipeline and that is related to the UPF network element to the UPF network element.

S1714. The control device sends the information that is about the TSN pipeline and that is related to the AN network element to the AN network element.

Then, the AN and the UPF can create a session for a user based on the information about the TSN pipeline.

Figure 18A:
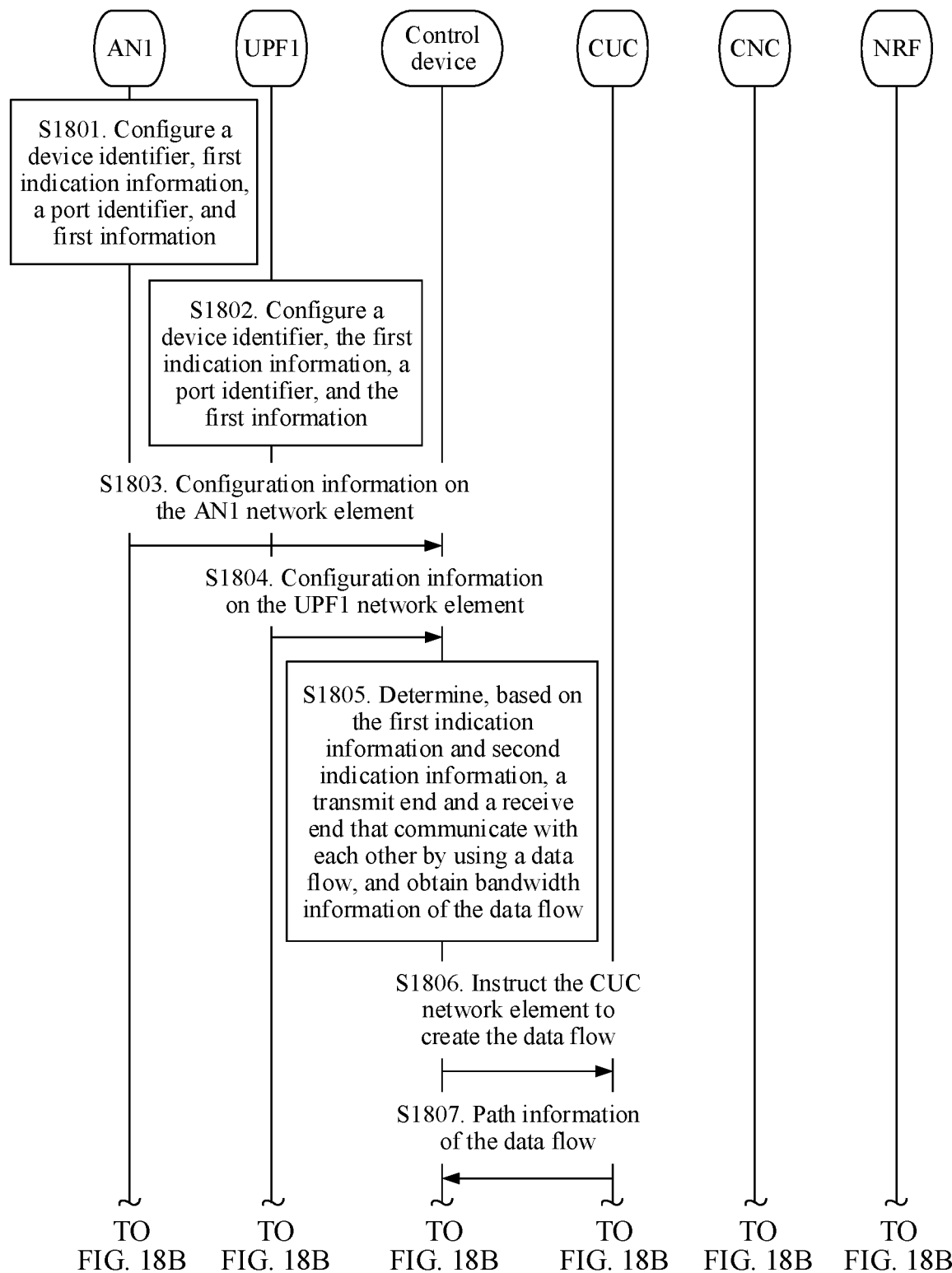
FIG. 18A, and FIG. 18B are schematic flowchart 9 of a communication method according to an embodiment of this application.
Figure 18B:
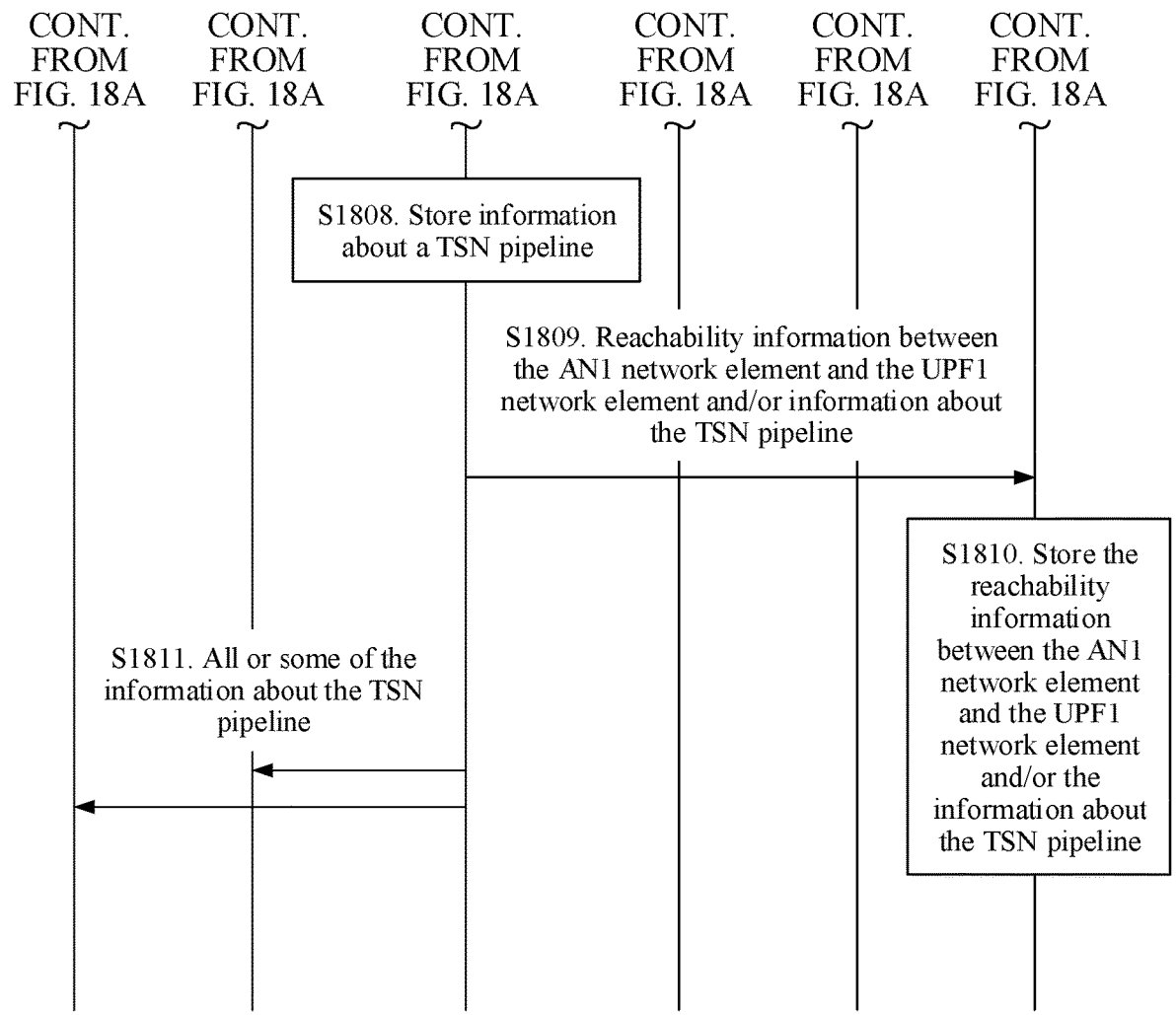

The following describes the foregoing process with reference to a specific example. As shown in FIG. 18A, and FIG. 18B, the foregoing communication method may include the following operations.

S1801. Configure a device identifier, first indication information, a port identifier, and first information on an AN1 network element.

In other words, configuration information on the AN 1 includes the device identifier, the first indication information, the port identifier, and the first information.

Optionally, a corresponding IP address may be configured in the AN1 network element.

For example, the configuration on the AN1 network element includes: AN1, (talker, AN1_p1, 012a.3322.00af, 10.10.10.2), and (listener, AN1_p1, 012a.3322.00ae, 10.10.10.2). AN1 is a device identifier, AN1_p1 is a port identifier, "talker" and "listener" are first indication information, 012a.3322.00af and 012a.3322.00ae are first information, and 10.10.10.2 is an IP address corresponding to the AN1 network element. (talker, AN1_p1, 012a.3322.00af, 10.10.10.2) indicates: When the AN1 network element serves as a transmit end, the AN1 network element sends a data flow through a port corresponding to AN1_p1, where the data flow is identified by 012a.3322.00af, and an IP address used by the AN1 network element to send the data flow is 10.10.10.2. (listener, AN1_p1, 012a.3322.00ae, 10.10.10.2) indicates: When the AN1 network element serves as a receive end, the AN1 network element receives a data flow through a port corresponding to AN1_p1, where the data flow is identified by 012a.3322.00ae, and an IP address used by the AN1 network element to receive the data flow is 10.10.10.2.

S1802. Configure a device identifier, second indication information, a port identifier, and the first information on a UPF1 network element.

In other words, configuration information on the UPF1 includes the device identifier, the first indication information, the port identifier, and the first information.

Optionally, a corresponding IP address may be configured in the UPF1 network element.

For example, the configuration on the UPF1 network element includes: UPF1, (talker, UPF1_p3, 012a.3322.00ae, 10.10.10.3), and (listener, UPF1_p3, 012a.3322.00af, 10.10.10.3). UPF1 is a device identifier, UPF1_p3 is a port identifier, "talker" and "listener" are second indication information, 012a.3322.00af and 012a.3322.00ae are first information, and 10.10.10.3 is an IP address corresponding to the UPF1 network element. (talker, UPF1_p3, 012a.3322.00ae, 10.10.10.3) indicates: When the UPF1 serves as a transmit end, the UPF1 sends a data flow through a port corresponding to UPF1_p3, where the data flow is identified by 012a.3322.00ae, and an IP address used by the UPF1 network element to send the data flow is 10.10.10.3. (listener, UPF1_p3, 012a.3322.00af, 10.10.10.3) indicates: When the UPF1 network element serves as a receive end, the UPF1 network element receives a data flow through a port corresponding to UPF1_p3, where the data flow is identified by 012a.3322.00af, and an IP address used by the AN1 network element to receive the data flow is 10.10.10.3.

S1803. The AN1 network element sends the configuration information on the AN1 network element to the control device.

Optionally, the AN1 network element may further send bandwidth information of a data flow and TSN network information such as a VLAN and a CoS to the control device.

The foregoing information may be carried in first registration information.

S1804. The UPF1 network element sends the configuration information on the UPF1 network element to the control device.

Optionally, the UPF1 network element may send bandwidth information of a data flow and TSN network information such as a VLAN and a CoS to the control device.

The foregoing information may be carried in second registration information.

It should be noted that operations S1801 to S1804 are optional operations. The control device may obtain the foregoing information based on a configuration, a policy, or an orchestration.

S1805. The control device determines, based on the first indication information and the second indication information, a transmit end and a receive end that communicate with each other by using a data flow, and obtains bandwidth information of the data flow.

The control device may obtain the transmit end or the receive end based on the registration information from the AN1 network element and the UPF1 network element. Alternatively, the control device may obtain the first indication information and the second indication information based on a configuration, a policy, or an orchestration, to further obtain the transmit end or the receive end. For example, the configuration, the policy, or the orchestration may include: The first information is 012a.3322.00af, the corresponding transmit end is a port identified by AN1_p1, and the corresponding receive end is a port identified by UPF1_p3.

The control device may obtain the bandwidth information of the data flow based on the registration information from the AN1 network element and the UPF1 network element. Alternatively, the control device may obtain the bandwidth information of the data flow based on a configuration, a policy, or an orchestration. If the control device obtains the bandwidth information (for example, 1 G) of the data flow based on a configuration, a policy, or an orchestration, the control device requests the AN network element and the UPF network element to separately reserve a bandwidth for the corresponding data flow.

S1806. The control device instructs the CUC network element to create the data flow.

For example, path information of the data flow may include (AN1_p1, UPF1_p3, 012a.3322.00a, 1 G)), where AN1_p1 is a port identifier of the transmit end, UPF1_p3 is a port identifier of the receive end, 012a.3322.00af is the first information, and 1 G is the bandwidth information of the data flow.

If the registration information from the AN network element and the UPF network element includes the TSN network information such as the VLANs and the CoSs, the control device may add the TSN network information to a request message sent by the control device to the CUC network element. Alternatively, the CUC network element or a CNC network element may generate related information.

S1807. The CUC network element sends the path information of the data flow to the control device.

The sent path information of the data flow may include (012a.3322.00af, AN1_p1, VLAN_100, CoS_3, UPF1_p2, VLAN_200, CoS_3, 1 G). 012a.3322.00af is the first information, AN1_p1 is the port identifier of the transmit end, VLAN_100 indicates that a VLAN of the transmit end is 100, CoS_3 indicates that a CoS of the transmit end is 3, and UPF1_p2 is the port identifier of the receive end; and VLAN_200 indicates that a VLAN of the receive end is 200, CoS_3 indicates that a CoS of the receive end is 3, and 1 G is the bandwidth information of the data flow.

S1808. The control device stores information about a TSN pipeline.

The information about the TSN pipeline may be obtained based on the foregoing path information.

For example, the information about the TSN pipeline may include (012a.3322.00af, AN1_p1, VLAN_100, CoS_3, UPF1_p2, VLAN_200, CoS_3, 1 G). 012a.3322.00af is the first information, AN1_p1 is the port identifier of the transmit end, VLAN_100 indicates that the VLAN of the transmit end is 100, CoS_3 indicates that the CoS of the transmit end is 3, and UPF1_p2 is the port identifier of the receive end; and VLAN_200 indicates that the VLAN of the receive end is 200, CoS_3 indicates that the CoS of the receive end is 3, and 1 G is the bandwidth information of the data flow.

S1809. The control device sends reachability information between the AN1 network element and the UPF1 network element and/or the information about the TSN pipeline to an NRF network element.

For example, the reachability information between the AN1 and the UPF1 may include (AN1_p1, UPF1_p3), where AN1_p1 is a port identifier of the transmit end, and UPF1_p2 is a port identifier of the receive end.

S1810. The NRF network element stores the reachability information between the AN1 network element and the UPF1 network element and/or the information about the TSN pipeline.

S1811. The control device sends all or some of the information about the TSN pipeline to the AN1 network element and/or the UPF1 network element.

For example, the sent information about the TSN pipeline may include (012a.3322.00af, AN1_p1, VLAN_100, CoS_3, 10.10.10.2, UPF1_p3, VLAN_200, CoS_3, 10.10.10.3, 1 G). 012a.3322.00af is the first information, AN1_p1 is the port identifier of the transmit end, VLAN_100 indicates that the VLAN of the transmit end is 100, CoS_3 indicates that the CoS of the transmit end is 3, 10.10.10.2 is an IP address of the transmit end, and UPF1_p2 is a port identifier of the receive end; and VLAN_200 indicates that the VLAN of the receive end is 200, CoS_3 indicates that the CoS of the receive end is 3, 10.10.10.3 is an IP address of the receive end, and 1 G is the bandwidth information of the data flow.

An embodiment of this application further provides a communications apparatus. The communications apparatus may be configured to perform a function of the control device in the foregoing method. In this embodiment of this application, the communications apparatus may be divided into functional modules based on the example of the foregoing method. For example, the functional modules may be obtained through division based on corresponding functions, or two or more functions may be integrated into one processing module. The integrated module may be implemented in a form of hardware, or may be implemented in a form of a software functional module. It should be noted that, in this application, module division is exemplary, and is merely a logical function division. In actual implementation, another division manner may be used.

Figure 19:
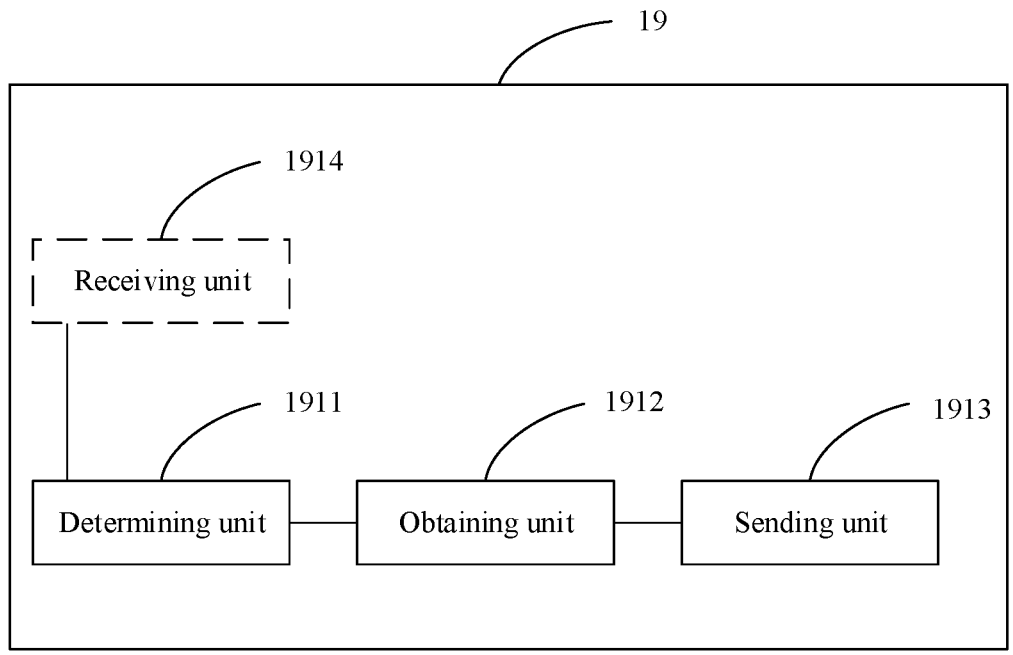
FIG. 19 is a schematic structural diagram 1 of a communications apparatus according to an embodiment of this application.

When the functional modules are obtained through division in correspondence to functions, FIG. 19 is a possible schematic structural diagram of the communications apparatus in the foregoing embodiment. The communications apparatus 19 may include a determining unit 1911, an obtaining unit 1912, a sending unit 1913, and a receiving unit 1914. The foregoing units are configured to support the communications apparatus in performing the related method performed by the control device in any one of FIG. 11A to FIG. 18 A, and FIG. 18B. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again. It should be noted that the foregoing units are optional. For example, the communications apparatus 19 may include the determining unit 1911, the obtaining unit 1912, and the sending unit 1913. Optionally, the communications apparatus 19 may further include the receiving unit 1914.

Figure 17A:
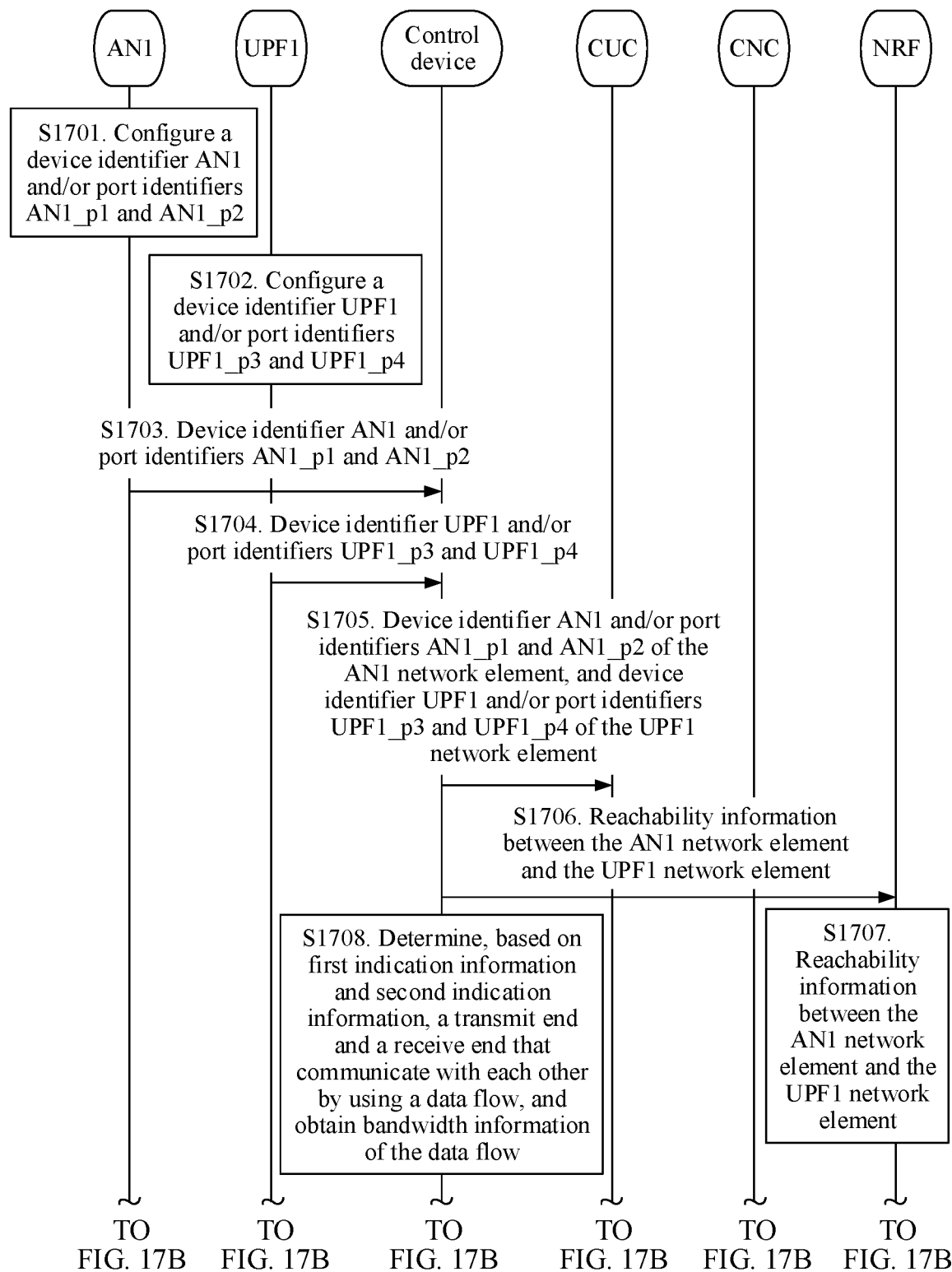
FIG. 17A, and FIG. 17B are schematic flowchart 8 of a communication method according to an embodiment of this application.
Figure 17B:
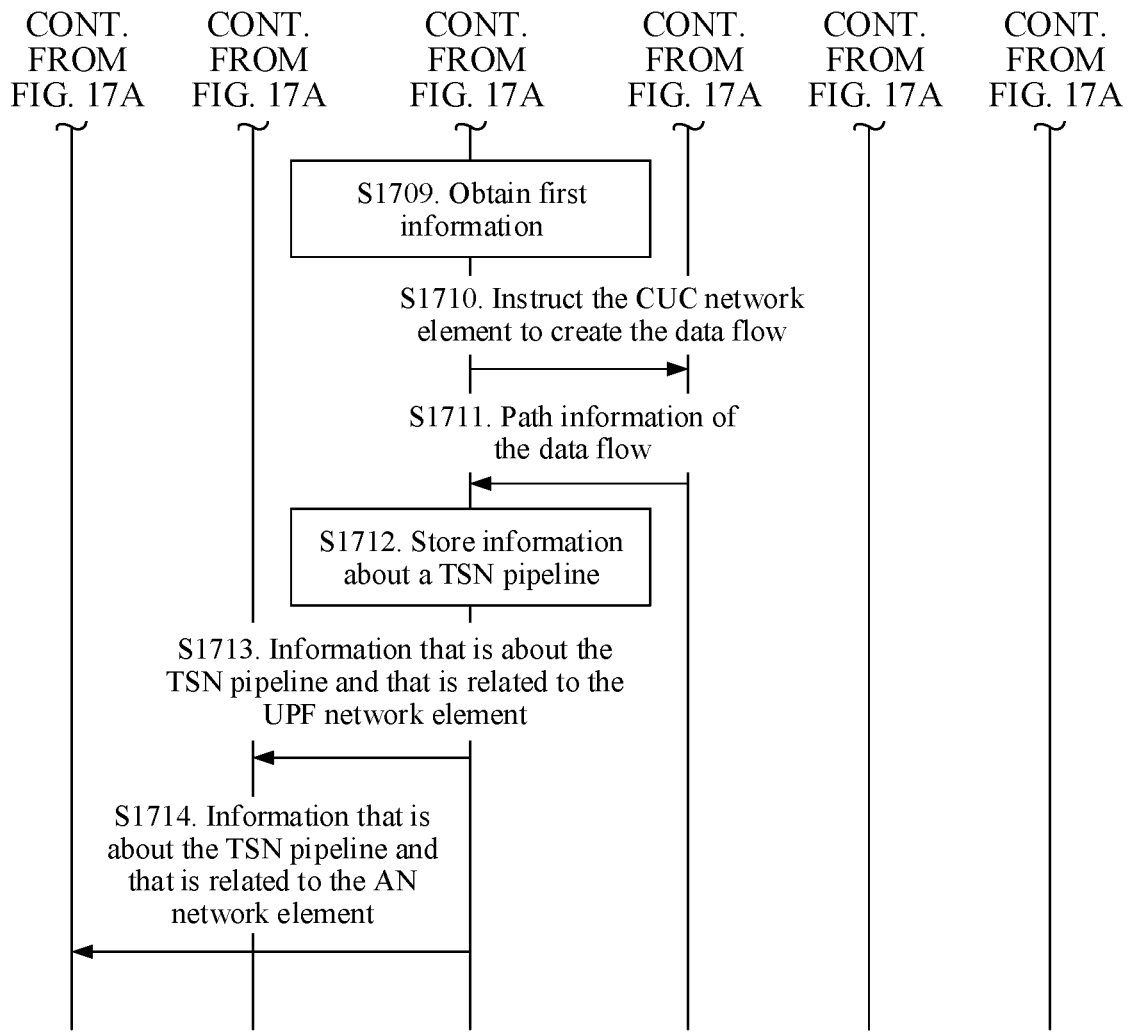

For example, the determining unit 1911 is configured to support the communications apparatus 19 in performing the process S1101 in FIG. 11A, the process S1205 in FIG. 12A, FIG. 12B, and FIG. 12C, the process S1301 in FIG. 13A, FIG. 13B, and FIG. 13C, the process S1405 in FIG. 14 A, FIG. 14B, and FIG. 14C, the process S1501 in FIG. 15A, FIG. 15B, and FIG. 15C, the process S1601 in FIG. 16 A, and FIG. 16B, the process S1708 in FIG. 17A, and FIG. 17B, or the process S1805 in FIG. 18 A, and FIG. 18B. The obtaining unit 1912 is configured to support the communications apparatus 19 in performing the process S1102 in FIG. 11A, the process S1206 in FIG. 12A, FIG. 12B, and FIG. 12C, the processes S1301 and S1302 in FIG. 13A, FIG. 13B, and FIG. 13C, the processes S1405 and S1406 in FIG. 14 A, FIG. 14B, and FIG. 14C, the processes S1502 and S1505 in FIG. 15A, FIG. 15B, and FIG. 15C, the process S1601 in FIG. 16 A, and FIG. 16B, the processes S1708 and S1709 in FIG. 17A, and FIG. 17B, or the process S1805 in FIG. 18 A, and FIG. 18B. The sending unit 1913 is configured to support the communications apparatus 19 in performing the process S1103 in FIG. 11A, the processes S1207, S1210, S1214, S1219, S1221, and S1223 in FIG. 12A, FIG. 12B, and FIG. 12C, the processes S1303, S1306, S1310, S1315, S1317, and S1319 in FIG. 13A, FIG. 13B, and FIG. 13C, the processes S1407, S1410, S1414, S1419, S1421, and S1423 in FIG. 14 A, FIG. 14B, and FIG. 14C, the processes S1506, S1509, S1513, S1518, S1520, and S1522 in FIG. 15A, FIG. 15B, and FIG. 15C, the processes S1602, S1614, and S1616 in FIG. 16A, and FIG. 16B, the processes S1705, S1706, S1710, S1713, and S1714 in FIG. 17A, and FIG. 17B, or the processes S1806, S1809, and S1811 in FIG. 18 A, and FIG. 18B. The receiving unit 1914 is configured to support the communications apparatus 19 in performing the processes S1203, S1204, S1213, and S1218 in FIG. 12A, FIG. 12B, and FIG. 12C, the processes S1309 and S1314 in FIG. 13A, FIG. 13B, and FIG. 13C, the processes S1404, S1413, and S1418 in FIG. 14 A, FIG. 14B, and FIG. 14C, the processes S1501, S1503, S1504, S1512, and S1517 in FIG. 15A, FIG. 15B, and FIG. 15C, the process S1612 in FIG. 16 A, and FIG. 16B, the processes S1703, S1704, and S1711 in FIG. 17A, and FIG. 17B, or the processes S1803, S1804, and S1807 in FIG. 18 A, and FIG. 18B. All related content of the operations in the foregoing method embodiments may be cited in function descriptions of a corresponding functional module. Details are not described herein again.

In an embodiment, the determining unit 1911 is configured to determine, based on first indication information and second indication information, a transmit end and a receive end that communicate with each other by using a data flow, where the first indication information is used to indicate that a first device is the transmit end and the second indication information is used to indicate that a second device is the receive end, or the first indication information is used to indicate that the first device is the receive end and the second indication information is used to indicate that the second device is the transmit end; the data flow includes first information for identifying the data flow; and the first information is used to instruct the transmit end to send data by using the data flow, and is further used to instruct the receive end to receive the data by using the data flow. The obtaining unit 1912 is configured to obtain bandwidth information of the data flow. The sending unit 1913 is configured to send data flow information and the bandwidth information that is obtained by the obtaining unit 1912, where the data flow information is used to indicate at least one of a port identifier of the transmit end determined by the determining unit 1911 and a port identifier of the receive end determined by the determining unit, and the port identifier of the transmit end, the port identifier of the receive end, and the bandwidth information are used to create the data flow.

In an embodiment, the communications apparatus further includes the receiving unit 1914, configured to: receive the first indication information from the first device, and/or receive the indication information from the second device.

In an embodiment, the communications apparatus further includes the receiving unit 1914, configured to receive the first indication information and the second indication information from a session management function network element.

In an embodiment, the sending unit 1913 is further configured to: send the first indication information to the first device, and/or send the second indication information to the second device.

In an embodiment, the communications apparatus further includes the receiving unit 1914, configured to receive the first information from the transmit end and/or the receive end.

In an embodiment, the sending unit 1913 is further configured to send the first information to the transmit end and/or the receive end.

In an embodiment, the communications apparatus further includes the receiving unit 1914, configured to: receive the port identifier of the transmit end from the transmit end, and receive the port identifier of the receive end from the receive end.

In an embodiment, the data flow information includes the port identifier of the transmit end, and the sending unit 1913 is configured to: send the data flow information to the transmit end, where the data flow information is used to instruct the transmit end to send a stream reservation protocol SRP request message to the receive end through a port corresponding to the port identifier of the transmit end, and the SRP request message is used to trigger creation of the data flow.

In an embodiment, the data flow information includes an identifier of a reliable-delay transmission network, and the identifier of the reliable-delay transmission network is associated with the port identifier of the transmit end and the port identifier of the receive end.

In an embodiment, the communications apparatus further includes the receiving unit 1914, configured to receive the bandwidth information from the transmit end and/or the receive end.

In an embodiment, the sending unit 1913 is configured to send the bandwidth information to the transmit end and/or the receive end.

In an embodiment, the sending unit 1913 is further configured to send reachability information between the transmit end and the receive end to a network function repository function network element, where the reachability information is used to indicate that the transmit end and the receive end are located in a same reliable delay transmission network.

Figure 20:
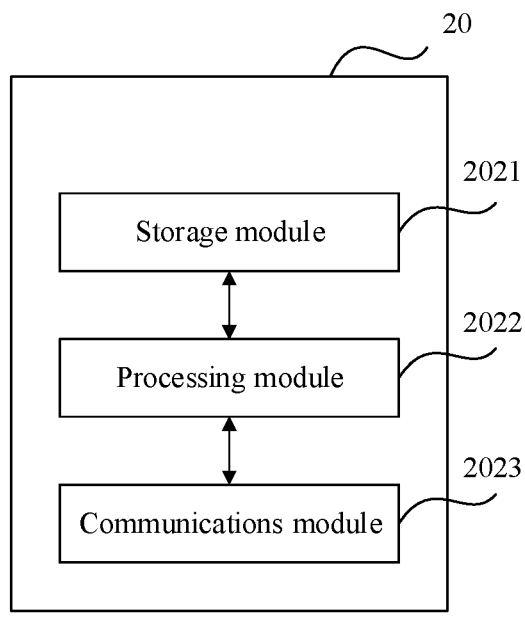
FIG. 20 is a schematic structural diagram 2 of a communications apparatus according to an embodiment of this application.

FIG. 20 is another possible schematic structural diagram of the communications apparatus in the foregoing embodiment. The communications apparatus 20 includes a processing module 2022 and a communications module 2023. Optionally, the communications apparatus 20 may further include a storage module 2021. The foregoing modules are configured to support the communications apparatus in performing the related method performed by the control device in any one of FIG. 11A to FIG. 18 A, and FIG. 18B. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again.

In an embodiment, the processing module 2022 is configured to control and manage an action of the communications apparatus 20, or perform a corresponding processing function, for example, perform functions of the determining unit 1911 and the obtaining unit 1912. The communications module 2023 is configured to support the communications apparatus 20 in performing functions of the receiving unit 1914 and the sending unit 1913. The storage module 2021 is configured to store program code and/or data of the communications apparatus.

The processing module 2022 may be a processor or a controller, such as may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 2023 may be a network interface, a communications interface, or the like. The storage module 2021 may be a memory.

In an embodiment, the processing module 2022 may be the processor 501 in FIG. 5, the communications module 2023 may be the communications interface 504 in FIG. 5, and the storage module 2021 may be the memory 503 in FIG. 5. One or more programs are stored in the memory, and the one or more programs include an instruction. When the instruction is executed by the communications apparatus, the communications apparatus is enabled to perform the related method performed by the control device in any one of FIG. 11A to FIG. 18 A, and FIG. 18B.

An embodiment of this application further provides a communications apparatus, including a processor and a memory. The memory is configured to store a program, and the processor invokes the program stored in the memory, so that the communications apparatus performs the related method performed by the control device in any one of FIG. 11A to FIG. 18 A, and FIG. 18B.

An embodiment of this application further provides a computer storage medium that stores one or more programs. The computer storage medium stores a computer program. When the computer program is executed by a processor, a communications apparatus is enabled to perform the related method performed by the control device in any one of FIG. 11A to FIG. 18 A, and FIG. 18B.

An embodiment of this application further provides a computer program product including an instruction. When the computer program product is run on a communications apparatus, the communications apparatus is enabled to perform the related method performed by the control device in any one of FIG. 11A to FIG. 18 A, and FIG. 18B.

An embodiment of this application provides a chip system. The chip system includes a processor, configured to support a communications apparatus in performing the related method performed by the control device in any one of FIG. 11A to FIG. 18 A, and FIG. 18B. For example, a control device determines, based on first indication information and second indication information, a transmit end and a receive end that communicate with each other by using a data flow, where the first indication information is used to indicate that a first device is the transmit end and the second indication information is used to indicate that a second device is the receive end, or the first indication information is used to indicate that the first device is the receive end and the second indication information is used to indicate that the second device is the transmit end; the data flow includes first information for identifying the data flow; and the first information is used to instruct the transmit end to send data by using the data flow, and is further used to instruct the receive end to receive the data by using the data flow. The control device obtains bandwidth information of the data flow. The control device sends data flow information and the bandwidth information, where the data flow information is used to indicate at least one of a port identifier of the transmit end and a port identifier of the receive end, and the port identifier of the transmit end, the port identifier of the receive end, and the bandwidth information are used to create the data flow. In a possible design, the chip system further includes a memory. The memory is configured to store a program instruction and data that are necessary for the terminal device. The chip system may include a chip and an integrated circuit, or may include a chip and another discrete device. This is not limited in this embodiment of this application.

The communications apparatuses, the computer storage medium, the computer program product, and the chip system that are provided in this application are all configured to perform the corresponding method provided above. Therefore, for beneficial effects that can be achieved by the communications apparatuses, the computer storage medium, the computer program product, and the chip system, refer to the beneficial effects in the corresponding method provided above. Details are not described herein again.

It can be understood that the communications apparatus may be a control device, or may be a component (a chip, a circuit, or the like) that can be applied to a control device.

An embodiment of this application further provides a communications apparatus. The communications apparatus may be configured to perform a function of the AN network element, the first device, or the second device in the foregoing method. In this embodiment of this application, the communications apparatus may be divided into functional modules based on the example of the foregoing method. For example, the functional modules may be obtained through division based on corresponding functions, or two or more functions may be integrated into one processing module. The integrated module may be implemented in a form of hardware, or may be implemented in a form of a software functional module. It should be noted that, in this application, module division is exemplary, and is merely a logical function division. In actual implementation, another division manner may be used.

Figure 21:
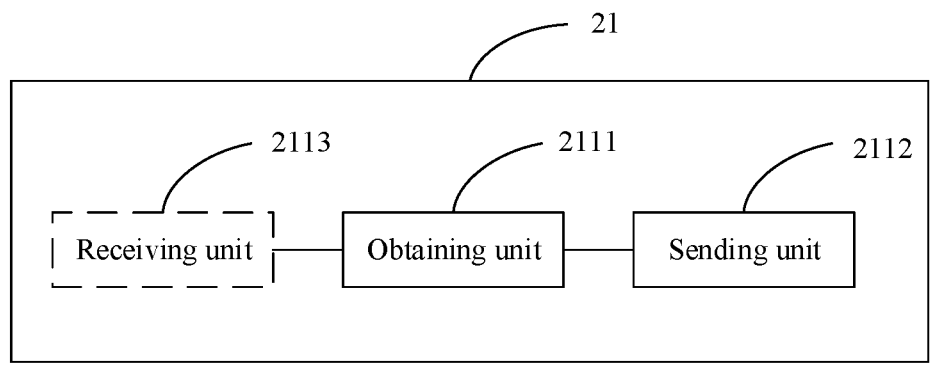
FIG. 21 is a schematic structural diagram 1 of another communications apparatus according to an embodiment of this application.

When the functional modules are obtained through division in correspondence to functions, FIG. 21 is a possible schematic structural diagram of the communications apparatus in the foregoing embodiment. The communications apparatus 21 may include an obtaining unit 2111, a sending unit 2112, and a receiving unit 2113. The foregoing units are configured to support the communications apparatus in performing the related method performed by the AN network element in any one of FIG. 11A to FIG. 18 A, and FIG. 18B. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again. It should be noted that the foregoing units are optional. For example, the communications apparatus 21 may include the obtaining unit 2111 and the sending unit 2112. Optionally, the communications apparatus 21 may further include the receiving unit 2113.

For example, the obtaining unit 2111 is configured to support the communications apparatus 21 in performing the process S1104 in FIG. 11B, the processes S1201 and S1208 in FIG. 12A, FIG. 12B, and FIG. 12C, the process S1304 in FIG. 13A, FIG. 13B, and FIG. 13C, the processes S1401 and S1408 in FIG. 14 A, FIG. 14B, and FIG. 14C, the process S1507 in FIG. 15A, FIG. 15B, and FIG. 15C, the process S1603 in FIG. 16 A, and FIG. 16B, the process S1701 in FIG. 17A, and FIG. 17B, or the process S1801 in FIG. 18 A, and FIG. 18B. The sending unit 2112 is configured to support the communications apparatus 21 in performing the process S1105 in FIG. 11B, the processes S1203 and S1209 in FIG. 12A, FIG. 12B, and FIG. 12C, the processes S1305 and S1309 in FIG. 13A, FIG. 13B, and FIG. 13C, the processes S1403, S1409, and S1413 in FIG. 14 A, FIG. 14B, and FIG. 14C, the processes S1508 and S1512 in FIG. 15A, FIG. 15B, and FIG. 15C, the processes S1604 and S1612 in FIG. 16 A, and FIG. 16B, the process S1703 in FIG. 17A, and FIG. 17B, or the process S1803 in FIG. 18 A, and FIG. 18B. The receiving unit 2113 is configured to support the communications apparatus 21 in performing the processes S1207, S1212, S1216, S1219, and S1223 in FIG. 12A, FIG. 12B, and FIG. 12C, the processes S1303, S1308, S1312, S1315, and S1319 in FIG. 13A, FIG. 13B, and FIG. 13C, the processes S1407, S1412, S1416, S1419, and S1423 in FIG. 14 A, FIG. 14B, and FIG. 14C, the processes S1506, S1511, S1515, S1518, and S1522 in FIG. 15A, FIG. 15B, and FIG. 15C, the processes S1602, S1609, S1611, and S1616 in FIG. 16 A, and FIG. 16B, the process S1714 in FIG. 17A, and FIG. 17B, or the process S1811 in FIG. 18 A, and FIG. 18B. All related content of the operations in the foregoing method embodiments may be cited in function descriptions of a corresponding functional module. Details are not described herein again.

In an embodiment, the obtaining unit 2111 is configured to obtain a port identifier of a first device, where the first device is a transmit end or a receive end that performs communication by using a data flow, the data flow includes first information for identifying the data flow, and the first information is used to instruct the transmit end to send data by using the data flow, and is further used to instruct the receive end to receive the data by using the data flow. The sending unit 2112 is configured to send second information indicating the port identifier of the first device that is obtained by the obtaining unit 2111, where the port identifier of the first device is used to create the data flow.

In an embodiment, the communications apparatus 21 may further include the receiving unit 2113. The receiving unit 2113 is configured to receive an identifier of a reliable-delay transmission network from a control device. The obtaining unit 2111 is configured to obtain the port identifier of the first device based on the identifier of the reliable-delay transmission network received by the receiving unit 2113.

In an embodiment, the communications apparatus 21 may further include the receiving unit 2113, and the receiving unit 2113 is configured to receive the port identifier of the first device from the control device.

In an embodiment, the sending unit 2112 is configured to send the port identifier of the first device to the control device.

In an embodiment, the sending unit 2112 is further configured to send a stream reservation protocol SRP request message to a second device through a port corresponding to the port identifier of the first device, where the SRP request message is used to trigger creation of the data flow, the first device is the transmit end, and the second device is the receive end; or send an SRP response message to a second device through a port corresponding to the port identifier of the first device, where the SRP response message is used to respond to an SRP request message from the second device, the SRP request message is used to trigger creation of the data flow, the first device is the receive end, and the second device is the transmit end.

In an embodiment, the communications apparatus 21 may further include the receiving unit 2113. The receiving unit 2113 is configured to receive first indication information from the control device, and the first indication information is used to indicate whether the first device is the transmit end or the receive end.

In an embodiment, the sending unit 2112 is further configured to send first indication information to the control device, where the first indication information is used to indicate whether the first device is the transmit end or the receive end.

In an embodiment, the communications apparatus 21 may further include the receiving unit 2113. The receiving unit 2113 is configured to receive bandwidth information of the data flow from the control device.

In an embodiment, the sending unit 2112 is further configured to send bandwidth information of the data flow to the control device.

In an embodiment, the communications apparatus 21 may further include the receiving unit 2113, and the receiving unit 2113 is configured to receive the first information from the control device.

In an embodiment, the sending unit 2112 is further configured to send the first information to the control device.

Figure 22:
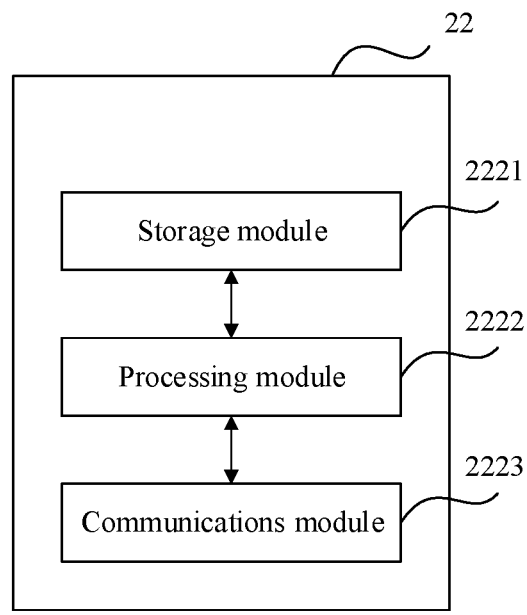
FIG. 22 is a schematic structural diagram 2 of another communications apparatus according to an embodiment of this application.

FIG. 22 is another possible schematic structural diagram of the communications apparatus in the foregoing embodiment. The communications apparatus 22 includes a processing module 2222 and a communications module 2223. Optionally, the communications apparatus 22 may further include a storage module 2221. The foregoing modules are configured to support the communications apparatus in performing the related method performed by the AN network element in any one of FIG. 11A to FIG. 18 A, and FIG. 18B. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again.

In an embodiment, the processing module 2222 is configured to control and manage an action of the communications apparatus 22, or perform a corresponding processing function, for example, perform a function of the obtaining unit 2111. The communications module 2223 is configured to support the communications apparatus 22 in performing functions of the receiving unit 2113 and the sending unit 2112. The storage module 2221 is configured to store program code and/or data of the communications apparatus.

The processing module 2222 may be a processor or a controller, such as may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 2223 may be a transceiver, a transceiver circuit, a Bluetooth module, a network interface, a communications interface, or the like. The storage module 2221 may be a memory.

In a possible manner, the processing module 2222 may be the processor 431 in the BBU 401 in FIG. 4, the communications module 2223 may be the RF circuit 434 in the RRU 402 in FIG. 4, and the storage module 2221 may be the memory 432 in the BBU 401 in FIG. 4. One or more programs are stored in the memory, and the one or more programs include an instruction. When the instruction is executed by the communications apparatus, the communications apparatus is enabled to perform the related method performed by the AN network element in any one of FIG. 11A to FIG. 18 A, and FIG. 18B.

An embodiment of this application further provides a communications apparatus, including a processor and a memory. The memory is configured to store a program, and the processor invokes the program stored in the memory, so that the communications apparatus performs the related method performed by the AN network element in any one of FIG. 11A to FIG. 18 A, and FIG. 18B.

An embodiment of this application further provides a computer storage medium that stores one or more programs. The computer storage medium stores a computer program. When the computer program is executed by a processor, a communications apparatus is enabled to perform the related method performed by the AN network element in any one of FIG. 11A to FIG. 18 A, and FIG. 18B.

An embodiment of this application further provides a computer program product including an instruction. When the computer program product is run on a communications apparatus, the communications apparatus is enabled to perform the related method performed by the AN network element in any one of FIG. 11A to FIG. 18 A, and FIG. 18B.

An embodiment of this application provides a chip system. The chip system includes a processor, configured to support a communications apparatus in performing the related method performed by the AN network element in any one of FIG. 11A to FIG. 18. For example, a first device obtains a port identifier of the first device, where the first device is a transmit end or a receive end that performs communication by using a data flow, the data flow includes first information for identifying the data flow, and the first information is used to instruct the transmit end to send data by using the data flow, and is further used to instruct the receive end to receive the data by using the data flow. The first device sends second information indicating the port identifier of the first device, where the port identifier of the first device is used to create the data flow. In a possible design, the chip system further includes a memory. The memory is configured to store a program instruction and data that are necessary for the terminal device. The chip system may include a chip and an integrated circuit, or may include a chip and another discrete device. This is not limited in this embodiment of this application.

The communications apparatuses, the computer storage medium, the computer program product, and the chip system that are provided in this application are all configured to perform the corresponding method provided above. Therefore, for beneficial effects that can be achieved by the communications apparatuses, the computer storage medium, the computer program product, and the chip system, refer to the beneficial effects in the corresponding method provided above. Details are not described herein again.

It can be understood that the communications apparatus may be an AN network element, or may be a component (a chip, a circuit, or the like) that can be applied to an AN network element.

An embodiment of this application further provides a communications apparatus. The communications apparatus may be configured to perform a function of the UPF network element, the first device, or the second device in the foregoing method. In this embodiment of this application, the communications apparatus may be divided into functional modules based on the example of the foregoing method. For example, the functional modules may be obtained through division based on corresponding functions, or two or more functions may be integrated into one processing module. The integrated module may be implemented in a form of hardware, or may be implemented in a form of a software functional module. It should be noted that, in this application, module division is exemplary, and is merely a logical function division. In actual implementation, another division manner may be used.

Figure 23:
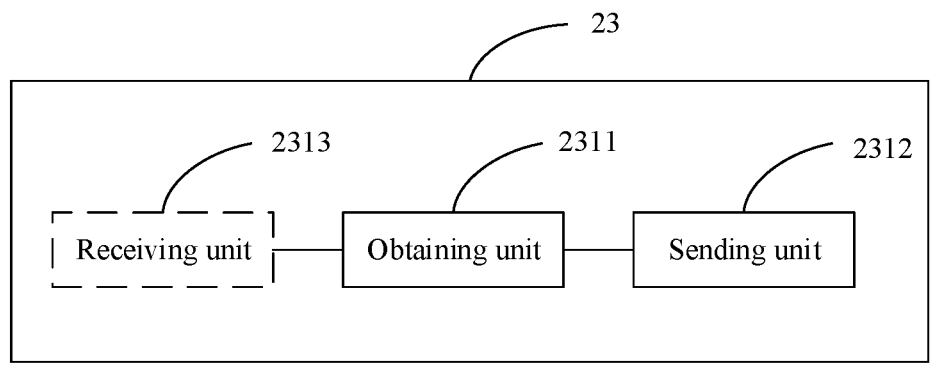
FIG. 23 is a schematic structural diagram 1 of still another communications apparatus according to an embodiment of this application.

When the functional modules are obtained through division in correspondence to functions, FIG. 23 is a possible schematic structural diagram of the communications apparatus in the foregoing embodiment. The communications apparatus 23 may include an obtaining unit 2311, a sending unit 2312, and a receiving unit 2313. The foregoing units are configured to support the communications apparatus in performing the related method performed by the UPF network element in any one of FIG. 11A to FIG. 18 A, and FIG. 18B. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again. It should be noted that the foregoing units are optional. For example, the communications apparatus 23 may include the obtaining unit 2311 and the sending unit 2312. Optionally, the communications apparatus 23 may further include the receiving unit 2313.

For example, the obtaining unit 2311 is configured to support the communications apparatus 23 in performing the process S1104 in FIG. 11B, or the processes S1202 and S1211 in FIG. 12A, FIG. 12B, and FIG. 12C, the process S1307 in FIG. 13A, FIG. 13B, and FIG. 13C, the processes S1402 and S1411 in FIG. 14 A, FIG. 14B, and FIG. 14C, the process S1510 in FIG. 15A, FIG. 15B, and FIG. 15C, the process S1606 in FIG. 16 A, and FIG. 16B, the process S1702 in FIG. 17A, and FIG. 17B, or the process S1802 in FIG. 18 A, and FIG. 18B. The sending unit 2312 is configured to support the communications apparatus 23 in performing the process S1105 in FIG. 11B, the processes S1204 and S1212 in FIG. 12A, FIG. 12B, and FIG. 12C, the process S1308 in FIG. 13A, FIG. 13B, and FIG. 13C, the processes S1404 and S1412 in FIG. 14 A, FIG. 14B, and FIG. 14C, the process S1511 in FIG. 15A, FIG. 15B, and FIG. 15C, the processes S1607 and S1612 in FIG. 16 A, and FIG. 16B, the process S1704 in FIG. 17A, and FIG. 17B, or the process S1804 in FIG. 18 A, and FIG. 18B. The receiving unit 2313 is configured to support the communications apparatus 23 in performing the processes S1209, S1210, S1216, S1219, and S1223 in FIG. 12A, FIG. 12B, and FIG. 12C, the processes S1305, S1306, S1312, S1315, and S1319 in FIG. 13A, FIG. 13B, and FIG. 13C, the processes S1409, S1410, S1416, S1419, and S1423 in FIG. 14 A, FIG. 14B, and FIG. 14C, the processes S1508, S1509, S1515, S1518, and S1522 in FIG. 15A, FIG. 15B, and FIG. 15C, the process S1605, S1609, S1611, and S1616 in FIG. 16 A, and FIG. 16B, the process S1713 in FIG. 17A, and FIG. 17B, or the process S1811 in FIG. 18 A, and FIG. 18B. All related content of the operations in the foregoing method embodiments may be cited in function descriptions of a corresponding functional module. Details are not described herein again.

In an embodiment, the obtaining unit 2311 is configured to obtain a port identifier of a first device, where the first device is a transmit end or a receive end that performs communication by using a data flow, the data flow includes first information for identifying the data flow, and the first information is used to instruct the transmit end to send data by using the data flow, and is further used to instruct the receive end to receive the data by using the data flow. The sending unit 2312 is configured to send second information indicating the port identifier of the first device that is obtained by the obtaining unit 2311, where the port identifier of the first device is used to create the data flow.

In an embodiment, the communications apparatus 23 may further include the receiving unit 2313. The receiving unit 2313 is configured to receive an identifier of a reliable-delay transmission network from a control device. The obtaining unit 2311 is configured to obtain the port identifier of the first device based on the identifier of the reliable-delay transmission network received by the receiving unit 2313.

In a possible implementation, the communications apparatus 23 may further include the receiving unit 2313, and the receiving unit 2313 is configured to receive the port identifier of the first device from the control device.

In an embodiment, the sending unit 2312 is configured to send the port identifier of the first device to the control device.

In an embodiment, the sending unit 2312 is further configured to send a stream reservation protocol SRP request message to a second device through a port corresponding to the port identifier of the first device, where the SRP request message is used to trigger creation of the data flow, the first device is the transmit end, and the second device is the receive end; or send an SRP response message to a second device through a port corresponding to the port identifier of the first device, where the SRP response message is used to respond to an SRP request message from the second device, the SRP request message is used to trigger creation of the data flow, the first device is the receive end, and the second device is the transmit end.

In an embodiment, the communications apparatus 23 may further include the receiving unit 2313. The receiving unit 2313 is configured to receive first indication information from the control device, and the first indication information is used to indicate whether the first device is the transmit end or the receive end.

In an embodiment, the sending unit 2312 is further configured to send first indication information to the control device, where the first indication information is used to indicate whether the first device is the transmit end or the receive end.

In an embodiment, the communications apparatus 23 may further include the receiving unit 2313. The receiving unit 2313 is configured to receive bandwidth information of the data flow from the control device.

In an embodiment, the sending unit 2312 is further configured to send bandwidth information of the data flow to the control device.

In an embodiment, the communications apparatus 23 may further include the receiving unit 2313, and the receiving unit 2313 is configured to receive the first information from the control device.

In an embodiment, the sending unit 2312 is further configured to send the first information to the control device.

Figure 24:
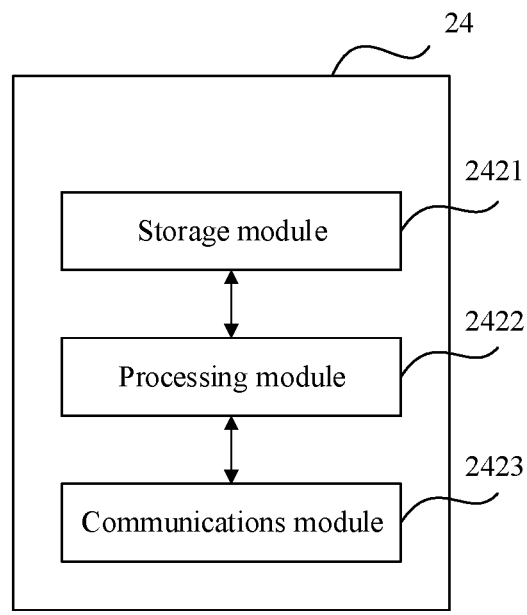
FIG. 24 is a schematic structural diagram 2 of still another communications apparatus according to an embodiment of this application.

FIG. 24 is another possible schematic structural diagram of the communications apparatus in the foregoing embodiment. The communications apparatus 24 includes a processing module 2422 and a communications module 2423. Optionally, the communications apparatus 24 may further include a storage module 2421. The foregoing modules are configured to support the communications apparatus in performing the related method performed by the UPF network element in any one of FIG. 11A to FIG. 18 A, and FIG. 18B. The communications apparatus provided in this application is configured to perform the corresponding method provided above. Therefore, for corresponding features of the communications apparatus and beneficial effects that can be achieved by the communications apparatus, refer to the beneficial effects in the corresponding method provided above. Details are not described herein again.

In an embodiment, the processing module 2422 is configured to control and manage an action of the communications apparatus 24, or perform a corresponding processing function, for example, perform a function of the obtaining unit 2311. The communications module 2423 is configured to support the communications apparatus 24 in performing functions of the receiving unit 2313 and the sending unit 2312. The storage module 2421 is configured to store program code and/or data of the communications apparatus.

The processing module 2422 may be a processor or a controller, such as may be a central processing unit (central processing unit, CPU), a general-purpose processor, a digital signal processor (digital signal processing, DSP), an application-specific integrated circuit (application-specific integrated circuit, ASIC), a field programmable gate array (field programmable gate array, FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 2423 may be a transceiver, a transceiver circuit, a Bluetooth module, a network interface, a network interface, a communications interface, or the like. The storage module 2421 may be a memory.

In an embodiment, the processing module 2222 may be the processor 501 in FIG. 5, the communications module 2223 may be the communications interface 504 in FIG. 5, and the storage module 2221 may be the memory 503 in FIG. 5. One or more programs are stored in the memory, and the one or more programs include an instruction. When the instruction is executed by the communications apparatus, the communications apparatus is enabled to perform the related method performed by the UPF network element in any one of FIG. 11A to FIG. 18 A, and FIG. 18B.

An embodiment of this application further provides a communications apparatus, including a processor and a memory. The memory is configured to store a program, and the processor invokes the program stored in the memory, so that the communications apparatus performs the related method performed by the UPF network element in any one of FIG. 11A to FIG. 18.

An embodiment of this application further provides a computer storage medium that stores one or more programs. The computer storage medium stores a computer program. When the computer program is executed by a processor, a communications apparatus is enabled to perform the related method performed by the UPF network element in any one of FIG. 11A to FIG. 18 A, and FIG. 18B.

An embodiment of this application further provides a computer program product including an instruction. When the computer program product is run on a communications apparatus, the communications apparatus is enabled to perform the related method performed by the UPF network element in any one of FIG. 11A to FIG. 18 A, and FIG. 18B.

An embodiment of this application provides a chip system. The chip system includes a processor, configured to support a communications apparatus in performing the related method performed by the UPF network element in any one of FIG. 11A to FIG. 18 A, and FIG. 18B. For example, a first device obtains a port identifier of the first device, where the first device is a transmit end or a receive end that performs communication by using a data flow, the data flow includes first information for identifying the data flow, and the first information is used to instruct the transmit end to send data by using the data flow, and is further used to instruct the receive end to receive the data by using the data flow. The first device sends second information indicating the port identifier of the first device, where the port identifier of the first device is used to create the data flow. In a possible design, the chip system further includes a memory. The memory is configured to store a program instruction and data that are necessary for the terminal device. The chip system may include a chip and an integrated circuit, or may include a chip and another discrete device. This is not limited in this embodiment of this application.

The communications apparatuses, the computer storage medium, the computer program product, and the chip system that are provided in this application are all configured to perform the corresponding method provided above. Therefore, for beneficial effects that can be achieved by the communications apparatuses, the computer storage medium, the computer program product, and the chip system, refer to the beneficial effects in the corresponding method provided above. Details are not described herein again.

It can be understood that the communications apparatus may be a UPF network element, or may be a component (a chip, a circuit, or the like) that can be applied to a UPF network element.

It should be understood that, in various embodiments of this application, "first", "second", and the like are merely intended to indicate different objects, and are not used to constitute any limitation on the indicated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method in a time sensitive network (TSN), the method comprising:
    determining, by a control device based on first indication information and second indication information, a transmit end and a receive end that communicate with each other using a reliable-delay data flow through a TSN flow between the transmit end and the receive end, the first indication information and the second indication information respectively indicating that a first device is the transmit end and a second device is the receive end, or vice versa, the reliable-delay data flow comprising first information to identify the reliable-delay data flow, to instruct the transmit end to send data using the reliable-delay data flow, and to instruct the receive end to receive the data using the reliable-delay data flow;
    obtaining, by the control device, bandwidth information of the reliable-delay data flow; and
    sending, by the control device, data flow information and the bandwidth information, the data flow information indicating a port identifier of the transmit end or a port identifier of the receive end, the data flow information and the bandwidth information being used to create the reliable-delay data flow.

2. The communication method according to claim 1, further comprising:
    receiving, by the control device, at least one of the first indication information from the first device or the second indication information from the second device.

3. The communication method according to claim 1, further comprising:
    receiving, by the control device, the first indication information and the second indication information from a session management function network element.

4. The communication method according to claim 3, further comprising:
    sending, by the control device, the first indication information to the first device, and/or the second indication information to the second device.

5. The communication method according to claim 1, further comprising:
    receiving, by the control device, the first information from the transmit end and/or the receive end.

6. The communication method according to claim 1, further comprising:
    sending, by the control device, the first information to the transmit end and/or the receive end.

7. The communication method according to claim 1, further comprising:
    receiving, by the control device, the port identifier of the transmit end from the transmit end, and/or the port identifier of the receive end from the receive end.

8. The communication method according to claim 1, wherein the data flow information comprises the port identifier of the transmit end, and wherein sending data flow information comprises:
    sending, by the control device, the data flow information to the transmit end to instruct the transmit end to send a stream reservation protocol (SRP) request message to the receive end through a port corresponding to the port identifier of the transmit end, wherein the SRP request message is used to trigger creation of the reliable-delay data flow.

9. The communication method according to claim 1, wherein the data flow information comprises an identifier of a reliable-delay transmission network, and the identifier of the reliable-delay transmission network is associated with the port identifier of the transmit end and the port identifier of the receive end.

10. A communication method, comprising:
    obtaining, by a first device, a port identifier of the first device, the first device is a transmit end or a receive end that performs communication using a reliable-delay data flow through a time sensitive network (TSN) flow between the transmit end and the receive end, the reliable-delay data flow comprising first indication information to identify the reliable-delay data flow to instruct the transmit end to send data using the reliable-delay data flow and to instruct the receive end to receive the data using the reliable-delay data flow; and
    sending, by the first device, second indication information indicating the port identifier of the first device, the port identifier of the first device being used to create the reliable-delay data flow.

11. The communication method according to claim 10, wherein obtaining a port identifier of the first device comprises:
    receiving, by the first device, an identifier of a reliable-delay TSN from a control device; and
    obtaining, by the first device, the port identifier of the first device based on the identifier of the reliable-delay transmission network.

12. The communication method according to claim 10, wherein obtaining a port identifier of the first device comprises:
    receiving, by the first device, the port identifier of the first device from a control device.

13. The communication method according to claim 10, wherein sending second information indicating the port identifier of the first device comprises:

sending, by the first device, the port identifier of the first device to the control device.

14. The communication method according to claim 10, further comprising:
sending, by the first device, a stream reservation protocol (SRP) request message to a second device through a port corresponding to the port identifier of the first device, wherein the SRP request message is used to trigger creation of the reliable-delay data flow, the first device is the transmit end, and the second device is the receive end; or
sending, by the first device, an SRP response message to a second device through a port corresponding to the port identifier of the first device, wherein the SRP response message is used to respond to an SRP request message from the second device, the SRP request message is used to trigger creation of the reliable-delay data flow, the first device is the receive end, and the second device is the transmit end.

15. The communication method according to claim 10, further comprising:
receiving, by the first device, first indication information from the control device, wherein the first indication information is used to indicate whether the first device is the transmit end or the receive end.

16. The communication method according to claim 10, further comprising:
sending, by the first device, first indication information to the control device to indicate whether the first device is the transmit end or the receive end.

17. The communication method according to claim 10, further comprising:
receiving, by the first device, bandwidth information of the reliable-delay data flow from the control device.

18. The communication method according to claim 10, further comprising:
sending, by the first device, bandwidth information of the reliable-delay data flow to the control device.

19. A communications apparatus in a time sensitive network (TSN), comprising:
a processor; and
a memory coupled to the processor to store instructions, which when executed by the processor, cause the processor to perform operations, the operations comprising:
determining, based on first indication information and second indication information, a transmit end and a receive end that communicate with each other using a reliable-delay data flow through a TSN flow between the transmit end and the receive end, the first indication information and the second indication information respectively indicating that a first device is the transmit end and a second device is the receive end, or vice versa, the reliable-delay data flow comprising first information to identify the reliable-delay data flow, to instruct the transmit end to send data using the reliable-delay data flow, and to instruct the receive end to receive the data using the reliable-delay data flow;
obtaining bandwidth information of the reliable-delay data flow; and
sending data flow information and the bandwidth information, the data flow information indicating a port identifier of the transmit end or a port identifier of the receive end, the data flow information and the bandwidth information being used to create the reliable-delay data flow.

20. The communications apparatus according to claim 19, wherein the operations further comprise:
receiving at least one of the first indication information from the first device or the second indication information from the second device.

* * * * *